(12) United States Patent
Cassidy et al.

(10) Patent No.: US 7,107,226 B1
(45) Date of Patent: Sep. 12, 2006

(54) INTERNET-BASED ON-LINE COMPARISON SHOPPING SYSTEM AND METHOD OF INTERACTIVE PURCHASE AND SALE OF PRODUCTS

(75) Inventors: Patrick Cassidy, Apex, NC (US); James Evans, Cary, NC (US)

(73) Assignee: Net32.com, Inc., Morrisville, NC (US)

( * ) Notice: Subject to any disclaimer, the term of this patent is extended or adjusted under 35 U.S.C. 154(b) by 800 days.

(21) Appl. No.: 09/234,348

(22) Filed: Jan. 20, 1999

(51) Int. Cl.
*G06H 17/60* (2006.01)
*G06H 17/30* (2006.01)

(52) U.S. Cl. .............................. 705/26; 705/14; 707/3; 707/5; 707/102; 707/103

(58) Field of Classification Search ................... 705/26, 705/27
See application file for complete search history.

(56) References Cited

U.S. PATENT DOCUMENTS

| | | | | | |
|---|---|---|---|---|---|
| 4,992,940 | A | * | 2/1991 | Dworkin ..................... | 364/401 |
| 5,592,375 | A | * | 1/1997 | Salmon et al. ............... | 395/207 |
| 5,692,132 | A | | 11/1997 | Hogan ........................ | 395/227 |
| 5,710,887 | A | | 1/1998 | Chelliah et al. ............. | 395/226 |
| 5,715,314 | A | | 2/1998 | Payne et al. .................. | 380/24 |
| 5,745,681 | A | | 4/1998 | Levine et al. ............ | 395/200.3 |
| 5,757,917 | A | | 5/1998 | Rose et al. ................... | 380/25 |
| 5,778,368 | A | * | 7/1998 | Hogan et al. ................. | 707/10 |
| 5,825,881 | A | | 10/1998 | Colvin, Sr. ................... | 380/27 |
| 5,835,712 | A | | 11/1998 | DuFresne .............. | 395/200.33 |
| 5,838,965 | A | * | 11/1998 | Kavanagh et al. .......... | 395/614 |
| 5,842,178 | A | | 11/1998 | Giovannoli ................... | 705/26 |
| 5,897,622 | A | * | 4/1999 | Blinn et al. ................... | 705/26 |
| 5,918,213 | A | * | 6/1999 | Bernard et al. ............... | 705/26 |
| 5,983,219 | A | * | 11/1999 | Danish et al. .................. | 707/3 |
| 6,041,310 | A | * | 3/2000 | Green et al. .................. | 705/27 |
| 6,064,979 | A | * | 5/2000 | Perkowski .................... | 705/26 |
| 6,064,982 | A | * | 5/2000 | Puri ............................. | 705/27 |
| 6,073,127 | A | * | 6/2000 | Lannert et al. ............... | 706/45 |
| 6,076,091 | A | * | 6/2000 | Fohn et al. ................. | 707/102 |

\* cited by examiner

*Primary Examiner*—Yehdega Retta
(74) *Attorney, Agent, or Firm*—Marianne Fuierer; Steven Hultquist; Yongzhi Yang

(57) ABSTRACT

A searchable database comprising a multiplicity of tables including an attributes table and a values table for a multiplicity of target search items constructed and arranged so that selection of values for one or more target search item attributes yields an attribute-value construct specifying a particular one of said target search items and precluding an indeterminate search result. Such database may be employed in an online comparison shopping system comprising a database containing product information of multiple vendors, manufacturers and/or products and a user interface generating a virtual shopping cart, and constructed and arranged to enable a user to selectively aggregate an order in said virtual shopping cart, comprising products represented in said database, and means for electronically disaggregating said order to generate vendor-specific orders to respective vendors.

54 Claims, 77 Drawing Sheets

SimShop-Dental-Purchasing.Com-Microsoft Internet Explorer provided by Dental-Purchasing.Com File Edit View Go Favorites Help Back Forward Stop Refresh Home Search Favorites History Channels Fullscreen Mail Print Edit Address http://www.dental-purchasing.com/FrameTop.asp | Links

Dental-Purchasing.com

- Home
- ▼Shop
  - By Brand
  - By Category
  - By Manufacturer
  - By Product Code
  - By Product Index
  - By Vendor
- Order History
- Templates
- ▼ShoppingCart
  - View/Edit
  - Recalculate
  - Place Order
  - Save as Template
  - Empty
- ▲Edit Account
- Help

Product Search:
By Category

Instructions:
Select from the drop down lists to find the specific product you are looking for. The results will appear in the frame below.

Select Category: Burs
Bur subcategory: Carbide
Bur type: Friction grip (SL)=surgical length
Bur shape/use: Round
Bur size: 4
Bur components: Single bur type
Manufacturer: <ALL>
Brand: <ALL>

Clear

Have questions or need additional help? Contact staff@dental-purchasing.com
© 1998, SimShop, Inc. All Rights Reserved.

FG #4 SL (surgical length) round carbide bur

| Vendor | Product Code | Manufacturer | Brand | 1 | 5 | 6 | 10 | 50 | 100 | History | Quantity |
|---|---|---|---|---|---|---|---|---|---|---|---|
| Arnold Dental Supply | 382605 | Dentsply Midwest | <NOT SPECIFIED> | $1.05 | | | | | | | |
| Arnold Dental Supply | ADSSWCSLR4 | S.S.White | <NOT SPECIFIED> | $1.25 | | | $1.25 | | | | 0 |
| Zila Dental Supply | 164-00011 | Dentsply Midwest | <NOT SPECIFIED> | $2.19 | | | | | | For comparison only | |
| Zila Dental Supply | 190-00109 | S.S.White | <NOT SPECIFIED> | $2.19 | | | $1.95 | | | For comparison only | 0 |

Internet zone

SimShop-Dental-Purchasing.Com—Microsoft Internet Explorer provided by Dental-Purchasing.Com

Address: http://www.dental-purchasing.com/FrameTop.asp

Dental-Purchasing.com

- Home
- ▶Shop
  - By Brand
  - By Category
  - By Manufacturer
  - By Product Code
  - By Product Index
  - By Vendor
  - Order History
  - Templates
- ▶ShoppingCart
  - View/Edit
  - Recalculate
  - Place Order
  - Save as Template
  - Empty
- ▶Edit Account
- Help Latex gloves: non-sterile, powdered, non-chlorinated, smooth, natural color and flavor, not fitted. Box of 100 medium gloves.

| Vendor | Product Code | Manufacturer | Brand | 1 | 3 | 10 | 20 | 30 | 40 | History | Quantity |
|---|---|---|---|---|---|---|---|---|---|---|---|
| Action Team Medical | LP1070 | Action Team Medical | ATM exam gloves | | | | | | | | |
| Arnold Dental Supply | ADLGHAM | Regaltex | Health Aid exam gloves | $6.95 | | $6.55 | $4.95 | | | | 0 |
| Arnold Dental Supply | AD695-5192 | Johnson & Johnson Medical | Micro-Touch | $8.95 | | $8.55 | $6.15 | $5.95 | | | 0 |
| Arnold Dental Supply | AD107-0695 | Malaytex | <NOT SPECIFIED> | $7.25 | | $6.95 | $8.25 | | | | 0 |
| Carolina Dental Supply | CD100-2282 | Malaytex | Redwood exam gloves | $5.95 | | | $6.75 | $6.25 | | | 0 |
| Carolina Dental Supply | CD565-9024 | Microflex | Micro One exam gloves | $5.95 | $4.95 | | | | | | 0 |
| Carolina Dental Supply | CD152-0026 | Dash Medical | <NOT SPECIFIED> | $8.50 | | | | | | | 0 |
| Fredentco | 11LATMCRS | Harraeus Kulzer | <NOT SPECIFIED> | $9.25 | | | | | | | 0 |
| Fredentco | FGLEM001 | Fredentco | <NOT SPECIFIED> | $5.79 | $5.29 | | | | | | 0 |
| Fredentco | F107-0695 | Malaytex | <NOT SPECIFIED> | $7.99 | $6.99 | | | | | | 0 |
| GloveSource, Inc. | 27837 | <NOT SPECIFIED> | Aster exam gloves | | | $5.95 | | | | | 0 |

To see more of the product table, click, hold and drag the horizontal dividing bar up.

FIG. 17

Dental-Purchasing.com

- Home
- ▶ Shop
- Order History
- Templates
- ▶ ShoppingCart
- ▶ Edit Account
- Help

PATC's Historical Product List For 01/01/1998 To Today

| Vendor | Product Code | Manufacturer | Brand | Description | History | |
|---|---|---|---|---|---|---|
| Arnold Dental Supply | AD111-2822 | Kodak | Ultraspeed DF-54 | #0 std (7/8" x 1 3/8") X-Ray film speed D ("ultraspeed") 1 film vinyl packet, box of 100 packets | Purchase Details | Current Price |
| Arnold Dental Supply | AD378-0937 | Premier | Sycamore wedges (Premier) | #13T anatomically shaped green Sycamore wood wedge (Premier), box of 400 wedges | Purchase Details | Current Price |
| Arnold Dental Supply | AD111-4404 | Kodak | Ultraspeed DF-57 | #2 std (1 1/4" x 1 5/8") X-Ray film speed D ("ultraspeed") 2 film vinyl packet, box of 150 packets | Purchase Details | Current Price |
| Arnold Dental Supply | AD333-6977 | GC America | Spacer Trays (GC America) | #300 green perforated lower right/upper left plastic impression tray, box of 12 trays | Purchase Details | Current Price |
| Arnold Dental Supply | AD333-0175 | GC America | Spacer Trays (GC America) | #31D green perforated lower left/upper right plastic impression tray, box of 12 trays | Purchase Details | Current Price |
| Arnold Dental Supply | AD135-7182 | Van R | GingiBraid | 2N #2 medium (non-impregnated) braided yarn retraction cord, tube of 120" cord (material not specified) | Purchase Details | Current Price |
| Arnold | | | | | | |

| Vendor | Vendor Code | Manufacturer | Brand | Description | Unit price | Quantity | Ext. price | History |
|---|---|---|---|---|---|---|---|---|
| Arnold Dental Supply | AD135-7182 | Van R | GingiBraid retraction cord | 2N #2 medium (non-impregnated) braided yarn retraction cord, tube of 120" cord (material not specified) | $4.80 | 1 | $4.80 | Purchase History |
| Arnold Dental Supply | AD378-0937 | Premier | Sycamore wedges (Premier) | #13T anatomically shaped green Sycamore wood wedge (Premier), box of 400 wedges. | $24.95 | 1 | $24.95 | Purchase History |
| Arnold Dental Supply | AD101-5385 | Banta Healthcare | Tidi Brand Deluxe bib | Mauve, plain rectangle (13 1/2" X 18") 3 ply paper/1 ply poly patient bib, case of 500 bibs. | $19.55 | 1 | $19.55 | Purchase History |
| Arnold Dental Supply | AD222-5589 | Dentsply/Caulk | Jeltrate alginate (Dentsply/Caulk) | Fast set alginate, 1 pound can. | $8.25 | 1 | $8.25 | Purchase History |
| Arnold Dental Supply | AD333-6977 | GC America | Spacer Trays (GC America) | #30D green perforated lower right/upper left plastic impression tray, box of 12 trays | $5.95 | 4 | $23.80 | Purchase History |

Current Shopping Cart:

You can change quantities by replacing the current quantity with a new one. To remove a product entirely, change the quantity to zero.

| Vendor | Vendor Code | Manufact. | Brand | Description | Unit price | Quantity | Ext. price | History |
|---|---|---|---|---|---|---|---|---|
| Arnold Dental Supply | AD111-7655 | Kodak | Ultraspeed DF-56 | #1 std (15/16" x 1 9/16") X-Ray film speed D ("ultraspeed") 1 film paper packet, box of 100 packets | $27.95 | 1 | $27.95 | |
| Arnold Dental Supply | 17839 | S.S.White | <NOT SPECIFIED> | FG #1/4 round carbide bur | $1.20 | 10 | $11.99 | |
| Carolina Dental Supply | CD228-1649 | Septodont | Lignospan | Lidocaine 2% local anesthetic with epinephrine 1:100,000, 1 can of 50 (1.8 ml) carpules | $13.25 | 1 | $13.25 | |
| Carolina Dental Supply | CD856-8483 | Kodak | Lidocaine | Lidocaine 2% local anesthetic with epinephrine 1:100,000, 1 can of 50 (1.8 ml) carpules | $13.50 | 1 | $13.50 | |
| Palm Beach Dental | 127-3747 | Kodak | Ultraspeed DF-56 | #1 std (15/16" x 1 9/16") X-Ray film speed D ("ultraspeed") 1 film paper packet, box of 100 packets | $29.49 | 1 | $29.49 | |
| | | | | | | Total: | $96.18 | |

[Recalculate] [Place Order] [Empty Cart] [Zero Qty's] [Create Quote] [Save As Template]

Have questions or need additional help? Contact staff@dental-purchasing.com

FIG. 22

Current Shopping Cart:

You can change quantities by replacing the current quantity with a new one.
To remove a product entirely, change the quantity to zero.

| Vendor | Vendor Code | Manufact. | Brand | Description | Unit price | Quantity | Ext. price | History |
|---|---|---|---|---|---|---|---|---|
| Arnold Dental Supply | AD111-7655 | Kodak | Ultraspeed DF-56 | #1 std (15/16" x 1 9/16") X-Ray film speed D ("ultraspeed") 1 film paper packet, box of 100 packets | $27.95 | 1 | $27.95 | |
| Arnold Dental Supply | 17839 | S.S.White | <NOT SPECIFIED> | FG #1/4 round carbide bur | $1.20 | 10 | $11.99 | |
| Carolina Dental Supply | CD228-1649 | Septodont | Lignospan | Lidocaine 2% local anesthetic with epinephrine 1:100,000, 1 can of 50 (1.8 ml) carpules | $13.25 | 0 | $0.00 Remove | |
| Carolina Dental Supply | CD856-8483 | Kodak | Lidocaine | Lidocaine 2% local anesthetic with epinephrine 1:100,000, 1 can of 50 (1.8 ml) carpules | $13.50 | 1 | $13.50 | |
| Palm Beach Dental | 127-3747 | Kodak | Ultraspeed DF-56 | #1 std (15/16" x 1 9/16") X-Ray film speed D ("ultraspeed") 1 film paper packet, box of 100 packets | $29.49 | 1 | $29.49 | |

Total: $82.93

[Recalculate] [Place Order] [Empty Cart] [Zero Qty's] [Create Quote] [Save As Template]

Have questions or need additional help? Contact staff@dental-purchasing.com

FIG.23

Dental-Purchasing.com

- Home
- ▶ Shop
- Order History
- Templates
- ▶ ShoppingCart
  - View/Edit
  - Recalculate
  - Place Order
  - Save As Template
  - Empty
- ▶ Edit Account
- Help

Current Shopping Cart:

You can change quantities by replacing the current quantity with a new one.
To remove a product entirely, change the quantity to zero.

| Vendor | Vendor Code | Manufact. | Brand | Description | Unit price | Quantity | Ext. price | History |
|---|---|---|---|---|---|---|---|---|
| Arnold Dental Supply | AD111-7655 | Kodak | Ultraspeed DF-56 | #1 std (15/16" x 1 9/16") X-Ray film speed D ("ultraspeed") 1 film paper packet, box of 100 packets | $27.95 | 1 | $27.95 | |
| Arnold Dental Supply | 17839 | S.S.White | <NOT SPECIFIED> | FG #1/4 round carbide bur | $1.20 | 10 | $11.99 | |
| Carolina Dental Supply | CD856-8483 | Kodak | Lidocaine | Lidocaine 2% local anesthetic with epinephrine 1:100,000, 1 can of 50 (1.8 ml) capsules | $13.50 | 1 | $13.50 | |
| Palm Beach Dental | 127-3747 | Kodak | Ultraspeed DF-56 | #1 std (15/16" x 1 9/16") X-Ray film speed D ("ultraspeed") 1 film paper packet, box of 100 packets | $29.49 | 1 | $29.49 | |
| | | | | | | Total: | $82.93 | |

[Recalculate] [Place Order] [Empty Cart] [Zero Qty's] [Create Quote] [Save As Template]

Have questions or need additional help? Contact staff@dental-purchasing.com
© 1998, SimShop, Inc. All Rights Reserved.

FIG.23a

| | | | |
|---|---|---|---|
| #3 Gates Glidden drill, 32 mm, box of 6 drills. | $11.99 | 2 | $23.98 Purchase History |
| Sterile disposable 30 gauge short (1") metal hub needles, box of 100 needles | $8.39 | 4 | $33.56 Purchase History |
| 6" x 6" rubber dental dam, medium gauge, fruit scented, assortment of pink, blue, and purple. 1 square yard box (36 pieces of 6" x 6") | $9.49 | 3 | $28.47 Purchase History |
| FG #245 carbide bur | $1.10 | 30 | $32.97 Purchase History |
| FG #558 carbide bur | $1.10 | 30 | $32.97 Purchase History |
| FG #7901 12 blade needle shaped finishing bur | $4.99 | 5 | $24.95 Purchase History |
| FG #7408 12 blade egg shaped finishing bur | $4.99 | 5 | $24.95 Purchase History |
| | | Total: | $818.50 |

Product Purchase History

Vendor: Palm Beach Dental
Manufacturer: S.S.White
Brand: NOT SPECIFIED

FG # 558 carbide bur

Time Frame Totals

| Time Frame | Quant. | Total Cost |
|---|---|---|
| Last 30 Days | 0 | $0.00 |
| Last 90 Days | 0 | $0.00 |
| Last 180 Days | 30 | $32.97 |
| Last Year | 30 | $32.97 |
| All Orders | 30 | $32.97 |

Product Purchase History

| Order # | Date | Quant. | Unit Price | Total |
|---|---|---|---|---|
| 262 | 10/2/98 7:10:00 AM | 30 | $1.10 | $32.97 |

Close

Dental-Purchasing.com Savings Quote

| Vendor | Vendor Code | Description | Unit price | Ext. price | Your Ext. Price | Your Unit Price | Your Vendor |
|---|---|---|---|---|---|---|---|
| Arnold Dental Supply | A0111-7655 | #1 std (15/16" x 1 9/16") X-Ray film speed D ("ultraspeed") 1 film paper packet, box of 100 packets | $27.95 | $27.95 | $31.95 | $31.95 | Vendor A |
| Arnold Dental Supply | 17839 | FG #1/4 round carbide bur | $1.20 | $11.99 | $14 | $1.40 | Vendor A |
| Carolina Dental Supply | C0856-8483 | Lidocaine 2% local anesthetic with epinephrine 1:100,000, 1 can of 50 (1.8 ml) capsules | $13.50 | $13.50 | $14.95 | $14.95 | Vendor B |
| Palm Beach Dental | 127-3747 | #1 std (15/16" x 1 9/16") X-Ray film speed D ("ultraspeed") 1 film paper packet, box of 100 packets | $29.49 | $29.49 | $ | $ | |
| | | | Total: | $82.93 plus s/h | $60.90 plus s/h | | |

As per your request, we have placed your order history into our system. Your order is on the right while the lowest prices in our database are listed on the left. When you return to the main search page of Dental-Purchasing.Com and select Order History, you will be able to use this quote as a template for your next order. You will, of course, be able to use this pre-formed shopping cart as is or modify it to match your current needs. We look forward to helping you save time and money on your dental supply purchasing. Please let us know if there is any other way that we can be of service.

| Vendor | Vendor Code | Description | Unit price | Ext. price | Your Ext. Price | Your Unit Price | Your Vendor |
|---|---|---|---|---|---|---|---|
| Arnold Dental Supply | AD111-7655 | #1 std (15/16" x 1 9/16") X-Ray film speed D ("ultraspeed") 1 film paper packet, box of 100 packets | $27.95 | $27.95 | $31.95 | $31.95 | Vendor A |
| Arnold Dental Supply | 17839 | FG #1/4 round carbide bur | $1.20 | $11.99 | $14.00 | $1.40 | Vendor A |
| Carolina Dental Supply | CD856-8483 | Lidocaine 2% local anesthetic with epinephrine 1:100,000, 1 can of 50 (1.8 ml) carpules | $13.50 | $13.50 | $14.95 | $14.95 | Vendor B |
| Palm Beach Dental | 127-3747 | #1 std (15/16" x 1 9/16") X-Ray film speed D ("ultraspeed") 1 film paper packet, box of 100 packets | $29.49 | $29.49 | $31.49 | $31.49 | Vendor B |
| | | Total: | | $82.93 plus s/h | $92.39 plus s/h | | |

Dental-Purchasing.com

- Home
- ▲ Shop
- Order History
- Templates
- ▼ ShoppingCart
  - View/Edit
  - Recalculate
  - Place Order
  - Save As Template
  - Empty
- ▲ Edit Account
- Help Allow Substitution of Products? (Default is No To All)  [Yes To All]

| Vendor | Vendor Code | Manufact. | Brand | Description | Unit Price | Quan. | Ext. Price | Substitution |
|---|---|---|---|---|---|---|---|---|
| Arnold Dental Supply | AD111-7655 | Kodak | Ultraspeed DF-56 | #1 std (15/16" x 1 9/16") X-Ray film speed D ("ultraspeed") 1 film paper packet, box of 100 packets | $27.95 | 1 | $27.95 | ○ Yes  ⊙ No |
| Arnold Dental Supply | 17839 | S.S.White | <NOT SPECIFIED> | FG #1/4 round carbide bur | $1.20 | 10 | $11.99 | ○ Yes  ⊙ No |
| Carolina Dental Supply | CD856-8483 | Kodak | Lidocaine | Lidocaine 2% local anesthetic with epinephrine 1:100,000, 1 can of 50 (1.8 ml) carpules | $13.50 | 1 | $13.50 | ○ Yes  ⊙ No |
|  |  |  |  |  |  | Total: | $53.44 plus s/h |  |

[Order]  [Search Again]  [Cancel Order]

Have questions or need additional help? Contact staff@dental-purchasing.com
© 1998, SimShop, Inc. All Rights Reserved.

FIG. 37

Dental-Purchasing.com
Order Confirmation

Order: #DP0359
Mr. James R Evans
SimShop
104 Tapestry Terrace
Cary, NC 27511

Thank you for your order. Your order has been assigned order number DP0359. Please refer to this order number if you have any questions about your order.
NOTE: Please allow about 1 week for delivery of the items on your order. For your convenience your order is displayed below. For your records you may want to print this confirmation form which contains the products you ordered as well as your assigned order number.

| Vendor | Vendor Code | Manufact. | Brand | Description | Unit Price | Quan. | Ext. Price | Substitution |
|---|---|---|---|---|---|---|---|---|
| Arnold Dental Supply | AD111-7655 | Kodak | Ultraspeed DF-56 | #1 std (15/16" x 1 9/16") X-Ray film speed D ("ultraspeed") 1 film paper packet, box of 100 packets | $27.95 | 1 | $27.95 | Not Allowed |
| Arnold Dental Supply | 17839 | S.S.White | <NOT SPECIFIED> | FG #1/4 round carbide bur | $1.20 | 10 | $11.99 | Not Allowed |
| Carolina Dental Supply | CD856-8483 | Kodak | Lidocaine | Lidocaine 2% local anesthetic with epinephrine 1:100,000, 1 can of 50 (1.8 ml) carpules | $13.50 | 1 | $13.50 | Not Allowed |

Dental-Purchasing.com

- Home
- ▶ Shop
- Order History
- Templates
- ▶ ShoppingCart
  - View/Edit
  - Recalculate
  - Place Order
  - Save As Template
  - Empty
- ▶ Edit Account
- Help

FIG.39

Become A Member...It's Easy!

Just enter Your name and email address

Name: [Dr. ▼] First: [____] MI: [_] Last: [____]

Email: [_____]

Note: Your email address is used to send your new account name securely. We will never sell your address to anyone else.

Please Choose a Password

Password: [_____]

(Password must be at least 5 and no more than 14 characters.)

Confirm password: [_____]

How Did You Hear about Us?

| TradeShow | Magazines | Other |
|---|---|---|
| ○ ADA | ○ Dental Products Report | ○ Surfing The Web |
| ○ LDA | ○ Dental Economics | ○ Speaker |
| | ○ Dentistry Today | ○ Word Of Mouth |
| | ○ Dental Practice And Finance | ○ Other [____] |

Press the "Finish" Button Below to Submit Info

[Finish] [Clear]

FIG. 40

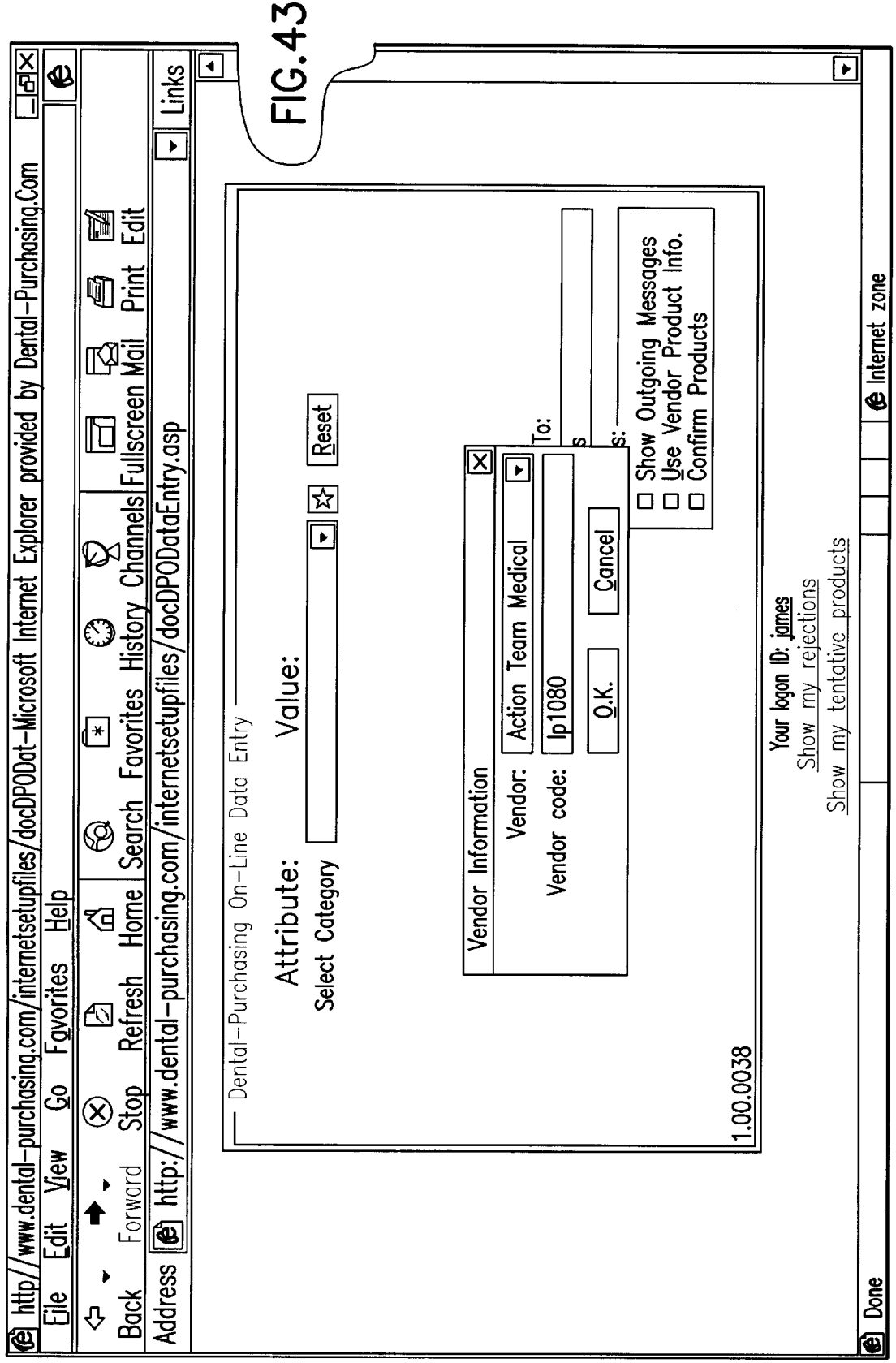

FIG. 44

Dental-Purchasing On-Line Data Entry

Attribute: Value:
Select Category [Infection control-personal ▼]
Personal protection subcategory [Gloves ▼]
Glove material [Latex ▼]
Glove sterility [Non-sterile ▼]
Glove powdering [Powdered ▼]
Glove chlorination [Non-chlorinated ▼]
Glove texture [Smooth ▼]
Glove color [Natural ▼]
Glove flavor [Natural ▼]
Glove size/fitting [Large/not fitted ▼]
Glove packaging [Box of 100 gloves ▼]
[Add a Product For This Description]

[Reset]

Credit To:
[James]

Options:
☐ Show Outgoing Messages
☐ Use Vendor Product Info.
☐ Confirm Products

Your logon ID: james
Show my rejections
Show my tentative products 1.00.0038

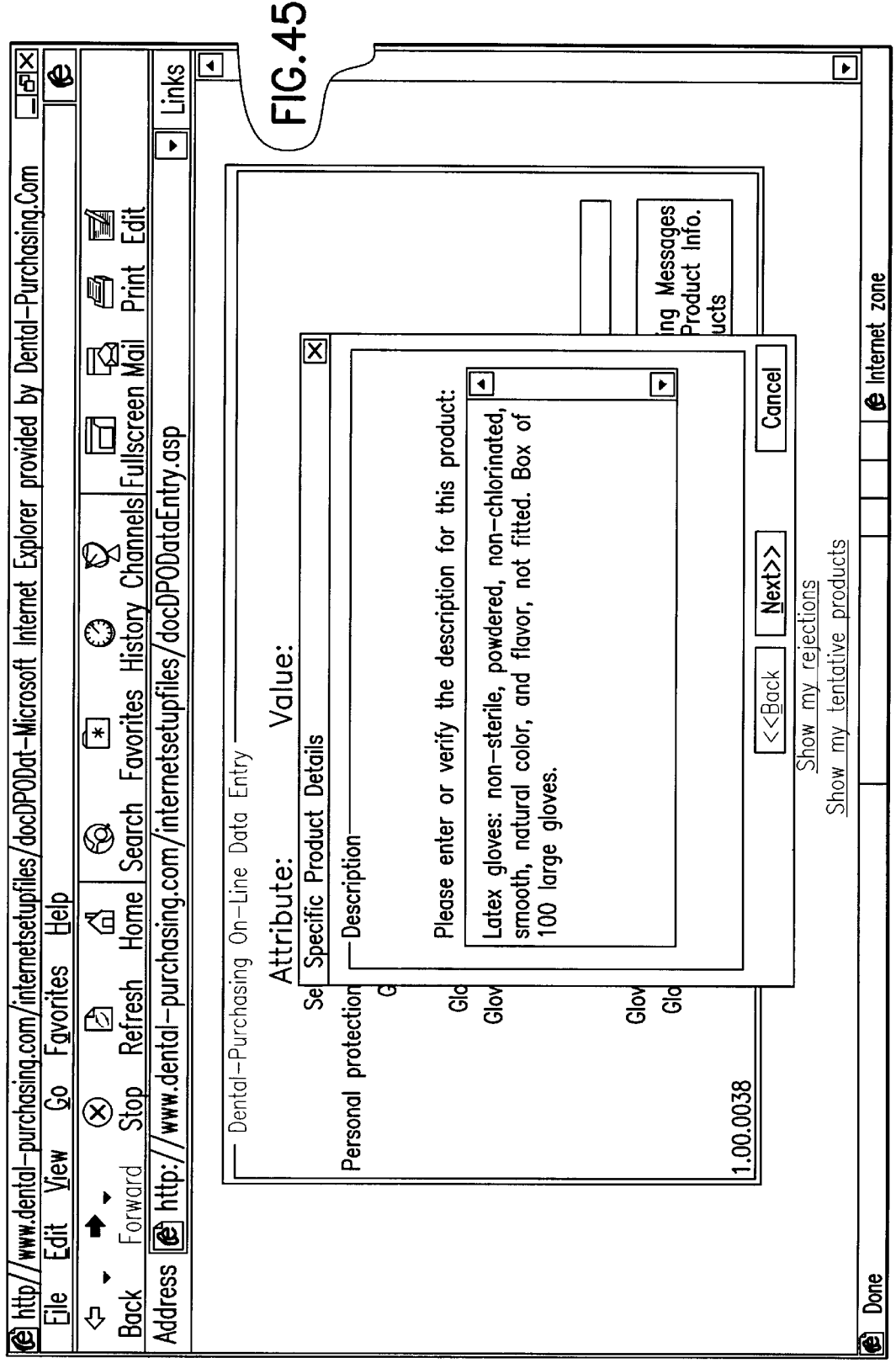

FIG.49

Dental Purchasing On-Line Data Entry
Attribute:       Value:

Dental Purchasing Online

Enter the following product for an existing description?
DESC.: Latex gloves: non-sterile, powdered, non-chlorinated, smooth, natural color and flavor, not fitted. Box of 100 large gloves.
SELECT CATEGORY: Infection control-personal
PERSONAL PROTECTION SUBCATEGORY: Gloves
GLOVE MATERIAL: Latex
GLOVE STERILITY: Non-sterile
GLOVE POWDERING: Powdered
GLOVE CHLORINATION: Non-chlorinated
GLOVE TEXTURE: Smooth
GLOVE COLOR: Natural
GLOVE FLAVOR: Natural
GLOVE SIZE: Large/not fitted
GLOVE PACKAGING: Box of 100 gloves
MANUFACTURER: Not Specified
BRAND: Not Specified
VENDOR: Action Team Medical
VENDOR CODE: xxxyy
CREDIT TO: James
PRICE FOR 1: $100.00
PRICE FOR 2: $195.00

Yes    No

DPOnline Report
Data Entry [Vendor Products]: 11/01/1998 – 01/19/1999

| User ID | Number Of Vendor Products Entered | Amount |
|---------|-----------------------------------|--------|
| LCE0    | 40                                | $0.00  |
| LDD0    | 184                               | $46.00 |

FIG.53

DENTAL-PURCHASING.COM
1 COPLEY PARKWAY SUITE 106
MORRISVILLE, N.C. 27560
TEL.(919)462-9844
FAX(919)462-9845

| INVOICE NO |
|---|
| 38 |
| INVOICE DATE |
| 1/11/99 |

PAGE 1

| TERMS |
|---|
| DUE ON RECEIPT |

TEL.(800) 562-6645   FAX (425) 712-8677

| REF No. | ORDER DATE | DESCRIPTION | QTY | UNIT PRICE | EXTENDED PRICE | COMMISSION DUE |
|---|---|---|---|---|---|---|
| 334 | 11/29/98 | AD547-7896 | 2 | 28.50 | 57.00 | 3.42 |
| 334 | 11/29/98 | AD111-4404 | 4 | 38.95 | 155.80 | 9.35 |
| 334 | 11/29/98 | AD222-4179 | 2 | 30.95 | 61.90 | 3.71 |
| 334 | 11/29/98 | 385265 | 100 | 0.94 | 93.50 | 5.61 |
| 341 | 12/3/98 | AD135-7651 | 1 | 21.50 | 21.50 | 1.29 |
| 341 | 12/3/98 | AD777-0374 | 6 | 20.50 | 123.00 | 7.38 |
| 341 | 12/3/98 | AD333-6628 | 1 | 22.95 | 22.95 | 1.38 |
| 343 | 12/8/98 | AD600-3599 | 24 | 11.75 | 282.00 | 16.92 |
| 345 | 12/12/98 | ADRDC27HF | 2 | 6.35 | 12.70 | 0.76 |
| 345 | 12/12/98 | ADRDC561 | 2 | 7.45 | 14.90 | 0.89 |
| 345 | 12/12/98 | 382523 | 5 | 4.70 | 23.50 | 1.41 |
| 346 | 12/15/98 | AD856-0233 | 10 | 12.79 | 127.90 | 7.67 |
| 346 | 12/15/98 | AD111-2876 | 5 | 28.95 | 144.75 | 8.69 |
| 350 | 12/16/98 | AD777-4266 | 1 | 19.45 | 19.45 | 1.17 |
| 350 | 12/16/98 | 14733 | 20 | 1.20 | 23.98 | 1.44 |
| 350 | 12/16/98 | AD378-9199 | 20 | 6.95 | 139.00 | 8.34 |
| 350 | 12/16/98 | 382510 | 10 | 4.70 | 47.00 | 2.82 |
| 350 | 12/16/98 | 382524 | 10 | 4.70 | 47.00 | 2.82 |
| 350 | 12/16/98 | AD0402CA | 1 | 14.95 | 14.95 | 0.90 |
| 352 | 12/18/98 | AD856-3210 | 10 | 12.79 | 127.90 | 7.67 |
| 352 | 12/18/98 | AD312-6828 | 10 | 4.85 | 48.50 | 2.91 |
| COMMENTS: | | | | | SUB-TOTAL: | $96.55 |
| | | | | | OTHER: | 0.00 |
| | | | | | PLEASE PAY: | 96.55 |

<DUPLICATE COPY>

RptTransactionList

OrderHeaderID
CreatedOn
VendorID
VendorName
VendorProductCode
Quantity
PricePerUnit
Invoiced
QuoteOnly

RptInvoiceHeader

InvoiceNum
InvoiceDate
VendorID
Inv_ContactInfoID
TotalCommDue
AmtReceived
BalanceDue
PercentComm

RptInvoiceLine

InvoiceLineID
InvoiceNum
OrderHeaderID
VendorProductCode
Quantity
UnitPrice
SubTotal
CommDue
OrderDate

InvoiceHeader

InvoiceNum
InvoiceDate
VendorID
Inv_ContactInfoID
TotalCommDue
AmtReceived
BalanceDue
PercentComm

InvoiceContactInfo

InvoiceContactInfoID
InvoiceNum
FormOfAddress
FirstName
MiddleInitial
LastName
CompanyName
BirthDate
Email
CountryID
StateID
City
Address1
Address2
PostalCode
PhoneAreaCode
Phone
PhoneExt
FaxAreaCode
Fax
FaxExt
Note

InvoiceLine

InvoiceLineID
InvoiceNum
OrderHeaderID
VendorProductCode
Quantity
UnitPrice
SubTotal
CommDue
OrderDate

Customer Call Tracking

Tabs: Administrative | Billing | Shipping

<<Previous  1 of 1  Next>>

| Field | Value |
|---|---|
| Name | |
| Form of Address | <NOT SPECIFIE <NOT SPECI |
| Birth Date | 01/01/00 |
| Email | <NOT SPECIFIED> |
| Company | <NOT SPECIFIED> |
| Phone | 999  9999999 |
| Fax | |
| Address | <NOT SPECIFIED> |
| City | <NOT SPECIFIED> |
| State | AA(Armed Forces Americas) |
| Postal Code | 000000000 |
| Country | United States |
| Notes | |

Buttons: New Call | View Calls | Credit Card Info | Dentist Info | Edit | Save | Close Desktop icons: My Computer, Network Neighborhood, Internet Explorer, Recycle Bin, Progression Explorer, Outlook Express, real RealPlayer G2, Shortcut to data on D.., CustomerSet..., DPOAdminU..., Job description for college c, shortcut to Error Tracking Start | Customer Call Tracking    2:55 PM

CATEGORY CREATION PROCEDURE
FOR REMAINING SUB-CATEGORIES

OBJECTIVE: TO ESTABLISH A DATABASE STRUCTURE AND POPULATE IT IN SUCH A WAY THAT PRODUCTS CAN BE EASILY AND LOGICALLY IDENTIFIED BY THE MAJORITY OF GENERAL DENTAL PRACTITIONERS.

LEVEL 3: STRUCTURE CREATION
    ESTABLISH CATEGORIZATION STRUCTURE &
    DOCUMENT INDUSTRY NUANCES

LEVEL 2: DATA ENTRY
    BUILD DATABASE STRUCTURE ESTABLISHED BY LEVEL 3
LEVEL 1: DATA ENTRY
    POPULATE DATABASE ESTABLISHED BY LEVEL 2
LEVEL 0: QUALITY ASSURANCE
    VERIFY SUB-CATEGORY AND VENDOR COMPLETENESS

| LEVEL 3 | | LEVEL 2 & 1 | LEVEL 0 |
|---|---|---|---|
| ATTRIBUTE CREATION | DATA PREPARATION | DATA ENTRY & APPROVAL | QUALITY ASSURANCE |
| SANDY | SID | TEAM 1<br>VAL & WES | JASON |
| LORI | SANDY | TEAM 2<br>KEVIN & DANIEL | DERRICK |
| BILL | LORI | TEAM 3<br>DERRICK & REMOTE | ALANE |
| | ALANE | | |

APPROXIMATELY 200 CATEGORIES

FIG. 71

INTERNET-BASED ON-LINE COMPARISON SHOPPING SYSTEM AND METHOD OF INTERACTIVE PURCHASE AND SALE OF PRODUCTS

BACKGROUND OF THE INVENTION

1. Field of the Invention

The present invention relates to a computer network-based on-line comparison shopping system and method of interactive purchase and sale of products, as well as component subsystems, modules and aspects of such system, and constituent approaches and methodological aspects associated with such method of interactive purchase and sale of products.

2. Description of the Related Art

With the proliferation of networked computer systems, including the World Wide Web (Internet), there has been a corresponding evolution of and interest in electronic commerce.

Electronic commerce (or e-commerce, as it is sometimes called) involves on-line accessing of information about purveyed goods and services, and the associated capability to electronically effectuate a transaction involving selected goods and/or services (collectively referred to herein as "products"). Although this medium of electronic transactions is still in its infancy, the development of encryption and other, security features has propelled this form of commerce from a small-scale emergence to an ever-increasing level of prominence in industrial transactions as well as consumer shopping and on-line purchases.

The art therefore has developed a variety of forms of transactional sites for on-line purchase and sale transactions, and these continue to evolve. Aside from obvious security requirements, there is a need for purveyed products and services to be quickly and efficiently assessed by the prospective purchaser for decision-making purposes, and for the transaction to be similarly quickly and efficiently effectuated once a decision has been made. Further, there is a need for information for the making of a purchase decision based on comparison of the purveyed products, as to their features, such as overall price, unit price, volume discounts, quality, and/or source. Furthermore, there is a need for enabling consumers to view such information in a readily assimilated format, such as a grid or matrix format that may be proprietary to the shopping site. Additionally, there is a need of a prospective purchaser for access to his or her prior purchase history, to facilitate repeat purchases or simplification of the decisional processes involved in a current purchase transaction.

It accordingly is an object of the present invention to provide a computer network-based on-line comparison shopping system and method of interactive purchase and sale of products, that meet the aforementioned needs and objectives.

Relative to the system and methodology of the present invention, art relevant to the invention includes the following.

U.S. Pat. No. 5,842,178 issued Nov. 24, 1998 to Joseph Giovannoli describes a computerized quotation system and method in which buyers formulate requests for quotation and transmit them to a computerized network which broadcasts the request for quotation to prospective sellers based on filter conditions set by the buyer and/or seller and/or computer network operator. The filter-compatible sellers' responses are communicated to the prospective buyer either over the communications network or via other communication means.

U.S. Pat. No. 5,692,132 issued Nov. 25, 1997 to Edward J. Hogan describes a commercial transaction system for interaction by a user of a personal computer with Internet-based merchant computers to conduct cashless transactions, in which the amount of the transaction is deducted from a balance and the balance can be reset.

U.S. Pat. No. 5,757,917, issued May 26, 1998 to Marshall T. Rose, et al. discloses a network-based commercial transaction system for communication between qualified user-sellers and user-buyers, utilizing an authorization code and encryption to achieve secure transactions.

U.S. Pat. No. 5,835,712, issued Nov. 10, 1998, to Fred DuFresne, discloses a system and method using a template, accessible to both client and server, for constructing Web source text. The source text includes HTML tag extensions for implementing dynamic Web environment. The tag extensions are nested and grouped to form scripts to perform specific tasks, such as state construction and on-line data arrangement. Each tag extension or script is expanded and replaced with data value to be embedded within a traditional HTML tag. A processor is employed to process templates and execute tag extensions therein, and produces pages in pure HTML form for displaying by any Web browser.

U.S. Pat. No. 5,715,314, issued Feb. 3, 1998, to Andrew C. Payne, discloses a network-based sales system which includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

U.S. Pat. No. 5,825,881, issued Oct. 20, 1998, to Bryan Colvin, Sr. teaches a system for conducting commerce over a large public network such as the Internet which facilitates communications between a merchant, a customer, and a bank or credit card processor.

Commercial on-line shopping sites having comparison shopping capability include the following Web sites: www.acses.com; www.bottomdollar.com; www.buying-guide.com; www.comparenet.com; www.consumerworld.org; www.jango.com; www.junglee.com; and www.shopfind.com.

It is another object of the present invention to provide a computer network-based on-line comparison shopping system and method of interactive purchase and sale of products, that provides comparison shopping capability via a dynamic database permitting access by a prospective purchaser to the products and/or services of a variety of vendors and products, by selecting a variety of attributes for custom shopping.

It is yet another object of the present invention to provide a searchable database and on-line shopping system comprising same, in which a search of the database yields a uniformly productively result (a definite selected result), in contrast to the state of the art database systems, such as those conventionally used for word searching, which can result in a "dead end" result (e.g., a search that has no matches, or a system request for clarification).

It is a still further object of the invention to provide a computer network-based on-line comparison shopping system and method of interactive purchase and sale of products, that permits a prospective purchaser to construct custom order templates, optionally based on or incorporating information from prior purchase transactions, in a quick and easily effected manner.

Other objects and advantages of the invention will be more fully apparent from the ensuing disclosure and appended claims.

SUMMARY OF THE INVENTION

The present invention relates generally to a computer network-based on-line comparison shopping system and method of interactive purchase and sale of products.

In one aspect, the invention relates to a searchable database comprising a multiplicity of tables including an attributes table and a values table for a multiplicity of target search items constructed and arranged so that selection of values for one or more target search item attributes yields an attribute-value construct specifying a particular one of said target search items and precluding an indeterminate search result.

Another aspect of the invention relates to an online comparison shopping system comprising: a searchable database containing product selection information for products from different sources; and a user interface operatively coupled to said database for user manipulation thereof to select product(s) based on product selection information and constructed and arranged to communicate ordering information to source(s) of selected product(s).

A further aspect of the invention relates to an online comparison shopping system comprising a database containing product information of multiple vendors, manufacturers and/or products and a user interface generating a virtual shopping cart, and constructed and arranged to enable a user to selectively aggregate an order in said virtual shopping cart, comprising products represented in said database, and means for electronically disaggregating said order to generate vendor-specific orders to respective vendors.

Yet another aspect of the invention relates to a computer network-based on-line comparison shopping system, comprising an operational World Wide Web site having the description, content, look, feel, function, structure, architecture, operation, sensory features, aesthetic characteristics and substance of the World Wide Web site "Dental-Purchasing.com."

A further aspect of the invention relates to a method of conducting electronic commerce involving online comparison shopping comprising providing a database containing product information of multiple vendors, manufacturers and/or products, and a user interface generating a virtual shopping cart, and manipulating said user interface to selectively aggregate an order in said virtual shopping cart, comprising products represented in said database, and electronically disaggregating said order to generate vendor-specific orders to respective vendors.

In another method aspect, the invention relates to a method of constructing and populating a database with a series of standardized product descriptors which can be employed by a user to compare fungibly equivalent products from different sources to select product(s) therefrom, comprising identifying a set of attributes and establishing same in said database for said fungibly equivalent products, and establishing in said database a multiplicity of selectable values for each of said attributes wherein each of said values is independently selectable to define a unique attribute-value chain for a fungible product group.

An additional aspect of the invention relates to a comparative purchase process comprising: querying a database populated with a series of standardized product descriptors that can be employed by a user to compare fungibly equivalent products from different sources to select product(s) therefrom, wherein said database contains a set of attributes for said fungibly equivalent products and a multiplicity of selectable values for each of said attributes wherein each of said values is independently selectable to define a unique attribute-value chain for a fungible product group, wherein said query yields a attribute-value chain for a group of fungibly equivalent products; and generating a comparative selection grid comprising product information for said group of fungibly equivalent products thereby enabling the user to select a specific product from said comparative selection grid.

Another method aspect of the invention relates to a method of qualifying product data for inclusion in a database comprising: identifying a series of standardized product descriptors which characterize fungibly equivalent products from; different sources; identifying a set of attributes for said fungibly equivalent products; establishing a set of selectable values for each of said attributes wherein each of said values is independently selectable to define a unique attribute-value chain for a group of fungibly equivalent products; and verifying the accuracy of attribute-value chain information as a condition for entry in the database.

Another method aspect of the invention relates to a method of interactive purchase and sale of products, comprising the steps of providing an operational World Wide Web site having the description, content, look, feel, function, structure, architecture, operation, sensory features, aesthetic characteristics and substance of the World Wide Web site "Dental-Purchasing.com," selecting products by comparison shopping to determine the products meeting a predetermined selection criterion, and placing an order at said World Wide Web site for subsequent shipment.

Yet another aspect of the invention relates to a computer network-based on-line comparison shopping system, comprising an operational World Wide Web site having the description, content, look, feel, function, structure, architecture, operation, sensory features, aesthetic characteristics and substance of the World Wide Web site "Dental-Purchasing.com."

The invention in another aspect relates to a method of interactive purchase and sale of products, comprising the steps of providing an operational World Wide Web site having the description, content, look, feel, function, structure, architecture, operation, sensory features, aesthetic characteristics and substance of the World Wide Web site "Dental-Purchasing.com," selecting products by comparison shopping to determine the products meeting a predetermined selection criterion, and placing an order at said World Wide Web site for subsequent shipment.

Additional aspects, features and embodiments of the invention will be more fully apparent from the ensuing disclosure and appended claims.

BRIEF DESCRIPTION OF THE DRAWINGS

FIGS. 56–58 together form a schematic representation of the content of a dynamic database constructed to carry out an on-line purchase and sale transaction in accordance with the method of the invention, in one embodiment thereof.

FIGS. 59–70 show various screens constituting graphical user interface output of a Web site software computer program according to another aspect of the invention, deriving from a Customer Service Utility module of such software program.

FIG. 71 is a schematic representation of a relational product entry procedure for existing and/or new vendors, to input product information and to ensure its quality.

DETAILED DESCRIPTION OF THE INVENTION, AND PREFERRED EMBODIMENTS THEREOF

Figure 1:
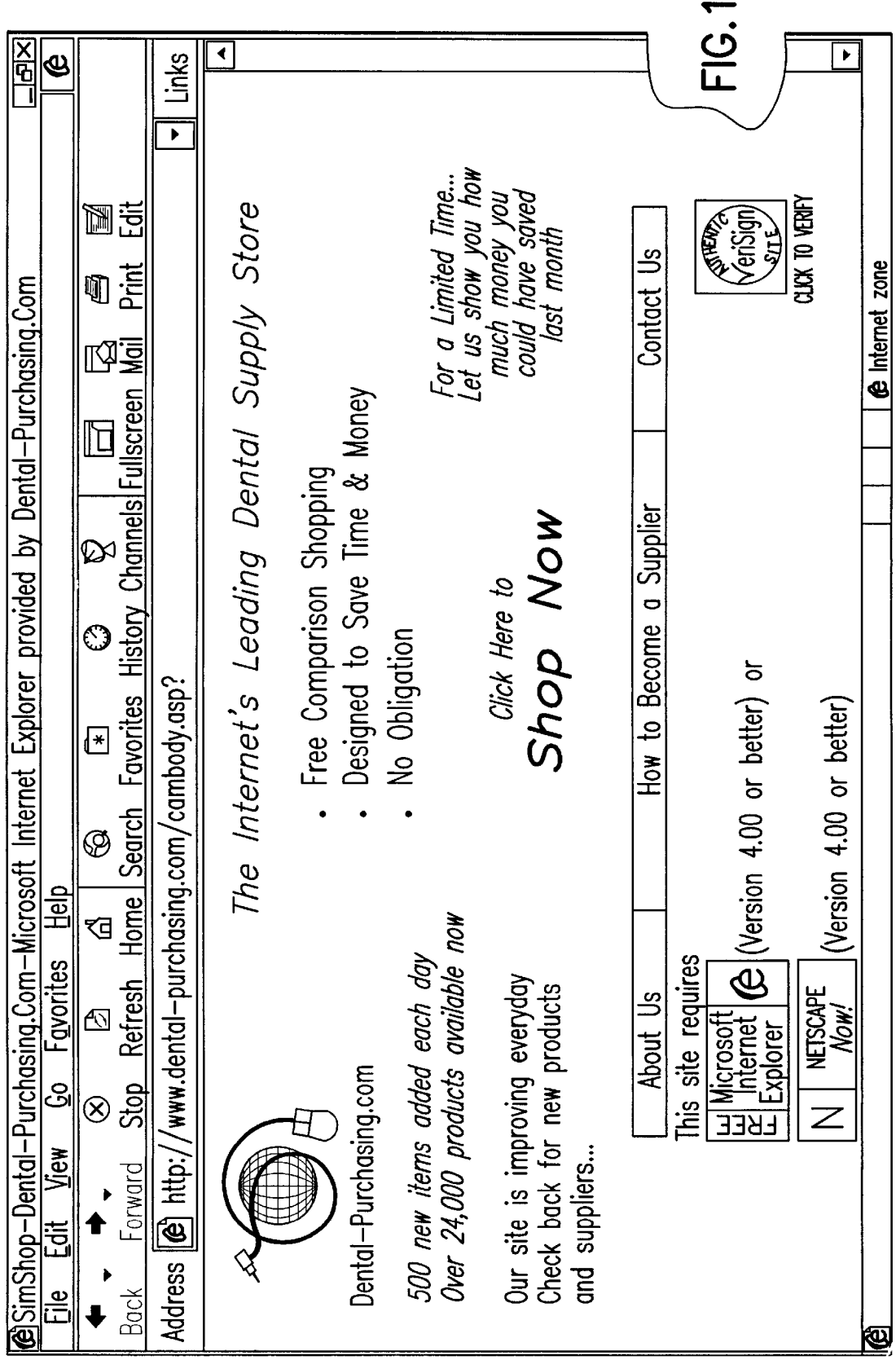
FIGS. 1–54 are representations of screens constituting various views of a graphical user interface and reports generated by a computer program for a computer network-based on-line comparison shopping system that may be used to conduct a method of interactive purchase and sale of products, in accordance with one embodiment of the invention.
Figure 2:
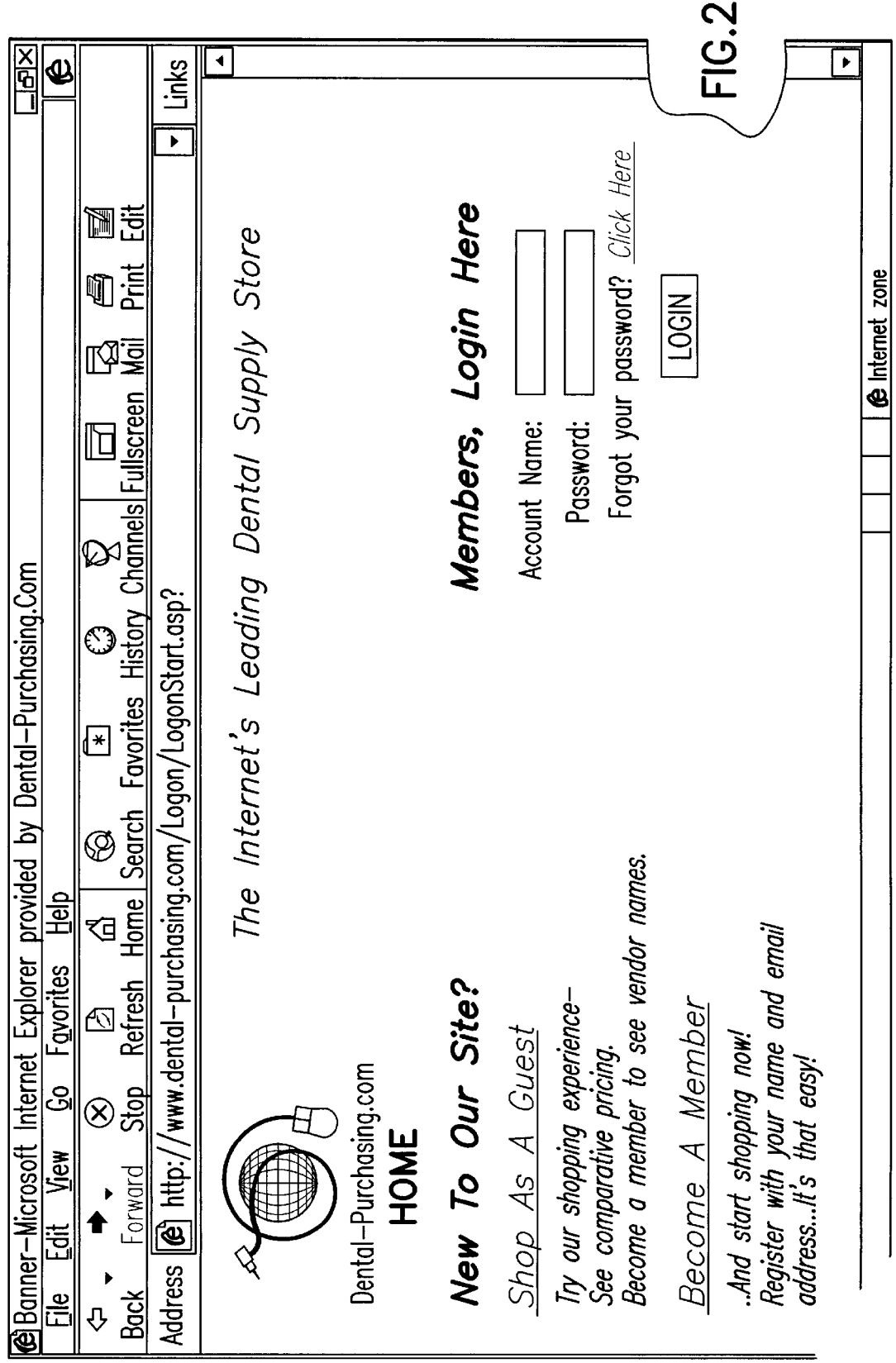

While the ensuing description is directed primarily to a Web-based system, it will be recognized by those of skill in the art that the invention may be utilized by and embodied in other networks or data processing systems.

The present invention provides a computer network-based on-line comparison shopping system and method of interactive purchase and sale of products, that in one embodiment features a dynamic database of goods and/or services by attributes that facilitate shopping for the purveyed products, and which generally enables the prospective purchaser to definitively (no empty search or dead-end results) access comparative information about the goods and/or services of interest, and permits the decisional processes and implementation of an order for the desired products to be quickly, securely and effectively achieved.

The present invention, in one aspect, utilizes a shopping cart that is selectively aggregatable and disaggregatable, in assembly of an order and subsequent order processing. By this feature, the system of the present invention achieves a capability not realized by online shopping systems of the prior art.

The system of the applicants' invention for online shopping, embodies product information of multiple vendors, manufacturers and products, thereby enabling the user to selectively aggregate an order in the virtual shopping cart across the spectrum of such vendors, manufacturers and products. Once the order has been assembled, the order is electronically disaggregated by the software to produce vendor-specific orders which are transmitted to each individual vendor whose products have been selected.

Although the invention will be illustratively described hereinafter with reference to an exemplary system for on-line shopping and purchase/sale of dental products, it will be appreciated that the invention is not thus limited, but may be applied to any goods and/or services. Accordingly, the invention as described hereinafter is depicted by way of example only, and is not to be limitingly construed, as regards the nature and scope of the present invention.

The description, content, look and feel, function, structure, architecture, operation, sensory features, aesthetic characteristics and substance of the World Wide Web site "Dental-Purchasing.com" are hereby incorporated herein in their entireties.

The following embodiment relates to a World Wide Web Internet site and associated computer software and hardware for the comparison and purchase of dental supplies from multiple vendors. To facilitate comparison, all products are categorized by means of a dynamically generated database, as follows. Each product is assigned a series of descriptive attributes and a value for each attribute, as set out in Table 1 below.

In this manner, an attribute-value chain is created.

TABLE 1

Attribute-Value Chain

| Attribute | Value |
| --- | --- |
| Category | Anesthetic products |
| Anesthetic subcategory | Local anesthetic |
| Local anesthetic type | Lidocaine 2% |
| Local anesthetic vasoconstrictor | Epinephrine 1:50,000 |
| Local anesthetic packaging | 1 box of 50 1.8 ml carpules |

Each choice of value then can be used to determine the next applicable attribute. Each attribute can then have a potentially limitless number of values. Thus, although there is a 1:1 correspondence shown illustratively in Table 1, where each attribute is shown with a single corresponding value, it will be appreciated that many selected values may be applied to a single attribute. For example, the attribute "Category" may include not only "Anesthetic products" but also "Burs," "Liners," "Cosmetic dentistry," "Disposables," "Infection control," "Instruments," "X-ray products," etc.

Together, the attributes and the values form attribute-value chains that identify generic products in the database. Once a chain is formed (like the one in Table 1) a generic description based on the values of the chain is appended to the chain, e.g., Lidocaine 2% Local Anesthetic with Epinephrine 1:50,000, 1 Box of 50 (1.8 ml) Carpules This addition of the successive attributes and values finalizes the generic specification of a single product (denoted here as "Generic Product" or sometimes herinafter as a "DPO Product," the prefix DPO denoting a generic character of the product involved).

Figure 56A:
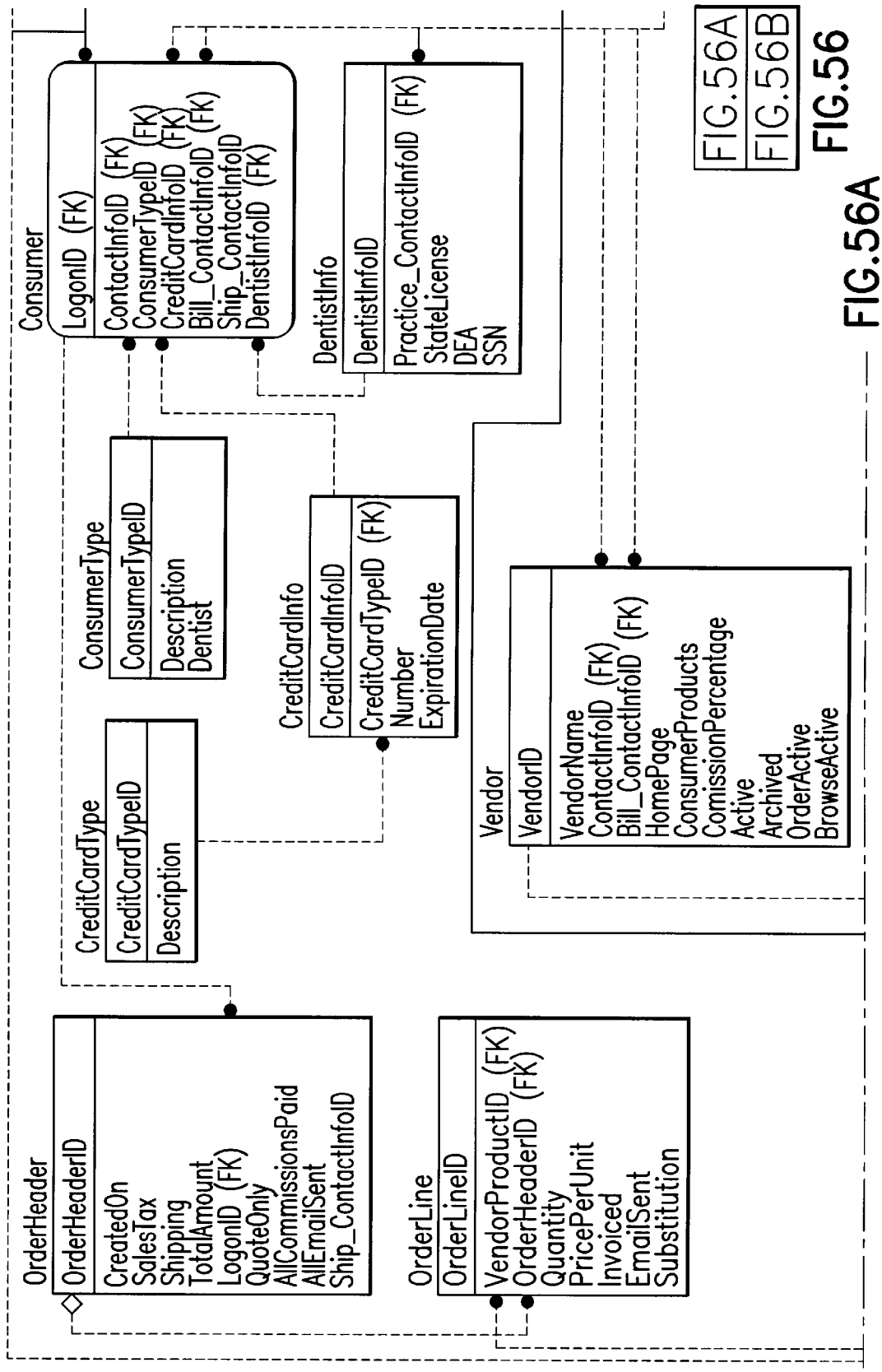
Figure 56B:
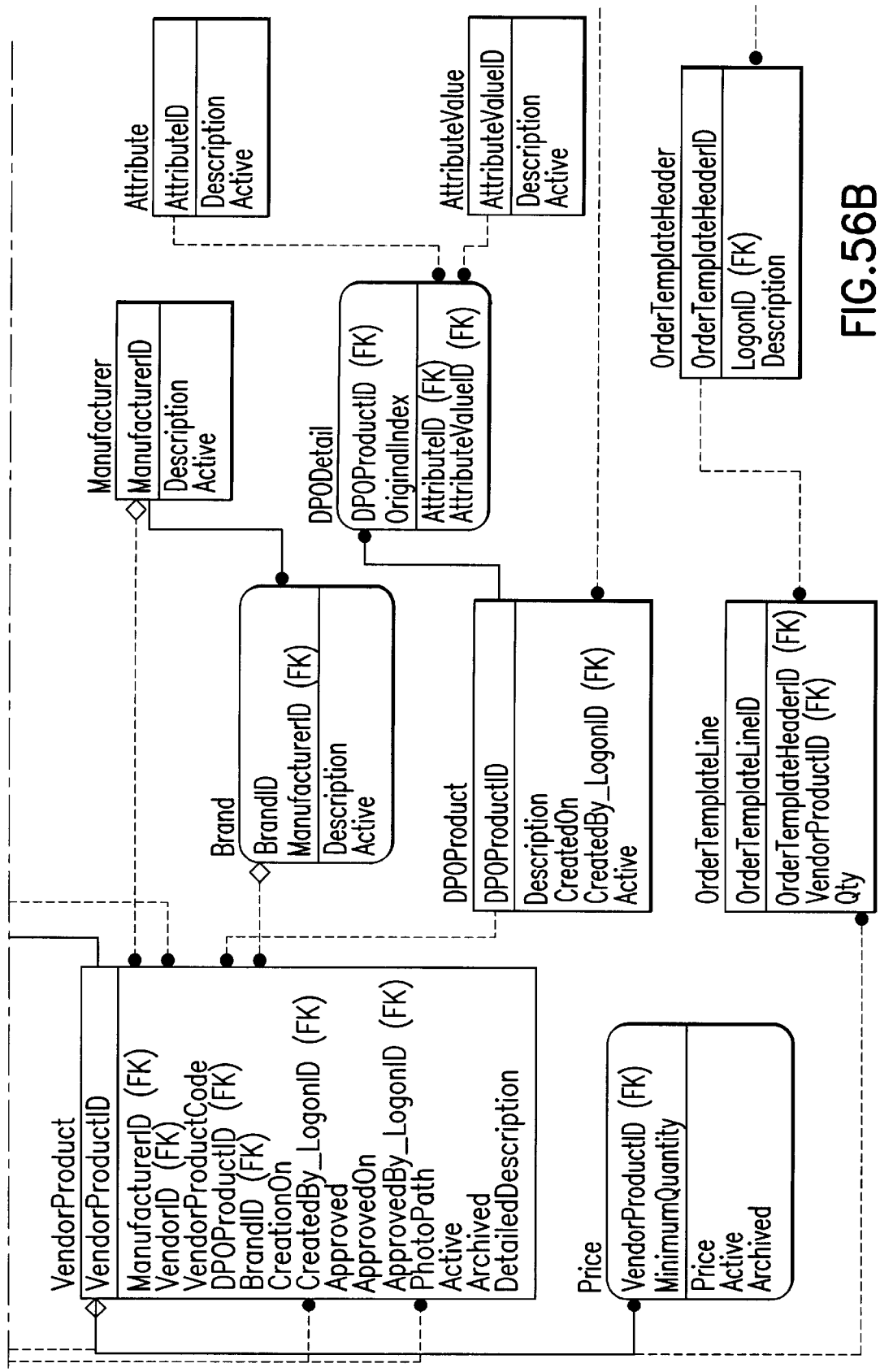
Figure 57A:
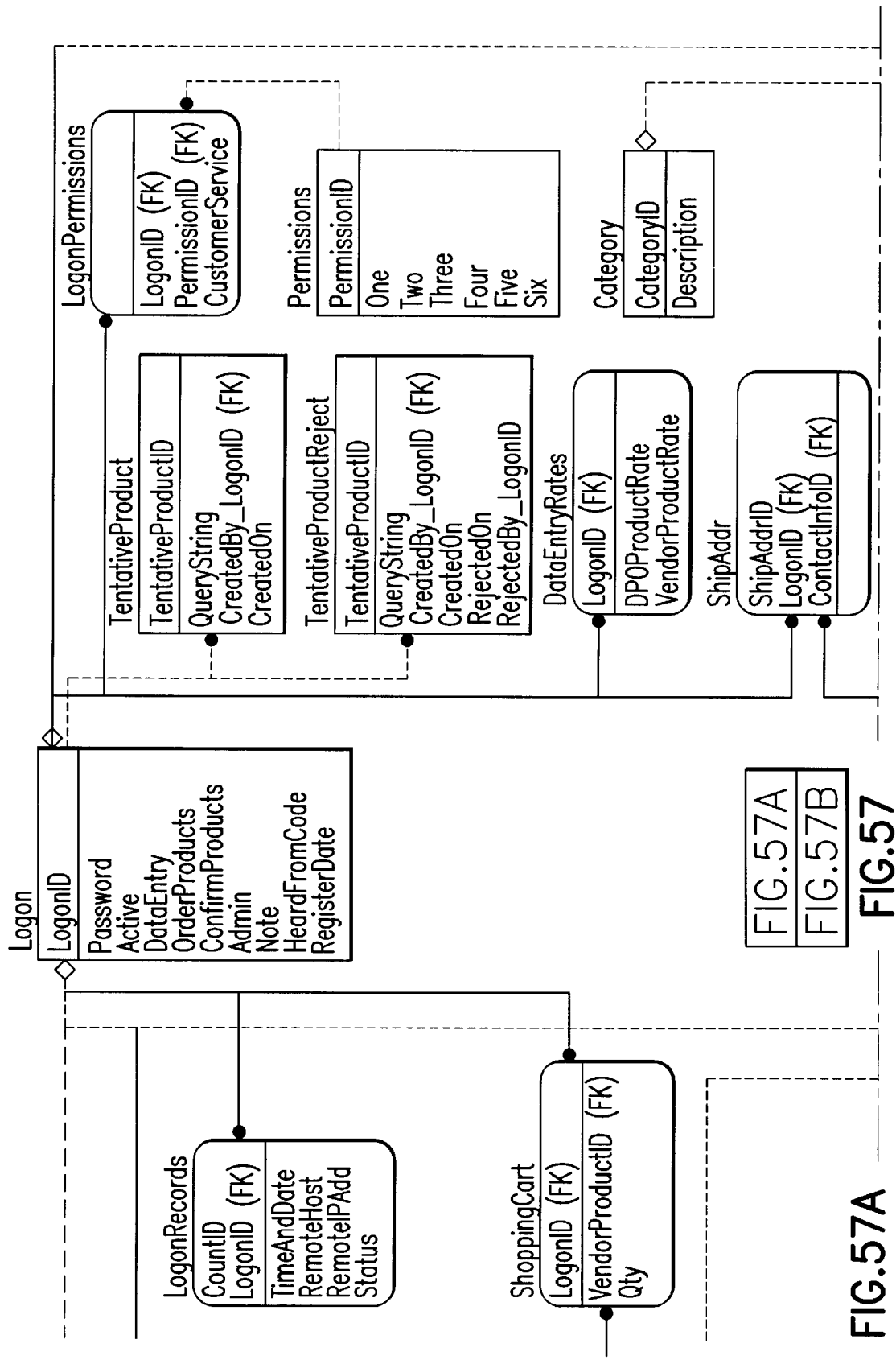
Figure 57B:
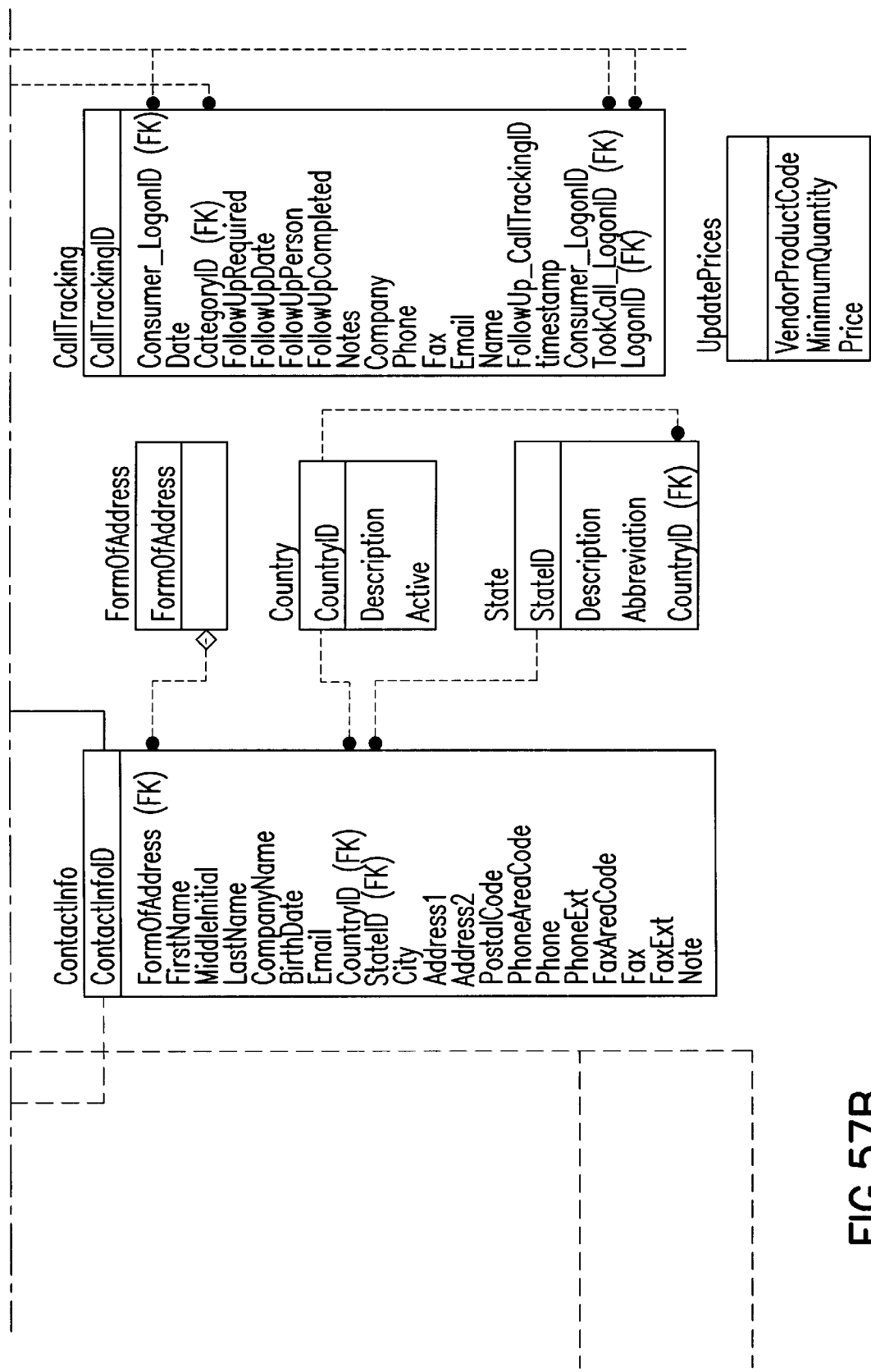

All of this information may, for example, be stored in a series of 4 database tables (see FIGS. 56–58, including an Attribute table, a Value table, a DPO Detail table (which stores the chains or attribute/value pairs), and a DPO Product table (which stores descriptions). Other meaningful information that is stored may include the date and time the product data was entered, the data entry operator who entered the product data, and a status of the product data (Active/Inactive).

At this time, Manufacturers, and Brands (if applicable) are also attached to the products. Next, this generic product data is associated with specific vendors to create a Vendor Product. Finally, quantity and pricing information is added, to produce an informational matrix, such as the matrix set out in Table 2 below.

TABLE 2

Search Results Grid

| Vendor | Product Code | Manufacturer | Brand | 1 | 5 | 10 | 20 |
|---|---|---|---|---|---|---|---|
| Carolina Dental Supply | CD365-5310 | Novocol | Octocaine | $12.25 | | $11.75 | |
| RJM Discount Dental | 0171-05279 | Novocol | Octocaine | $12.25 | | $11.45 | $10.95 |
| RJM Discount Dental | 0171-05281 | Septodont | Lignospan Forte | $12.65 | | $12.25 | $11.75 |
| Sullivan Schein | 365-5310 | Novocol | Octocaine | $13.49 | $12.99 | | $12.49 |

All of this information is preferably stored in another 5 tables (see FIGS. 56–58), including, for example, a Vendor Product table, a Vendor table, a Brand table, a Manufacturer table, and a Price table. Additionally, the Vendor's contact information is stored in a Contact Information table, along with the contact information (telephone and fax numbers, email addresses) of the vendor, for facilitating contact of the vendor by users of the on-line system. Other meaningful data that may be stored in the system includes date and time the product information was entered, the name of the individual who entered the product information, the status of products and vendors, the location of a picture of the product (if any), a detailed product description (if any), the location of vendor's Internet home page (if any), and the vendor's commission percentage, as paid by the vendor to the on-line system operator based on the sales of the vendor's wares at the on-line Web site in operation of the on-line system.

All of the above-described tables and relationships provide the user with an on-line shopping experience, in which the prospective buyer can search the database of product-related information in a variety of ways to find a specific item of information, and in which the prospective buyer can compare, on a proprietary search results grid, the pricing for a same basic product among several different vendors, manufacturers, and brands, including transactional terms such as quantity discounts. The word "proprietary" as used herein in reference to the search results grid refers to the fact that the database proprietor can readily conFigure the search results grid in a distinctive manner that is unique to a given Web site or application of such system.

The search mechanisms that may be embodied in and/or facilitated by the software and hardware on-line shopping system include search capabilities by:

Category searching—searching by attributes and values, utilizing suitable controls such as for example ActiveX, Java, and/or HTML controls Vendor searching—utilizing the same controls, but limiting searches and search results to the product line of a single vendor Brand searching—using the same controls, but limiting searches to a single brand Manufacturer searching—using the same controls, but limiting searches to a single manufacturer Code searching—searching in which the prospective purchaser enters the vendor's product code and obtains a comparison grid of information for the corresponding product Index searching—searching through an alphabetical listing of the first and second level attributes to aid in finding subcategories whose parent category may not be completely evident Order History searching—searching providing information that allows users to obtain information about items and quantities they previously ordered.

The user experience using an illustrative embodiment of the invention is now described.

When an individual user accesses the on-line shopping Web site, the user is given the option of taking a tour of the site or registering. The registration sequence involves request for response to the following queries:

Name (First, MI, Last)

Email Address

Password (user's choice)

Where'd you hear about us?

All of the foregoing information is stored, and the user is immediately emailed with an account name (LogonID) and password. Account names are formed as first initial, middle initial (if entered), last initial, and followed by a number (e.g., John Q. Customer may be assigned the account name JQC2). These suffixed numbers are sequential.

The user can then use this information to log into the on-line shopping Web site and search for products. A record is added to the LogonRecords table each time a user attempts to log into the site, and this table stores successes, failures, and the user's Internet address. The user is allocated a "virtual shopping cart." As products are found by the user, they can be added to the user's shopping cart. Shopping carts are stored in the system database in a shopping cart table. Users can add items to their cart over a period of time before placing an order. A user can leave the site, return to it at a later date, and the items will still be in their cart. This feature is termed a "persistent shopping cart" and eliminates the need for the user to keep a "shopping list" off-line.

As mentioned herinabove, the shopping cart employed in the instant invention, is of an aggregatable/disaggregatable character, meaning that the order for products is assembled by a user across the full spectrum of the database, and thus includes a multiplicity of vendors, manufacturers, products, etc. This important aspect of the applicants invention permits the system proprietor to assemble at a single Web site or other cyberspace location, an extensive collection of products from a variety of manufacturers and suppliers.

This broad spectrum capability of the applicants' invention therefore permits a user to assemble an order which may involve very different and numerous products deriving from numerous independent sources, based on attribute-value chains which enable comparison shopping and selection according to the user's unique needs and requirements (by the user's selection of appropriate values for each of the selected attributes).

The system may be configured to require the user to provide a selection value for each attribute of the attribute-value chain, so that the product selection is fully specified. Alternatively, the system may be configured such that the attributes may be selected in type and number, so as to accommodate such unique needs and requirements. For example, the user may construct a very short attribute-value chain for a correspondingly less specific shopping interaction, or conversely, the user may construct a very elaborate attribute-value chain, for a correspondingly more specific (e.g., highly targeted) shopping interaction.

In operation of the system, a shopping cart can be saved as a template. Templates involve two tables, a header table that identifies the owner of the template and a description of the template, and a line table which contains the individual items stored in all templates and a reference to the header table. This feature allows a user to create lists of frequently ordered items thereby making the process of repetitive ordering very simple.

When an order is placed, the user is asked to supply additional information, including for example the user's billing address, shipping address, credit card information, credentials, etc. A total of 11 tables are used to track all of this information, in addition to the information already gathered. These tables provide the ability to classify users as a certain type of consumer. The shopping cart then is disaggregated and the orders for the goods and/or services are transmitted electronically to the corresponding individual vendors. A copy of the order is stored in the user's order history. Order history involves 2 more tables, a header and a line table, just as with templates. The order history tracks products, quantity, price paid, date, and information regarding the order's status.

The shopping cart in operation of the system is therefore aggregated by the user through selections from grids generated by attribute-value chain searches, and then is disaggregated (electronically separated) by the system for electronic routing to the individual vendors. The individual vendors of the selected products, upon receiving the electronic order from the system for such products, then process the orders for fulfillment and shipment or delivery of products to the system user.

The online comparison shopping system of the invention therefore operates as a virtual mall for the purveyed products. A direct transactional link is established between the product supplier and the purchaser, thereby facilitating and enabling electronic commerce involving such products. The vendor therefore has an advertising and promotional forum, and hyperlinks may be embedded in the system to the vendors' home pages or other Web sites. The system proprietor, in providing the shopping forum for the vendor's products, thereby provides an outlet service to the vendor, which may be compensated by a mutually agreed compensation schedule or commission rate.

The computer program of the on-line shopping system may further comprise an administrative capability, including functional components such as a data entry module, a customer service module, and an administrative utility.

Three tables may be involved for data entry in the data entry module, to allow products to be entered, then approved, before being published to the main database of the system. Two tables are used to track current products (TentativeProduct) and rejected products (TentativeProductReject.) These tables track a Querystring (a complex representation of a Vendor Product), the name of the person who entered the product, when the product information was entered, and who rejected the product in the case of a rejection. When a product is approved, it is added to the other tables and removed from these data entry tables. A third table is used to track the rates that are paid to remote data entry staff.

Four tables are used for customer service, to track calls and staff permissions. The call tracking system tracks incoming calls as well as outgoing follow-up calls.

Six tables are used by the administrative utility for accounting/bookkeeping functions.

The structure, function and operation of an illustrative Web site computer program will now be described with reference to an illustrative sequence of graphical user interface screens that are presented to a user accessing and operating the program to conduct an on-line shopping transaction, followed by description of the shopping transaction with reference to a shematic flowsheet showing the constituent steps of such transaction, and description of a database structure that may be employed to carry out the functions and achieve the objectives of the invention.

Figure 54:
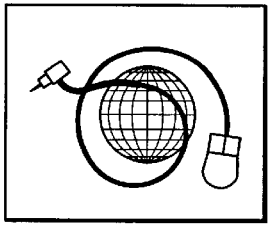

FIGS. 1–54 are representations of screens constituting various views of a graphical user interface and reports generated by a computer program for a computer network-based on-line comparison shopping system that may be used to conduct a method of interactive purchase and sale of products, in accordance with one embodiment of the invention.

In one aspect, the graphical user interface contains various text pages which are linked to other pages via a hypertex link. The links may be displayed by a browser as colored and underlined text, as a virtual button, virtual tab or other means known in the art.

The various pages of the graphical user interface allows a user to view a text document displayed on a display device connected to the user's computer and to access, retrieve and view other data objects that are linked to hypertext words or phrases in the hypertext document. The user may "click on," or select, certain words or phrases in the text that specify a link to other documents, or data objects. In this way, the user is able to navigate among data objects. The data objects may be local to the user's computer system or remotely located over a network or over the World Wide Web.

User Interface Module

The system has a user interface module that is preferably programmed in a language operational in an Internet or intranet environment. For example, the applicants have programmed the user interface module in using ActiveX controls and Java languages.

FIG. 1 shows an exemplary "main page" of the user interface module, including a first screen constituting a portion of a graphical user interface generated by a computer program for a computer network-based on-line comparison shopping system that may be used to conduct a method of interactive purchase and sale of products, in accordance with one embodiment of the invention. As shown by the screen, the software generating same is browser compatible, using an Internet browser such as Microsoft Internet Explorer or Netscape Navigator, for manipulation of the interface screens and functions thereof.

The first screen 10 includes mouse-activatable function bars, including "About us," providing information about the source organization providing the software for the Web site, "How to become a supplier," providing information to prospective vendors about the criteria and procedure for representation at the Web site, and "Contact us," providing correspondence and communication information, for user contacting of the source organization. Such first screen also contains a cental region containing the text, "Click Here to Shop Now," the mouse actuation of which region moves the user to a second screen.

Thus, from the main page, the user can access other portions of the user interface module. For example, in a preferred mode, the user can access components such as the shopping, supply, service, company information, contact information or vendor information request form components of the user interface module.

The user can select the "shopping" option, which permits the user to log into the shopping portion of the user interface module. For example, selection of the shopping option can link the user to a "log in" page which contains links to a registration page for unregistered users, shopping as a guest, or logging in for registered users. The log in page can also link the user to a "forgotten passwords" page, where the user can enter his or her ordinary e-mail address to prompt the system to send the user an e-mail with the forgotten password.

Figure 3:
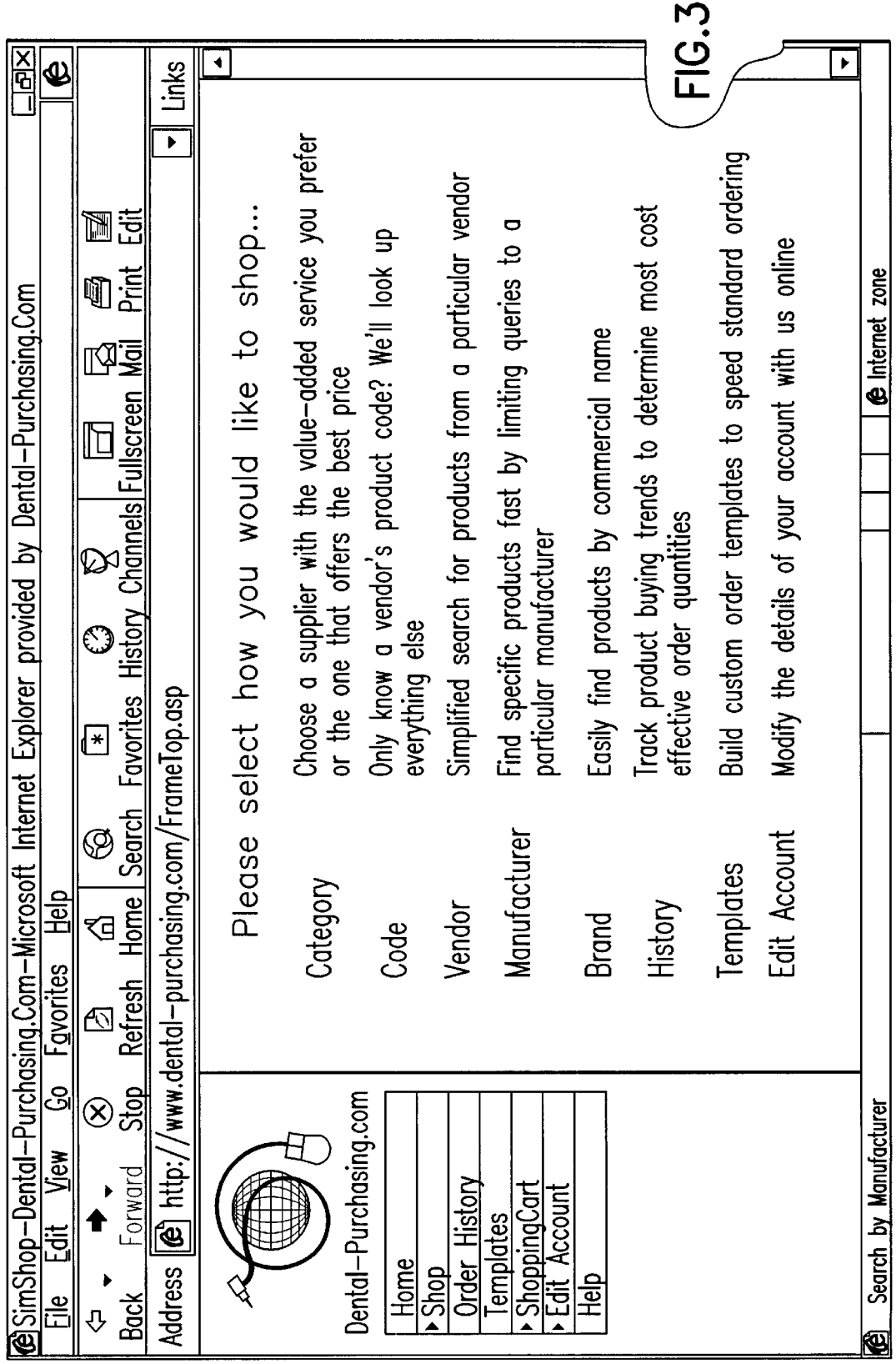
Figure 4:
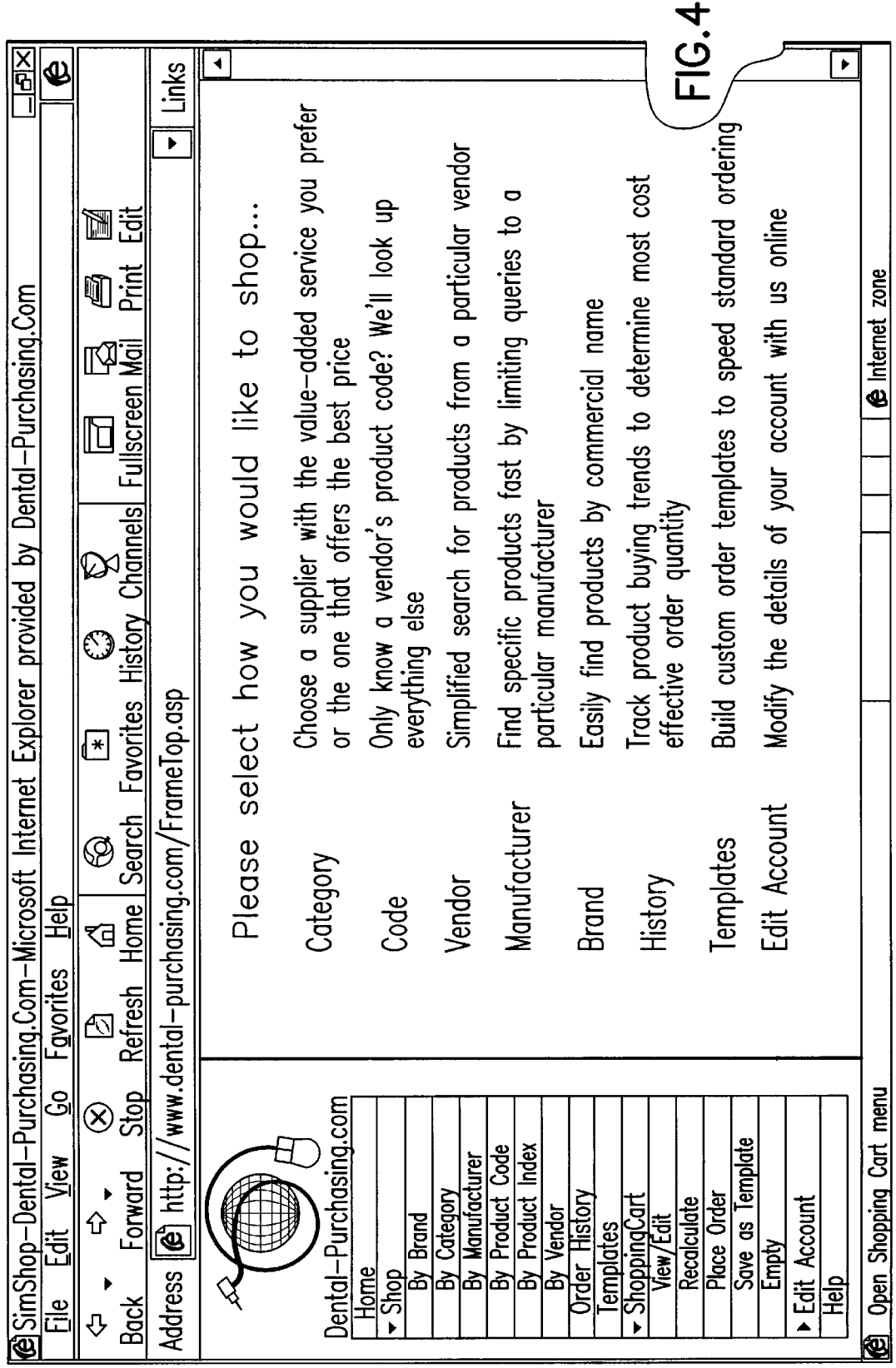

FIG. 3 show an exemplary "main shopping page" for the shopping portion of the user interface module. This main shopping page preferably contains a means, such as a menu bar, for linking to other portions of the graphical user interface module, such as a homepage, a shopping page, an order history page, a templates page, a shopping cart, an edit account page, and/or a view help page.

The user can preferably select a link on the shopping main page to access to a "shopping page" which includes, for example, options permitting the user to search the database for products. Such searches may, for example, be by brand, by category, by manufacturer, by product code, by product index and/or by vendor.

Preferably at any point during the searching/shopping operation, the user can access the "shopping cart" page via a hypertext link. The shopping cart page preferably includes a variety of options for viewing and editing the shopping cart. For example, the shopping cart page preferably permits the user to recalculate quantities of items being purchased, i.e., to increase or decrease the number of any specific product being purchased. The shopping cart page may also have hypertext links which permit the user to place an order, create a template and/or empty the cart.

The user interface module also preferably contains an "edit account" page and/or menu which may be located on various pages within the user interface module, and which may, for example, contain options for editing primary contact information, billing contact information, shipping address information, credit card information, changing password, and changing control technology. As previously mentioned, the user interface module may be programmed in a variety of programming languages. The inventors have, for example, programmed the user interface module in both Java and ActiveX. The "edit account" page and/or menu preferably contains an option permitting the user to switch from the Java platform to the ActiveX platform and vice versa.

Figure 5:
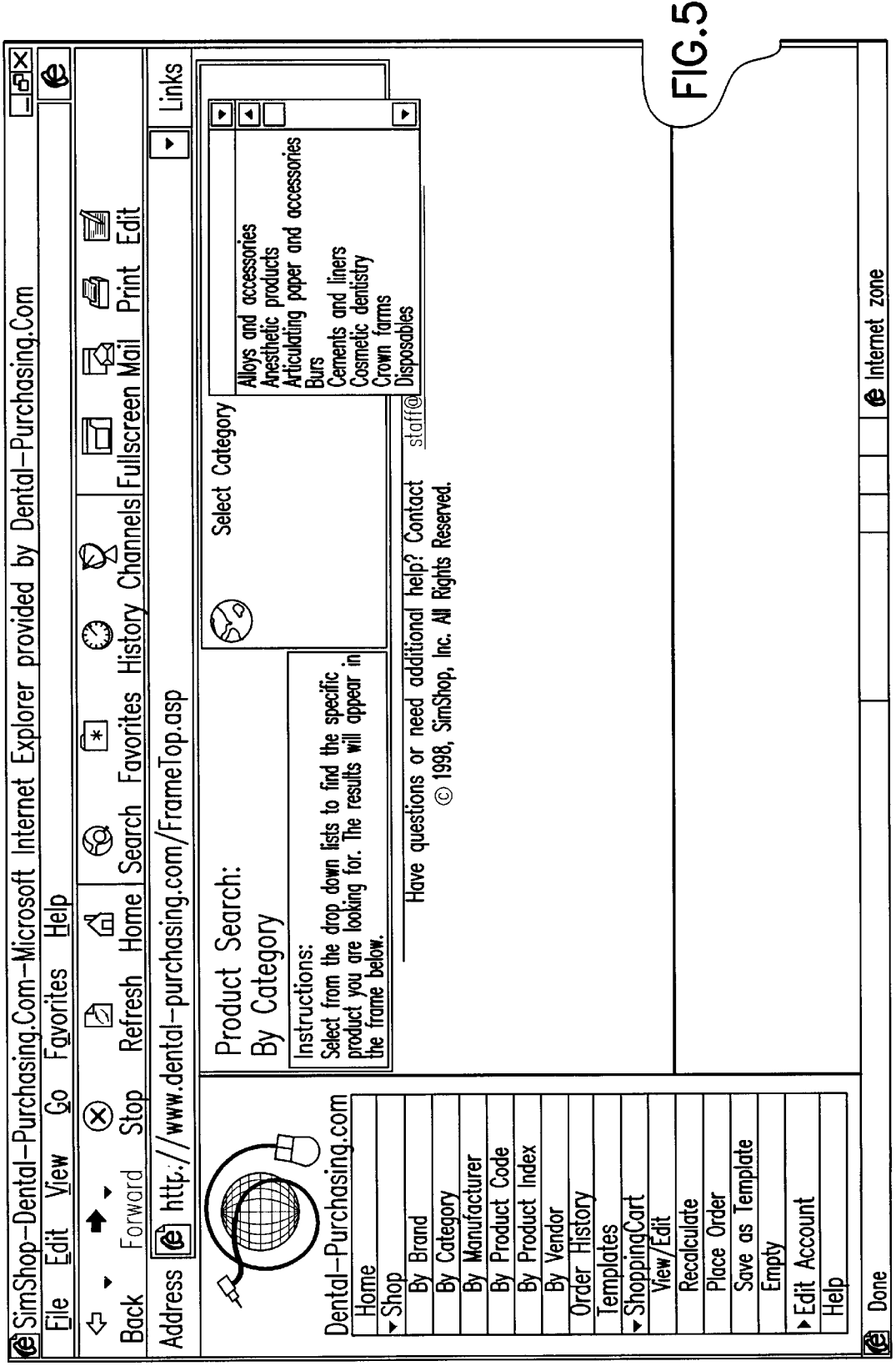

FIG. 5 shows a menu of the shopping main page having the "shop" and "shopping cart" menus extended.

The shop menu contains options permitting the user to shop based on various types of searching. For example, FIG. 5 shows a page which is selected when the user selects the option for a category search. The various searching mechanisms take the user through a decision tree (the "attribute value chain"), prompting the user to sequentially select values from a series of attribute categories. When the user has specified a value for each of the attributes in the attribute-value chain, the system provides the user with a means, such as a proprietary comparison grid, for comparing like products.

Figure 6:
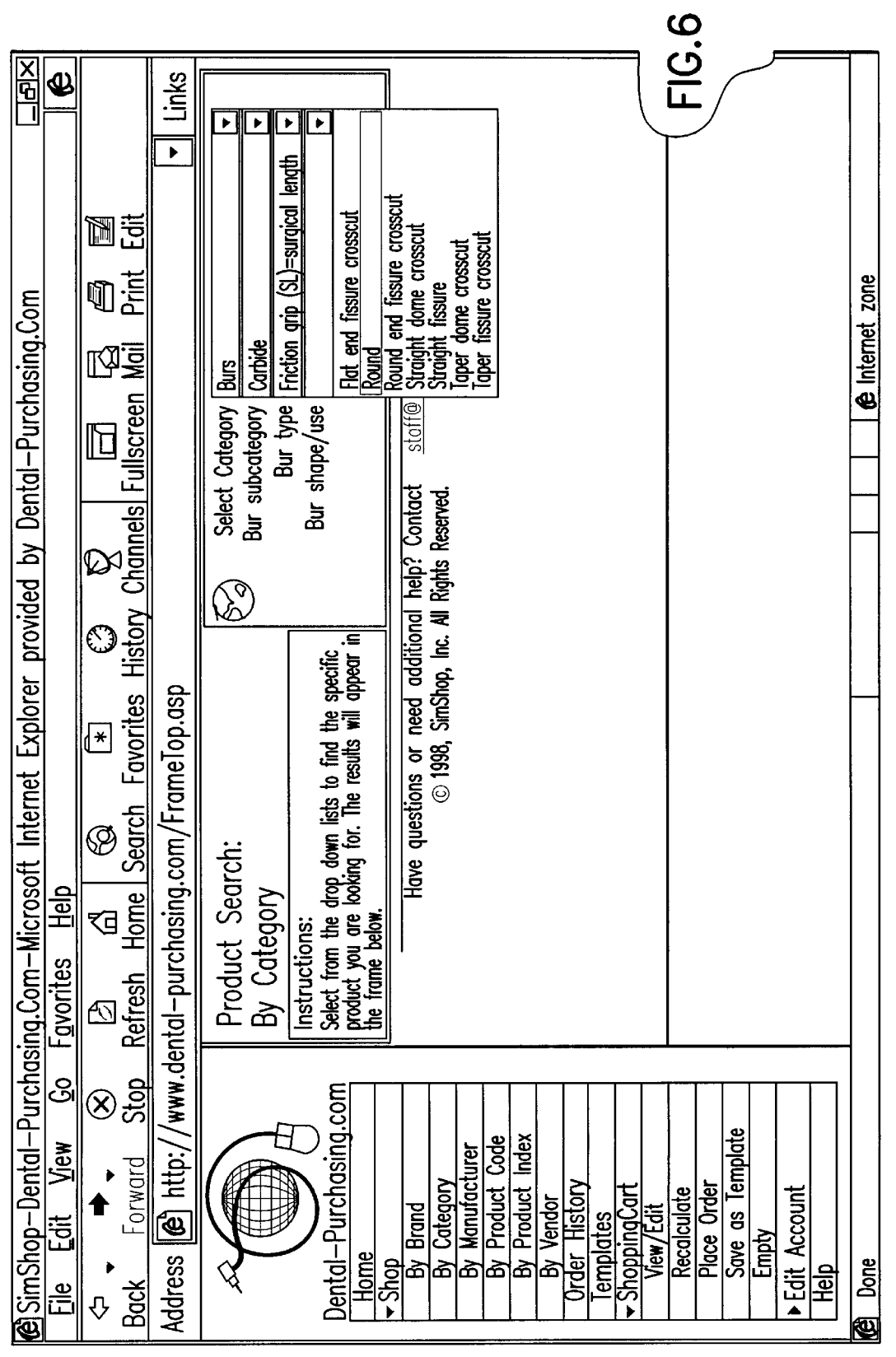
Figure 8:
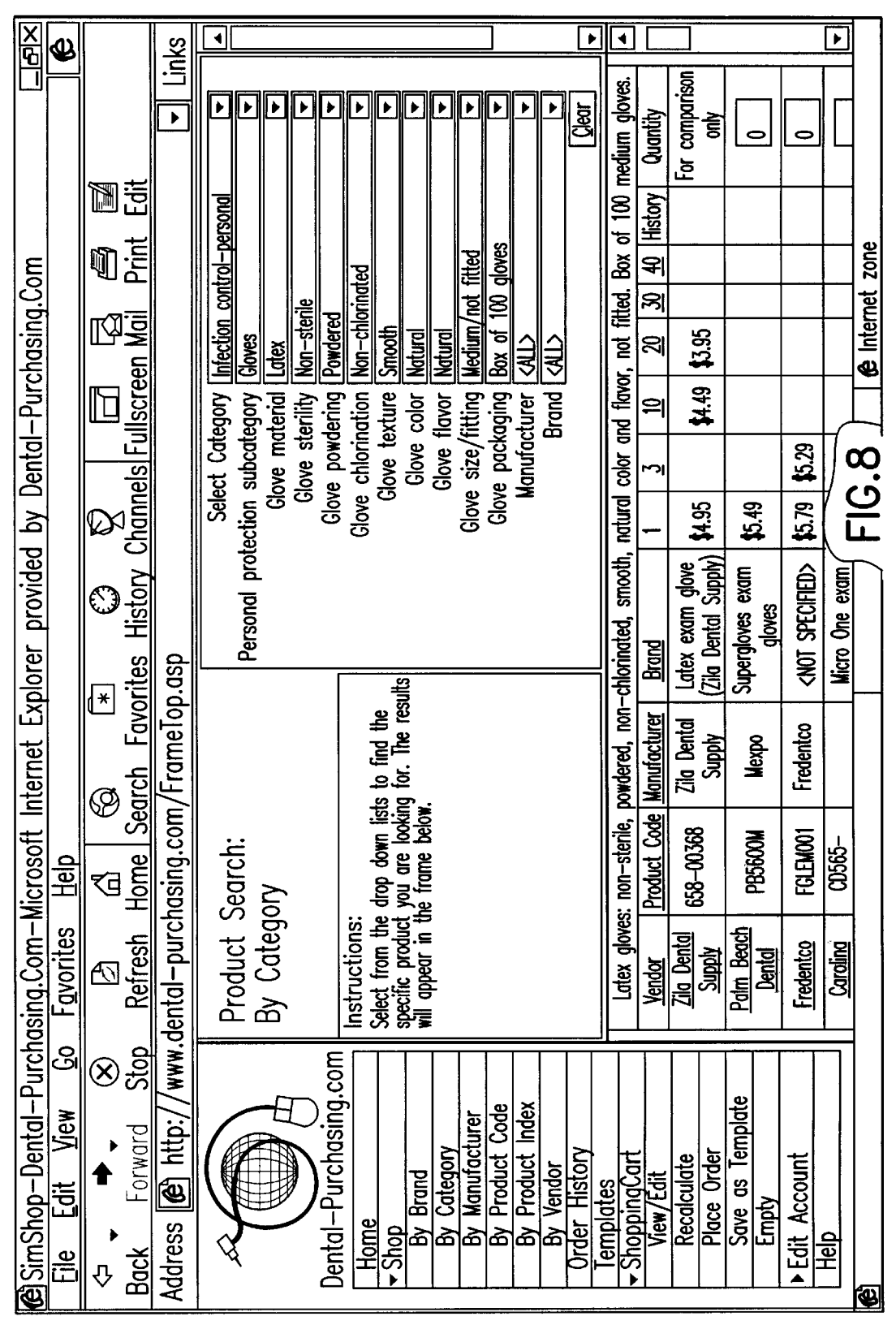

FIG. 5 shows the beginning of the category search, i.e., at the first level of the attribute value chain, whereby the user is prompted to select a product category. When the user selects a category at the first level, the program then proceeds to prompt the user to select a value for the next attribute level of the attribute value chain. For example, FIG. 6 shows a screen print out of a category search in which the user has proceeded to the fourth level. When the user has specified a value for each of the attribute categories in the attribute value chain, the system provides the user with a comparison grid of products, for example, screen prints showing portions of comparison grids resulting from category searches are displayed in FIGS. 7 and 8.

Unlike the databases of the prior art (e.g., word, phrase or boolean searches), the present database permits a variable and unlimited number of attributes to be assigned to each product. In other words, the length of each attribute value chain varies depending on the number of attributes necessary to fully distinguish the product from other products. The number of attributes is limited only by the practical need to enable the user to complete the search process with in a reasonable time. The number of attributes within the same database can vary with each item, thus, for example, where the system is used to sell a product line, such as dental supplies, some products, such as facial tissues may have a relatively short attribute-value chain having 4 or 5 attributes, while other products, such as drills, may have a long attribute-value chain, having a greater number of attributes.

Categorization and sub-categorization of each product in the system by means of the data entry module results in decision trees of the system of the present invention having the advantage that they guide the user through the search such that no search can fail to result in at least one product.

As previously noted, when the user has specified a value for each of the attribute categories in the attribute value chain, the system provides the user with a comparison grid of products. The columns of the grid preferably include information such as vendor, product code, manufacturer, brand and price. The system preferably has means for permitting the user to sort the grid by any of its columns. For example, the grid page can be programmed such that the user can select the title of any of the columns to sort the grid by that column. For example, the grid displayed in FIG. 9 has been sorted based on the vendor column. Alternatively, for example, the user could sort on the price column to quickly ascertain which are the lowest and highest prices.

The user interface module preferably permits vendor, manufacturer or brand searches each using a search control page which is analogous to the category search page. These pages can permit the user to easily search for products carried by a specific vendor, manufactured by a specific manufacturer or which include a specific brand.

Figure 10:
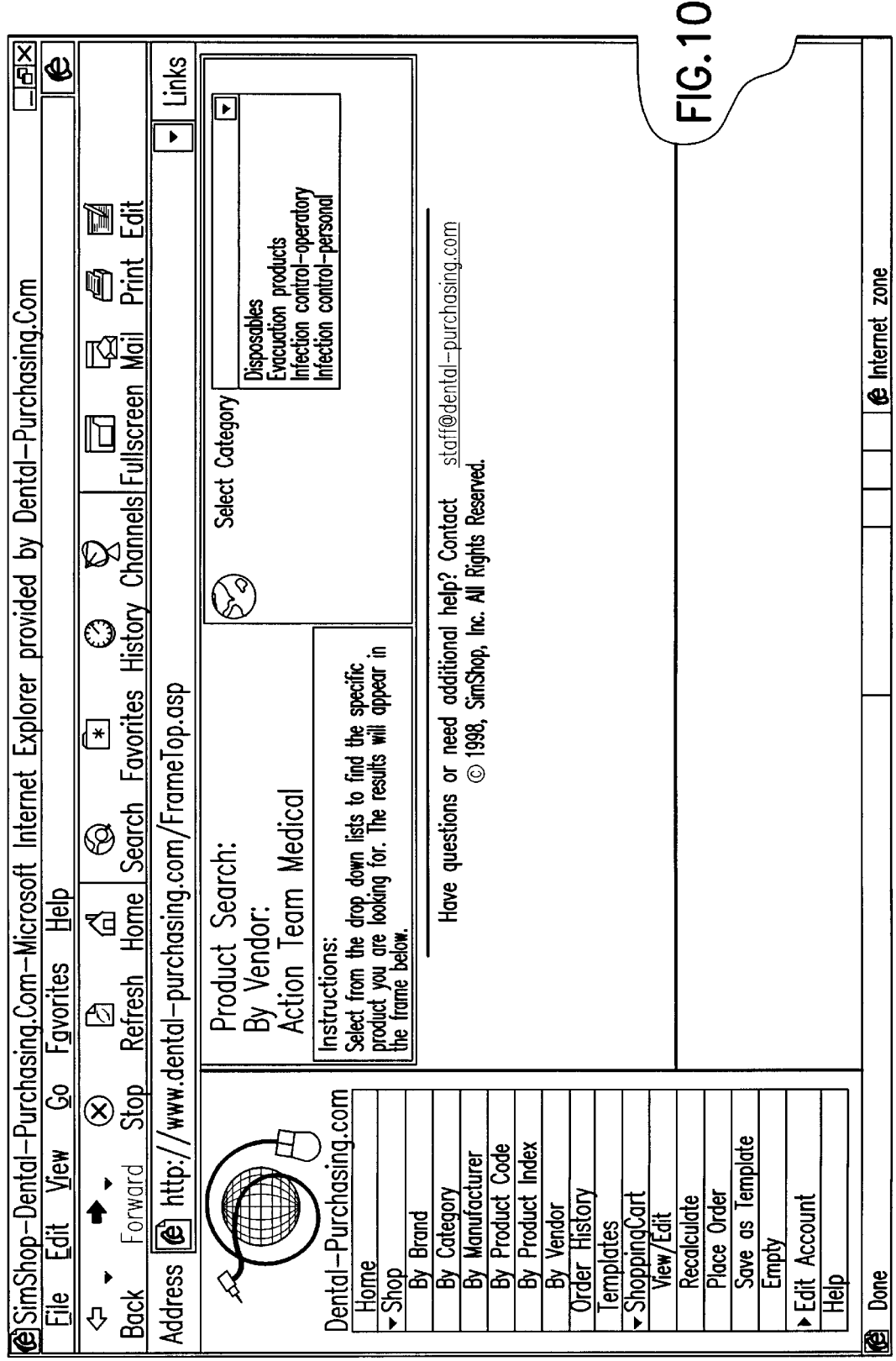

FIG. 10 shows a vendor search at the first level of decision. This particular printed screen illustrates that for example, for the vendor "Action Team Medical," four categories are available at the first level of the attribute value chain. Vendor searches utilize only the vendor portion of the database while preserving the uniform results capability of the system.

Figure 11:
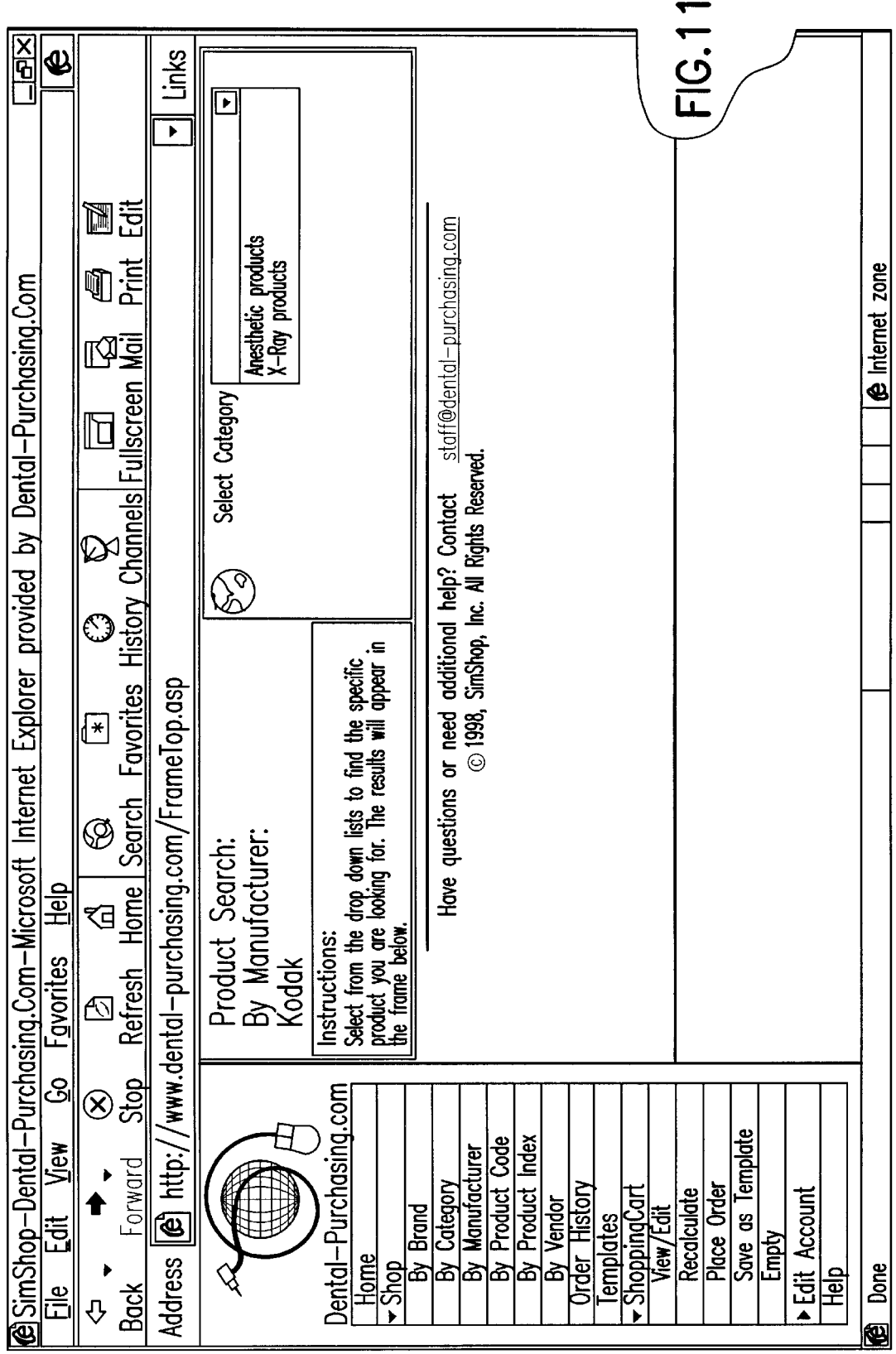

FIG. 11 shows a manufacturer search at the first level of decision for the manufacturer Kodak, illustrating showing the possible values at the first level of the attribute value chain, including anesthetic products and x-ray products.

Figure 12:
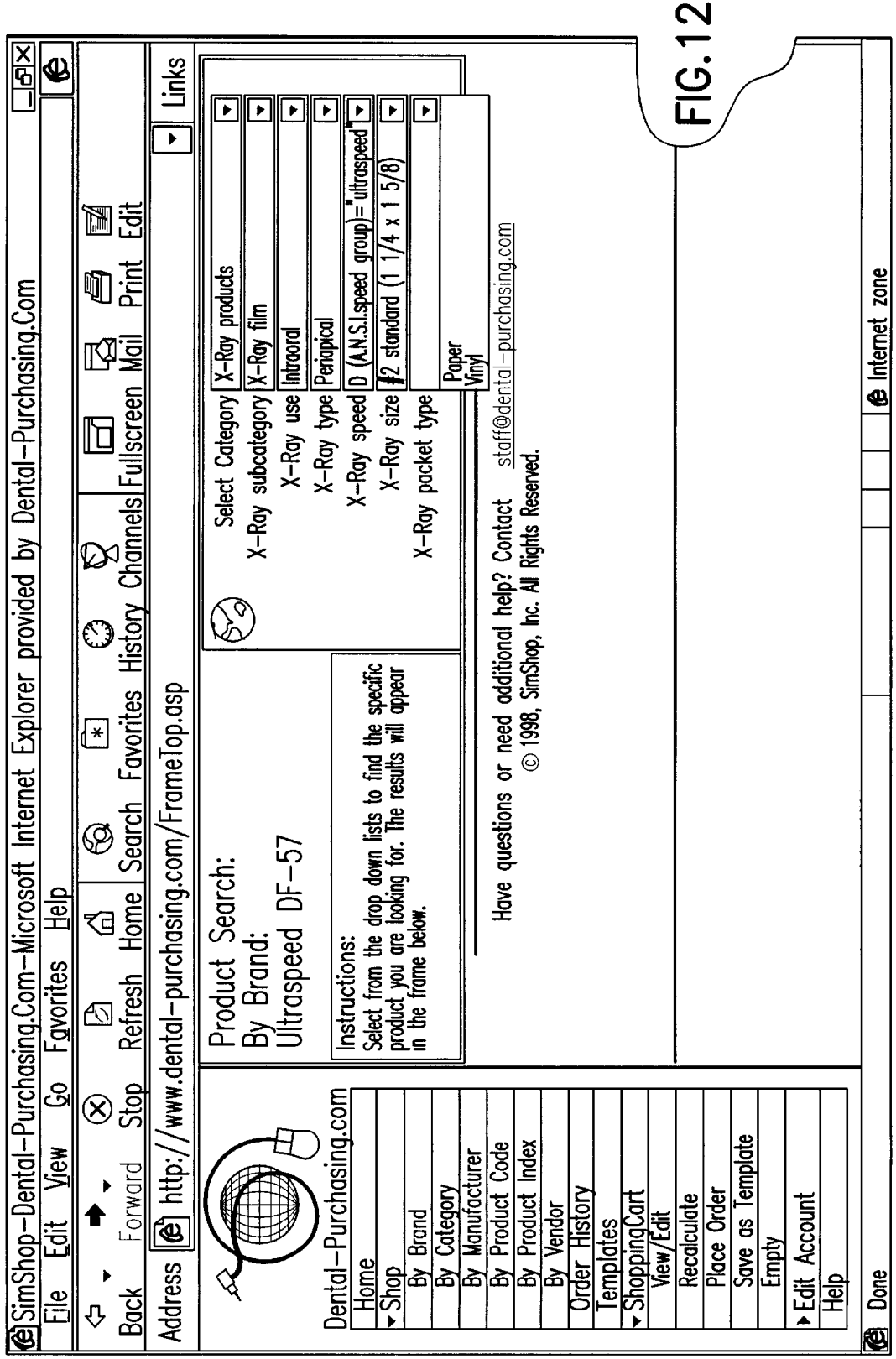

In performing any of the foregoing searches, the attribute-value chain automatically takes the user through all attributes of the attribute value chain having only one possibility. Thus, for example, when performing a brand search, the user preferably selects a particular brand from the brand list and the program then fills in each of the selection category criteria for that brand from the first level up to the first level at which the user has at least two choices. FIG. 12 shows a brand search for Ultra Speed DF-57 where the system has selected the categories and sub-categories up through the seventh level at which the user is prompted to choose between paper and vinyl.

Figure 13:
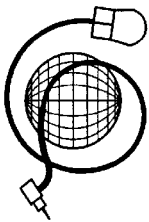

The user can preferably access a product code search page, for example by selecting a hyperlink which links the shopping main page to the product code search page. This product code search page preferably permits the user to select a vendor from a list of vendors and to enter that vendor's product code. Searching by vendor product code preferably produces a comparison grid having the selected item highlighted followed by a list of comparable products from other vendors. An example of such a selection grid is shown in FIG. 13.

Figure 14:
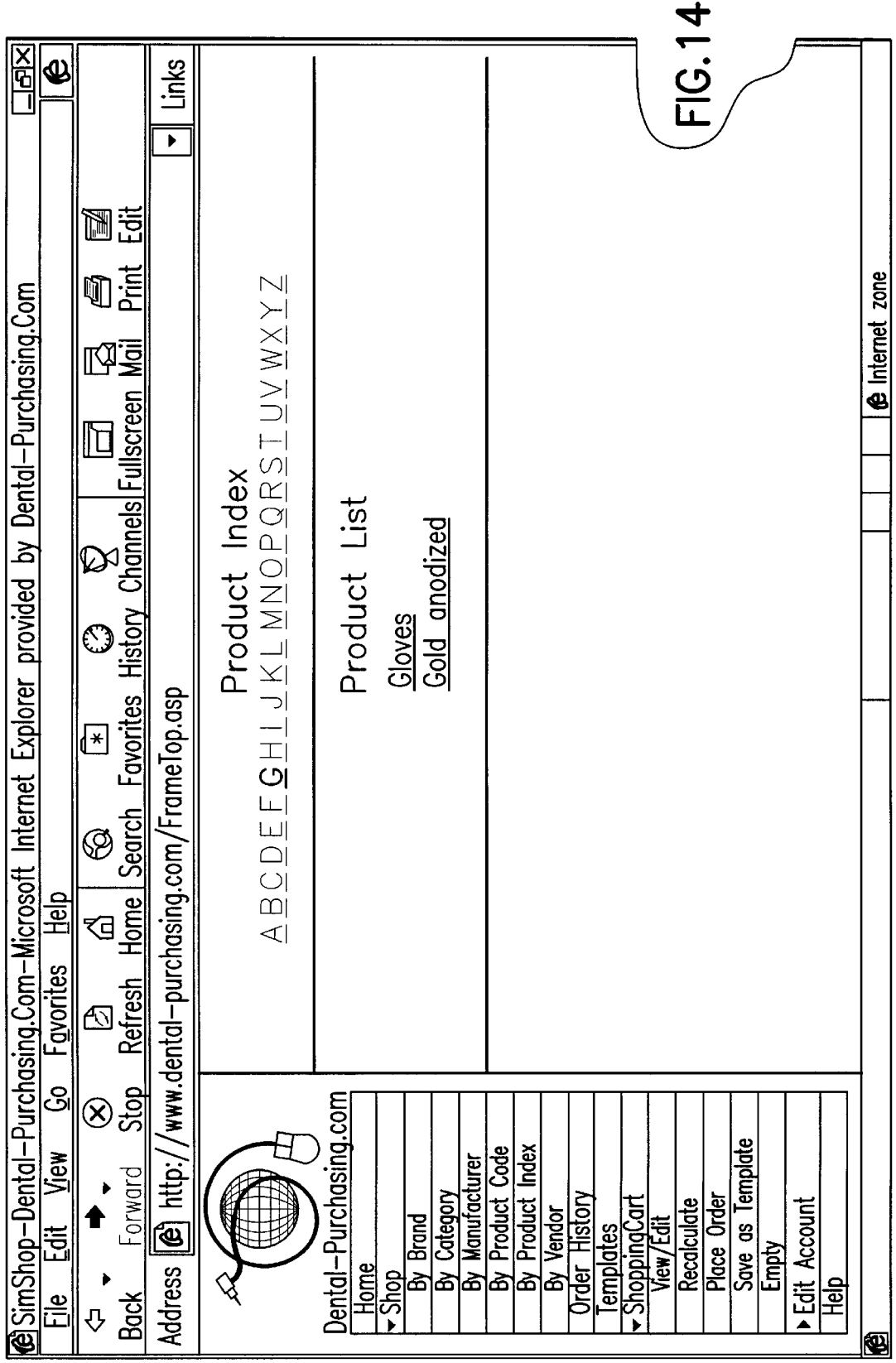
Figure 15:
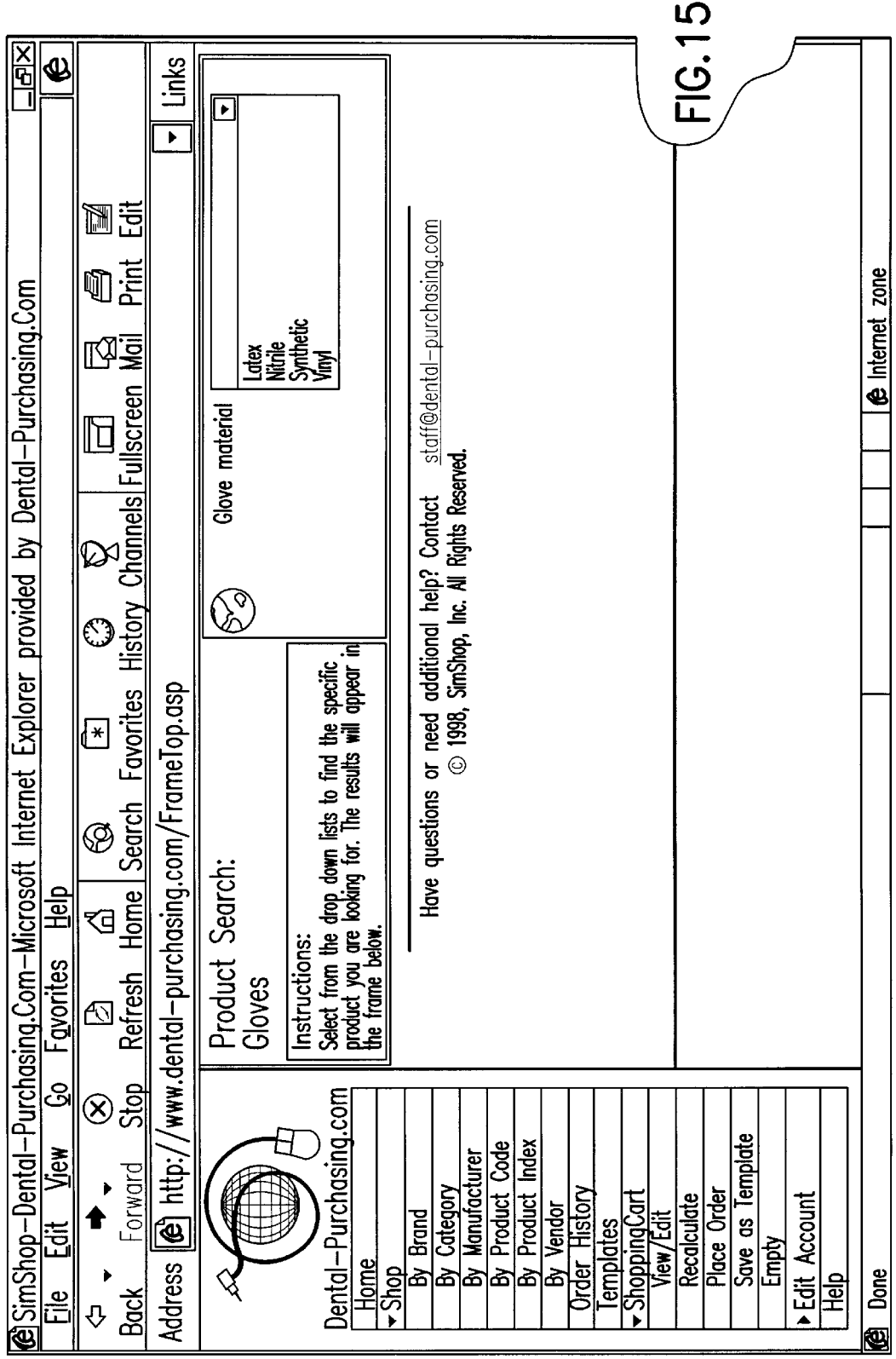

The user interface module preferably permits the user to access a product index, which lists the categories and sub-categories used in the system and provides links to a search screen which permits the user to select the variable values of the attribute value chain in order to isolate the product in which the user is interested. This provides an efficient method for the user to locate various sub-categories. For example FIG. 14 shows a product index for products having category/subcategory names beginning with G. The user can select the desired product from the product list to access a category search for that product, as shown in FIG. 15.

The user interface module preferably includes an order history page, accessible via hyperlink from various pages of the module. The order history page displays a series of the user's previous orders and also includes any savings quotes which have been generated for the user. Savings quotes are discussed in more detail below.

Figure 16:
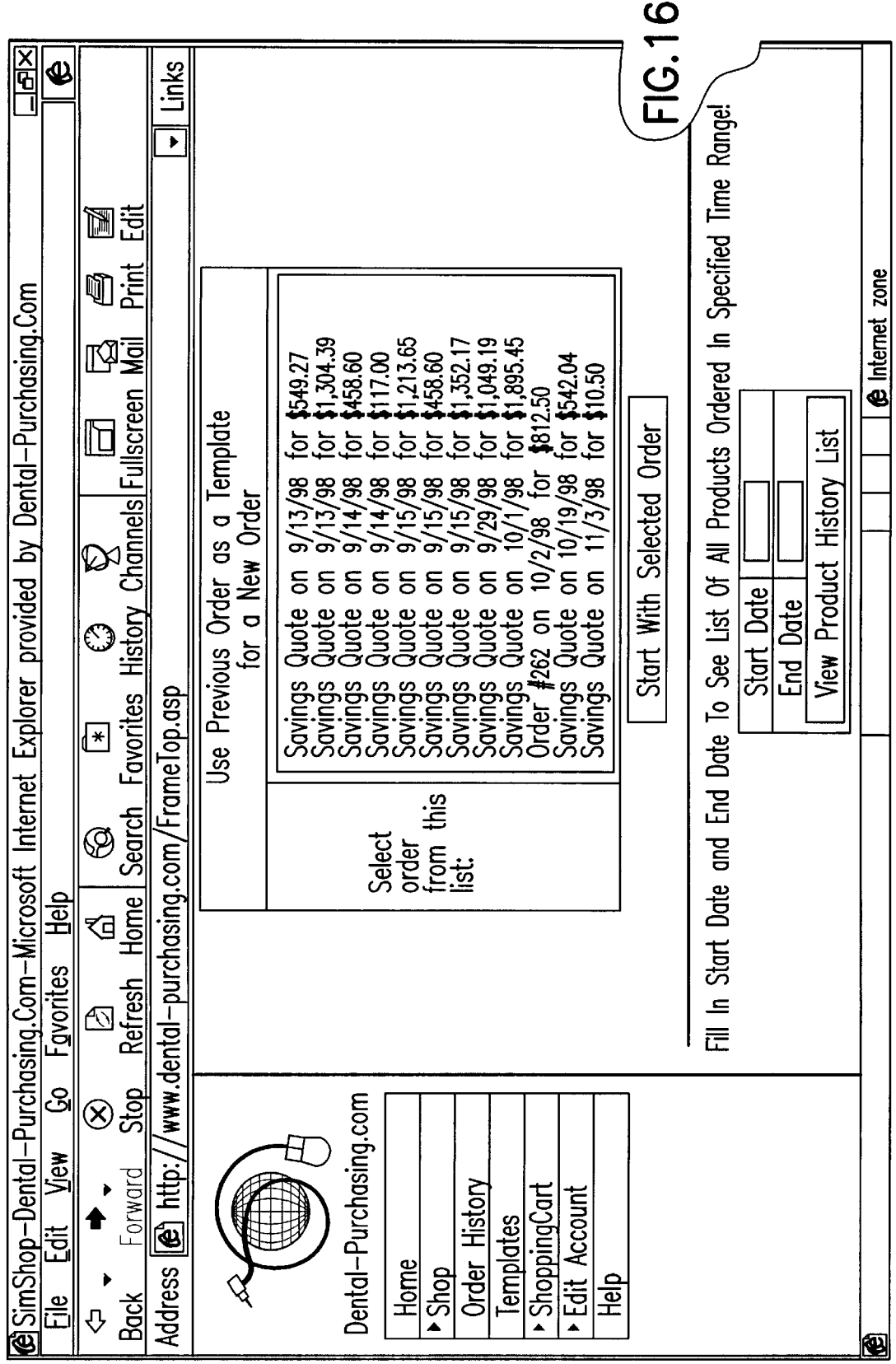

The user can select an order in which the user is interested, and the system will display that order. Alternatively, the user can specify period of time in which the user is interested (e.g., by specifying a start day and an end day), to produce a list including all products that have been ordered by the user within the specified time period. An exemplary history page is shown in FIG. 16. FIG. 17 shows a sample order history within a specified date range.

Figure 18:
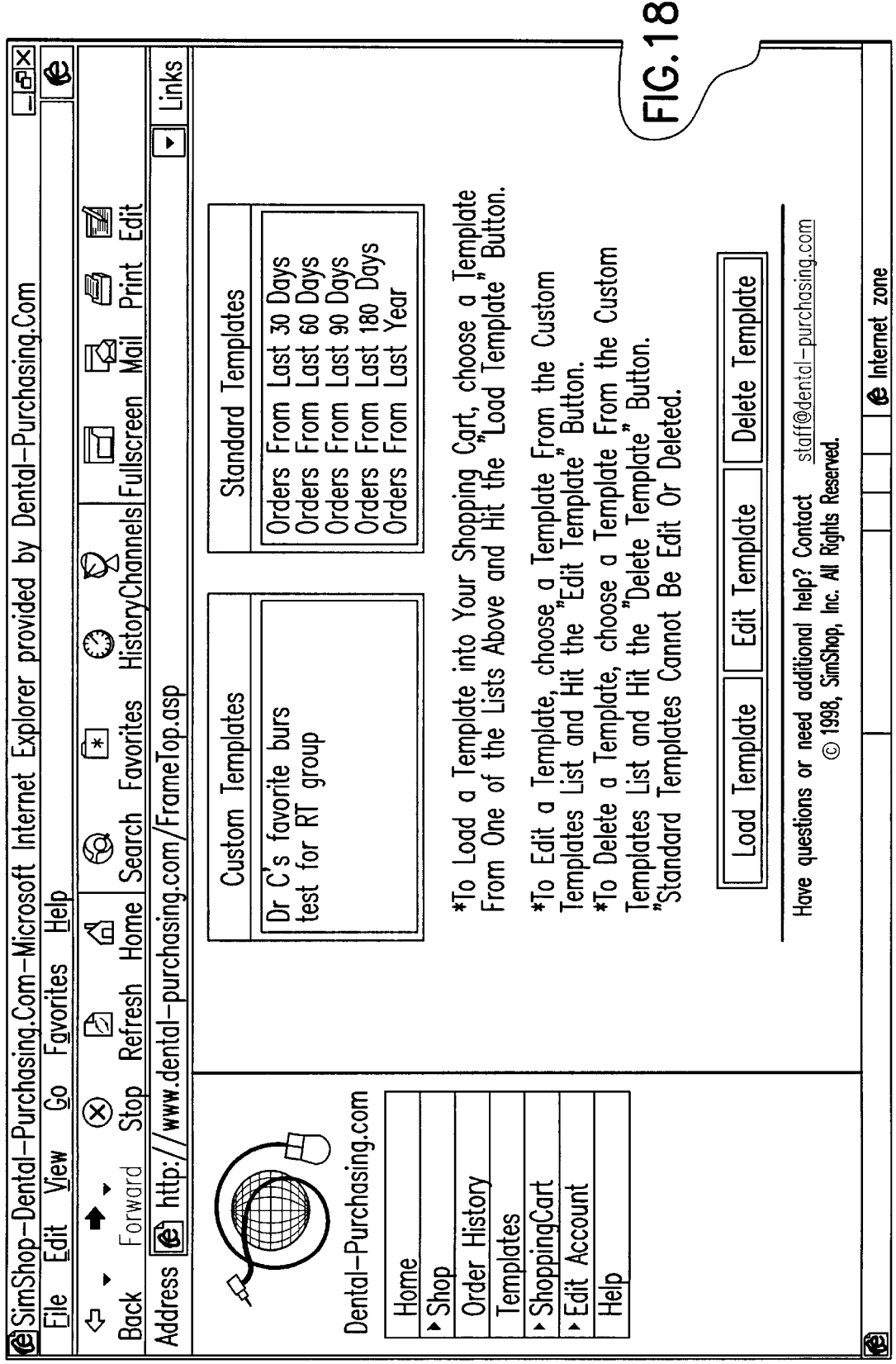

FIG. 18 shows a sample of the template page. The user interface module preferably permits users to create templates specifying any grouping of products in which the user is interested. For example, where the system is used for dental supplies, a user may wish to create a template containing all disposable ordinarily ordered by that user, for example on a monthly or quarterly basis. The user can then access the template to efficiently order disposables as needed.

Figure 20:
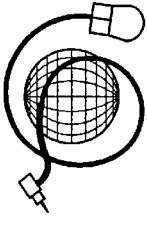

The system thus permits creation of customized user templates ("custom templates") as well as providing a means for creating and displaying a list of standard templates. A list of custom templates may be displayed, for example, in a custom template frame, as shown in FIG. 18, while standard templates are preferably displayed in a separate frame, such as the standard template frame shown in FIG. 18. Standard templates are preferably present for all users and may, for example, include templates displaying the user's orders from the last 30, 60, 90, or 180 days, and/or the user's orders for the previous year, as shown in FIG. 18. The template preferably permits the user to load the template into the user's shopping cart, to edit the template, for example by changing quantities of items ordered and/or by entirely removing items from the template. An exemplary template editing page is shown in FIG. 20.

The user interface module also preferably permits the user to delete entire templates. However, it is preferred that the system permits the user to delete only custom templates and not standard templates.

Figure 19A:
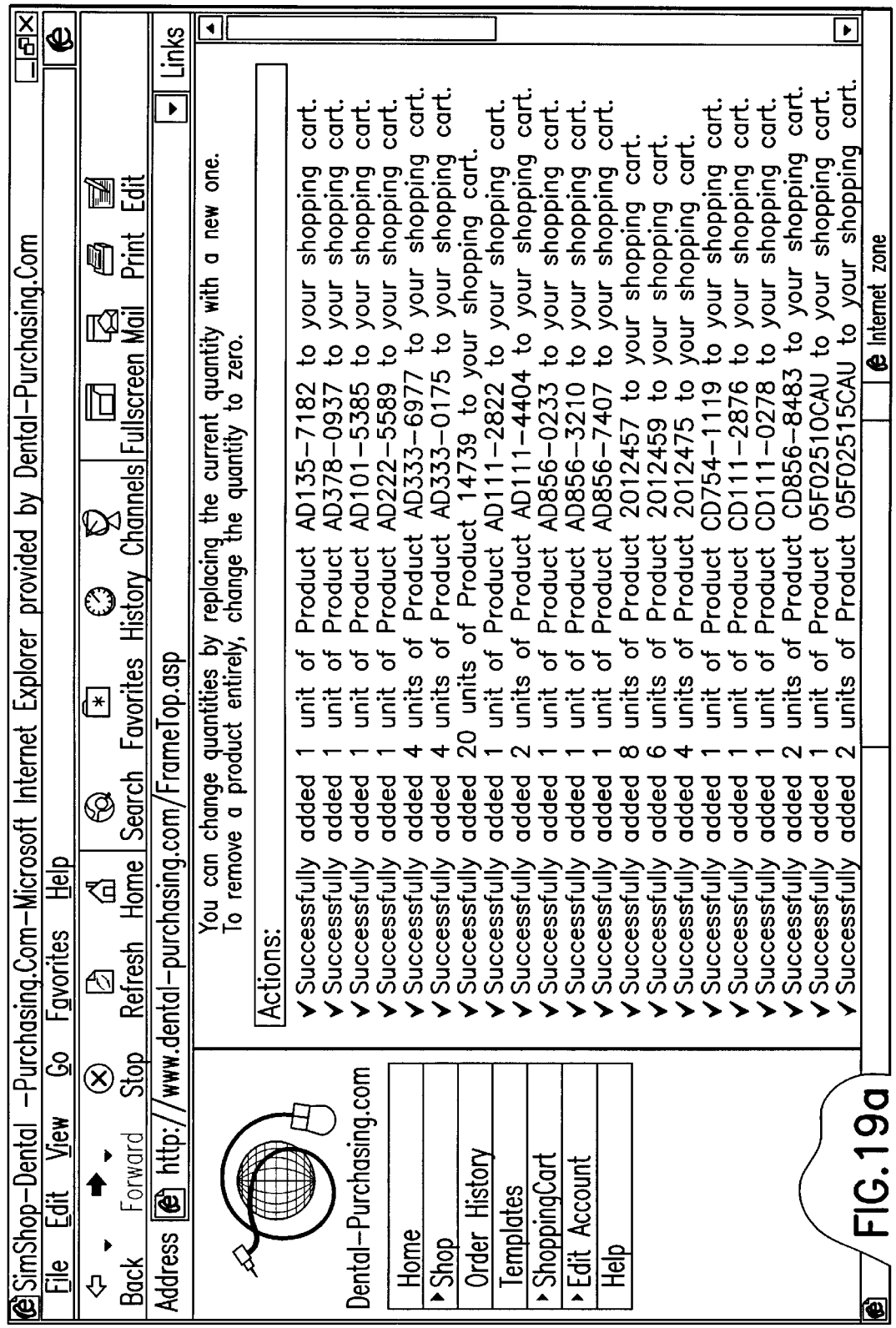

FIG. 19*a* shows a top portion of a page of the user interface module where a user has selected the load template option from the template page. FIG. 19*b* shows a lower portion of a page of the user interface module where the user has selected the load template option.

The user interface module preferably contains a persistent shopping cart-type functionality, as well as a means for permitting a user to access and modify the shopping cart functionality of the invention. Internet "shopping cart" systems, such as the "shopping cart" function of www.amazon.com, generally permit a user to select items for purchase, which are then electronically stored for submission to the vendor. For example, the system preferably includes a shopping cart menu which permits the operator to view or edit the shopping cart, to recalculate the shopping cart, to place an order, to save the shopping cart as a template, and/or to empty the shopping cart. One important feature of the applicants shopping cart program is that the program preferably stores shopping cart entries into a database which is not located on the user's computer. This permits the user to sign off without losing the products of the shopping cart and signing back on later to add further products to, and/or remove products from, the shopping cart. As used herein, the term "persistent" in reference to the shopping cart means that the shopping cart is selectively retainable by the system, after a given transaction or interaction has been concluded. Such persistency permits the user to terminate the shopping interaction prior to ordering and to maintain the shopping cart in the state it existed at the time of termination, for subsequent resumption of the shopping interaction. Since the shopping cart persists in the database records of the system, the shopping cart can be accessed by a user on a different workstation and/or at a different location, without loss of the shopping cart contents from the prior interaction. This is one novel feature of the applicants' invention, which distinguishes it from prior art systems which store the contents of the shopping cart on the user's computer, so that it is not accessible from a different computer.

FIG. 21 shows a preferred shopping cart page having various items selected. The shopping cart grid will automatically recalculate the price term in the grid as a user changes the quantity information. Thus, for example, FIG. 22 shows a circumstance which the user has changed the quantity of the third item of FIG. 21 to zero. The system has changed the total price for that item to zero and the total price for the contents of the shopping cart has been correspondingly reduced by $13.25.

The system preferably permits the user to recalculate the grid by selecting a "recalculate" option which will remove the zeroed items from the grid. FIG. 23 shows a screen print of the shopping cart of FIG. 22 after the "recalculate" option has been selected.

The system also permits the user to place an order based on the contents of the shopping cart. The ordering is discussed in more detail below.

The shopping cart page also permits the user to easily empty the shopping cart by selecting an appropriate hypertext link.

The shopping cart page also preferably permits the user to "zero" all quantities in the shopping cart by selecting an appropriate option, such as the "zero qty" option shown in FIG. 23. This functional is particularly useful, for example, when a user has loaded a shopping cart from a template or order history and wishes to select only a few items for reorder.

FIG. 23a shows a variation of the shopping cart interface of the type illustrated in FIG. 23. The shopping cart of FIG. 23a shows the History column as including the link "Purchase History" in each row. By selecting "Purchase History" in a given row, a pop-up window is generated showing the user's order history for the corresponding product. The order history is shown at various time intervals (30 days, 90 days, 180 days, last year), as well as cumulatively ("All Orders"), with respect to quantity and total cost; the order history is also set out with respect to each order, showing its order number, date/time, quantity, unit price, and total cost.

Figure 26:
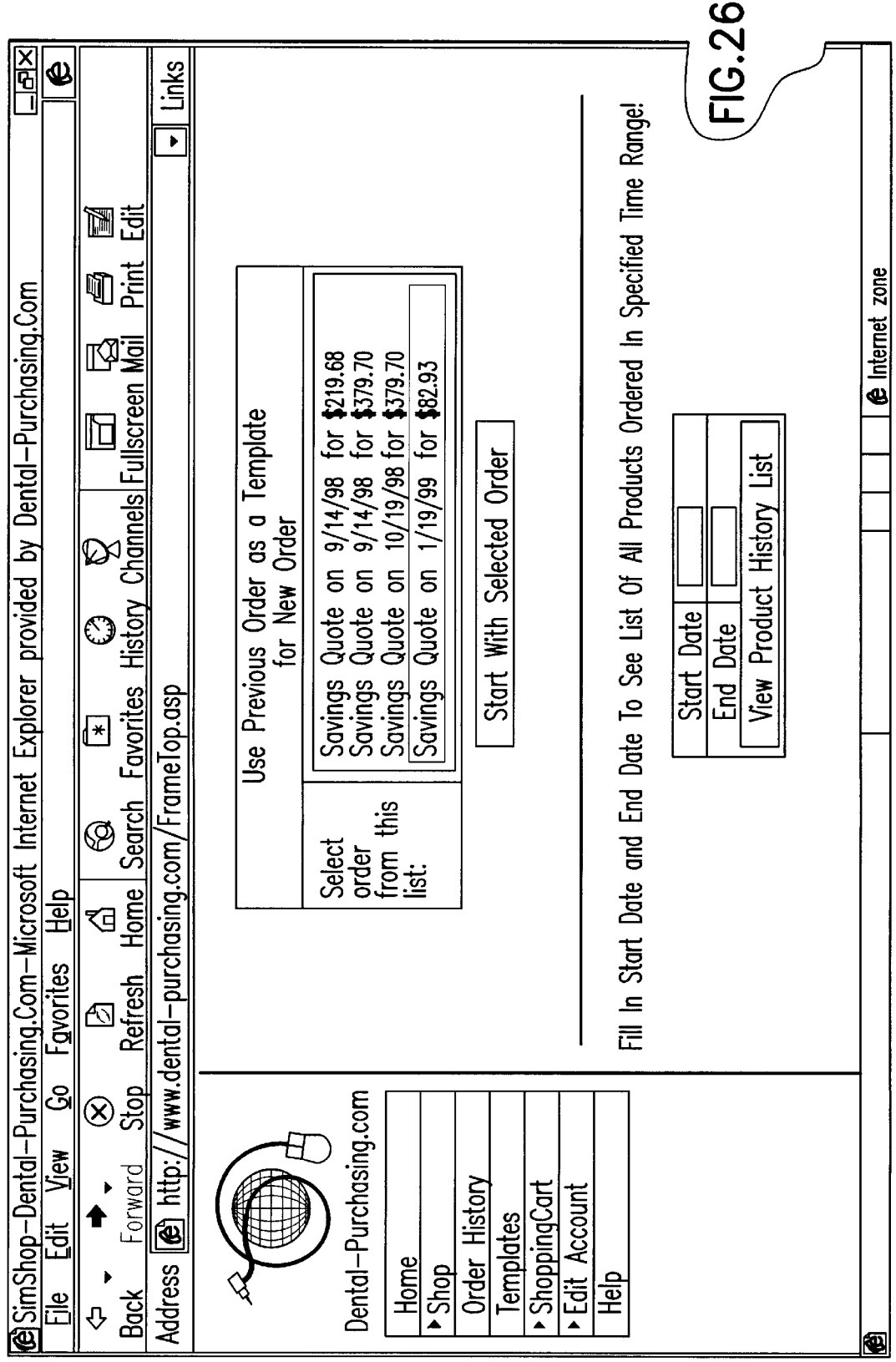

The system also preferably includes a means for permitting the system operator to create quotes for users. Thus, for example, a potential user can mail a copy of an invoice to the operator of the system who can then use the system to create a quote comparing the prices paid by the potential user and the prices the user could have obtained by using the system. The savings quote entry page preferably contains a grid such as is shown in FIG. 24. The system also preferably contains a means for printing the quote and/or e-mailing the quote to user. The e-mail sent by the system preferably contains an attachment file which details the quote, as illustrated in FIG. 25. The system also preferably stores a copy of that quote in the users order history, which is accessible by the user, for example as shown for example in FIG. 26.

Figure 27:
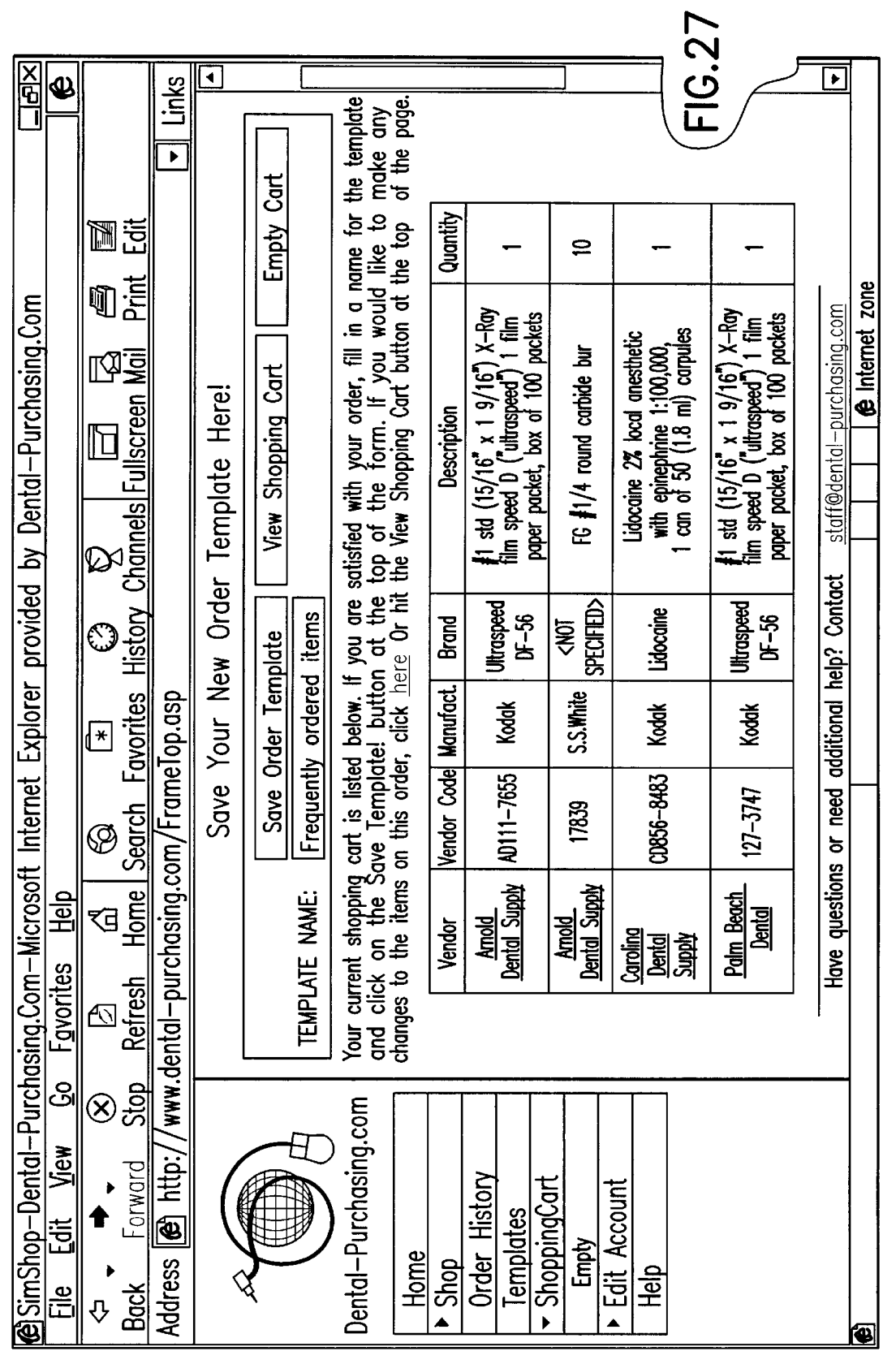
Figure 28:
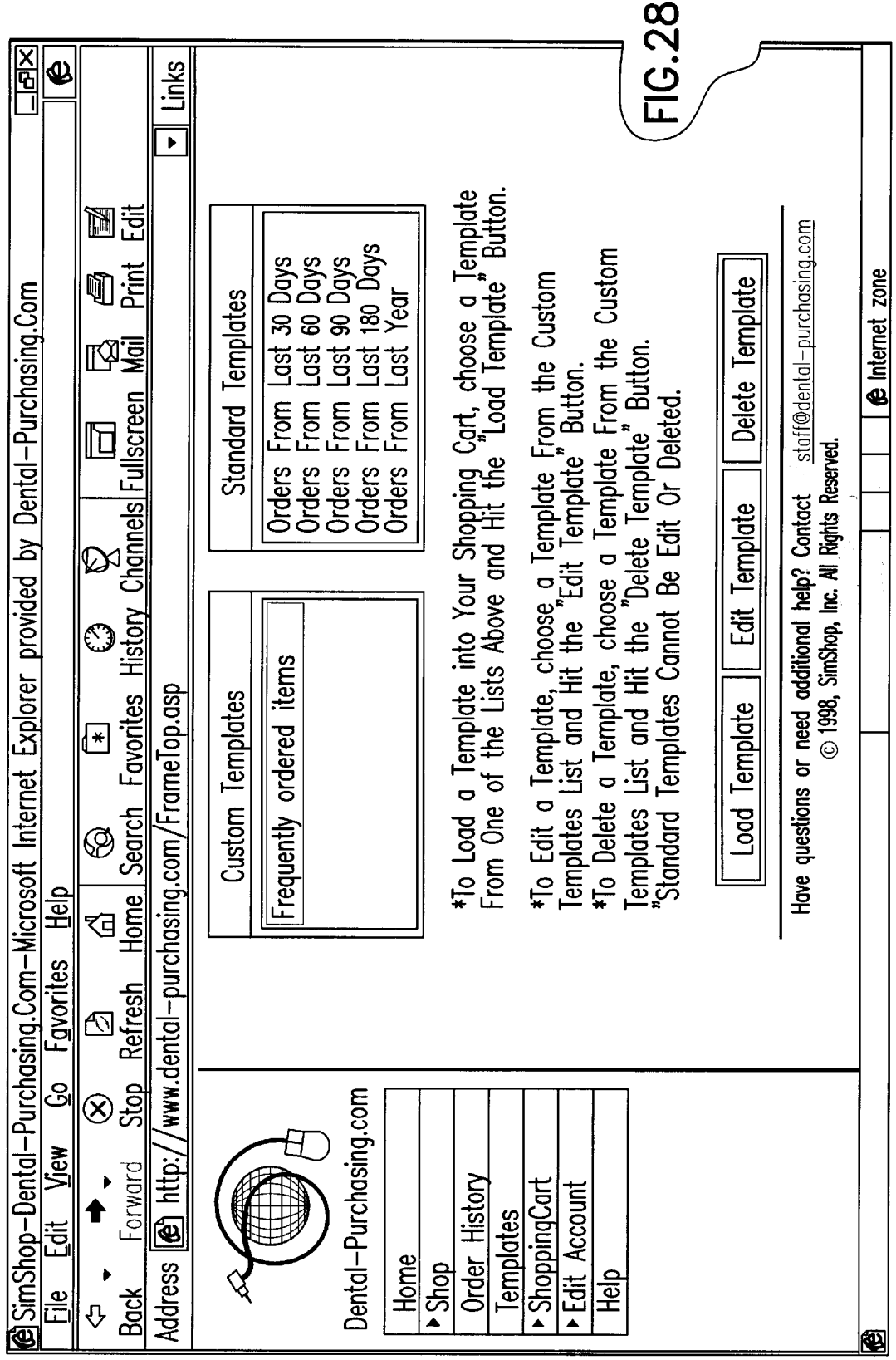

The shopping cart page also preferably permits the user to save a shopping cart as a template. Thus, for example, once the user selects the "save-as template" option, a "save template" screen, such as the screen displayed in FIG. 27, is displayed, which permits the template to be assigned a name and then saved. The template can then be accessed by the user, for example, via a custom template list, as shown in FIG. 28.

The system also preferably permits the user to edit various account information, such as primary contact information, billing contact information, shipping information, credit card information, and also preferably permits the user to change his or her password.

Figure 29:
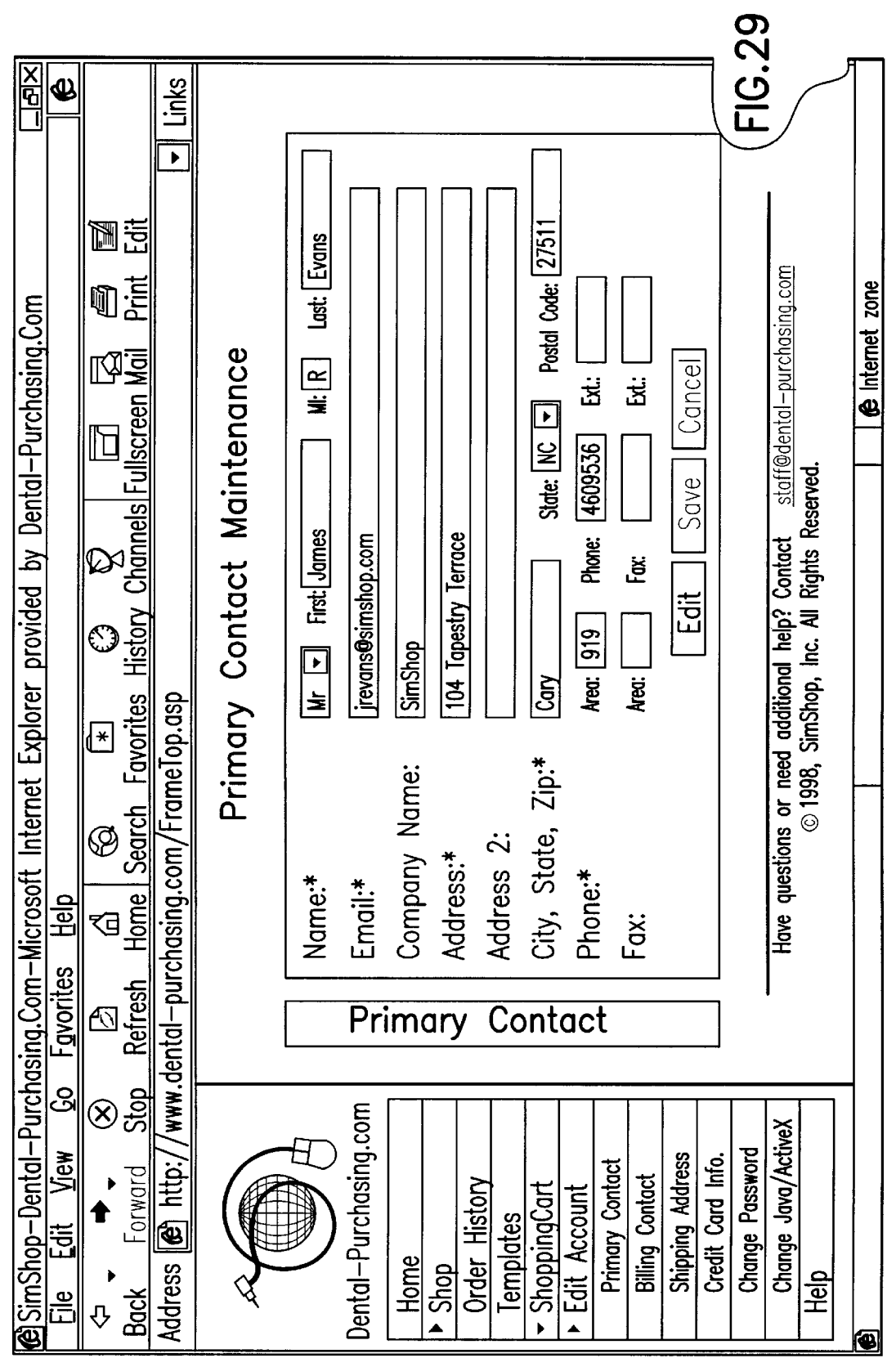

FIG. 29 shows an exemplary primary contact maintenance screen.

Figure 30:
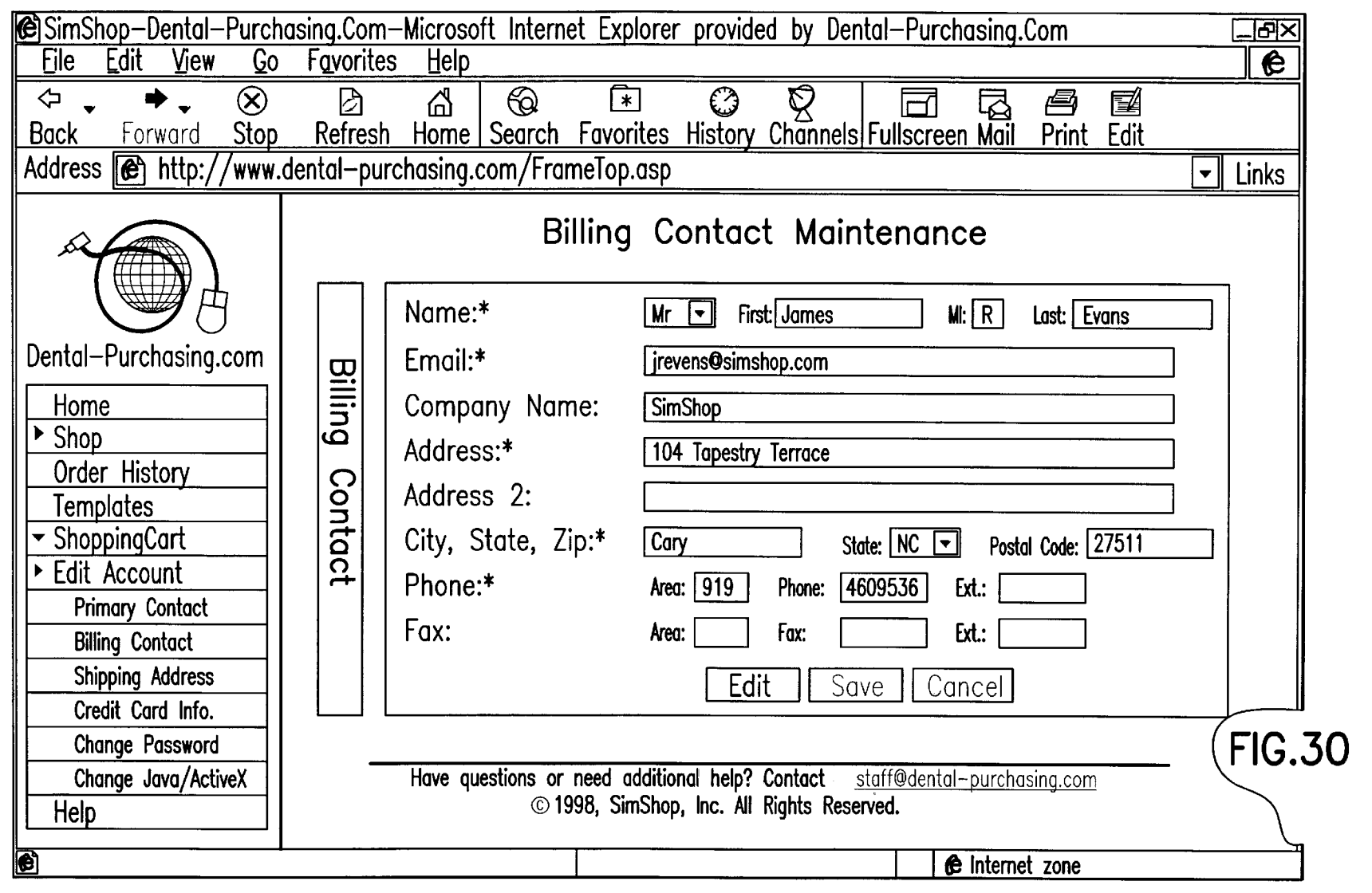

FIG. 30 shows an exemplary billing contact maintenance screen.

Figure 31:

FIG. 31 shows an exemplary shipping address maintenance screen. The shipping address maintenance screen preferably permits the user to enter multiple shipping addresses as well as the ability to toggle between those addresses, for example, by selecting the "previous" or "next" options as shown in FIG. 310.

Figure 32:
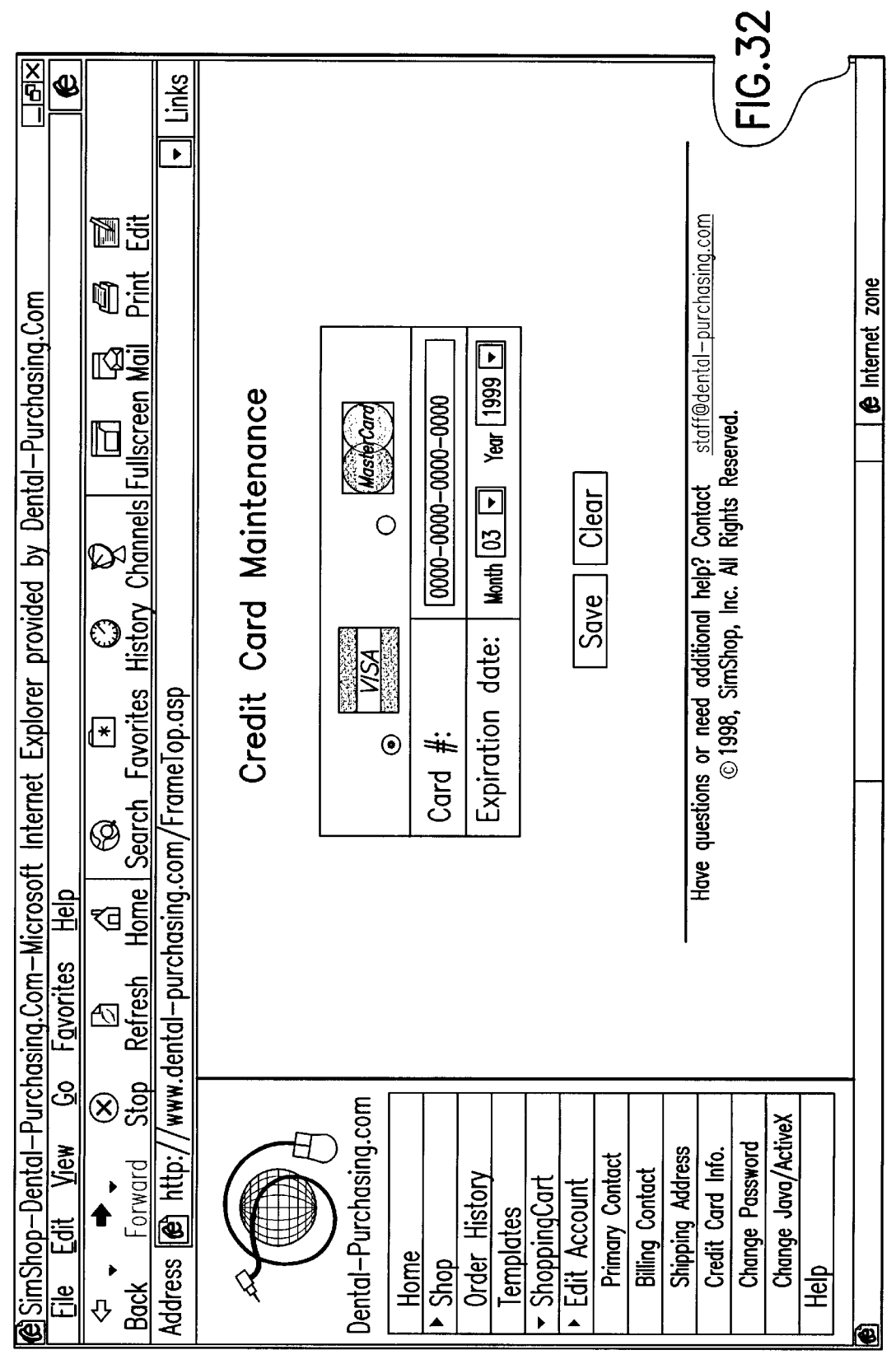

FIG. 32 shows an exemplary credit card information maintenance page.

Figure 33:

FIG. 33 shows an exemplary password maintenance page.

Figure 34:
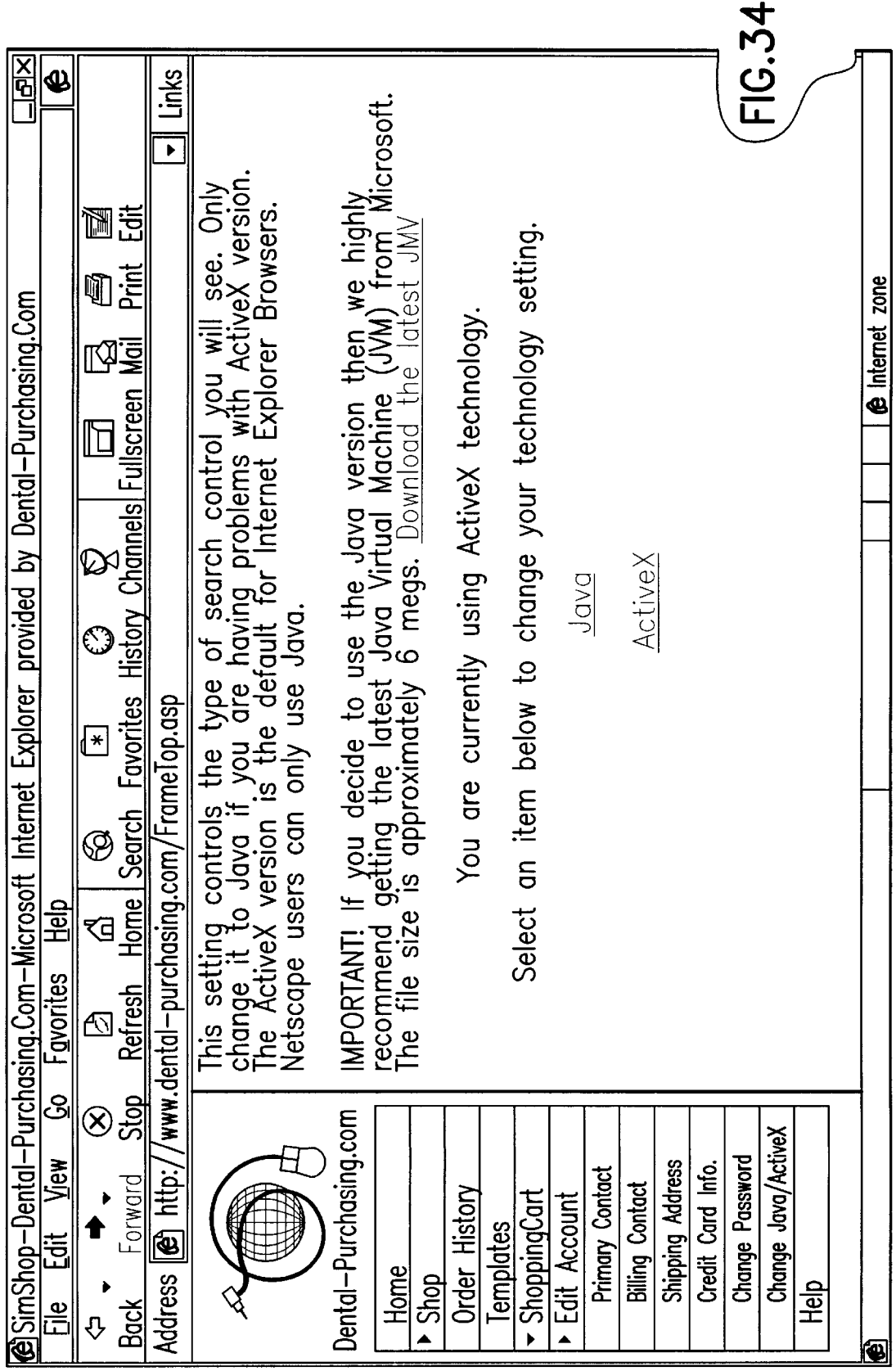

FIG. 34 shows an exemplary "change control software" page which permits the user to change the platform software in which the system is run. Thus, for example, the user can switch between the system as programmed in ActiveX and the system as programmed in Java.

Figure 35:
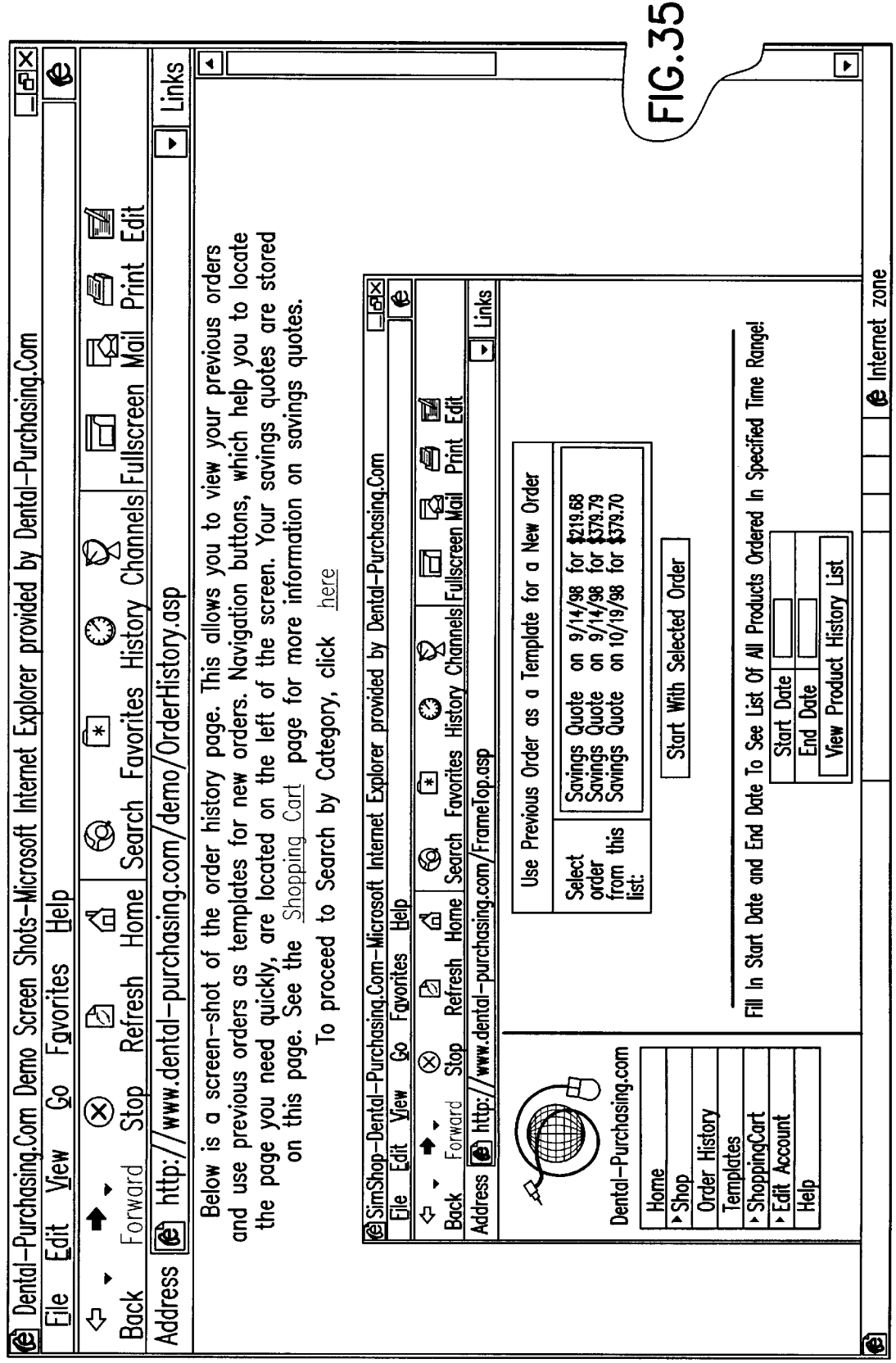

The system also preferably comprises a "help" function. Selection of the help option preferably brings up a context-sensitive help page which provides the user with information, such as helpful hints concerning the feature from which the help page is accessed. An exemplary help page is shown in FIG. 35.

Figure 36A:
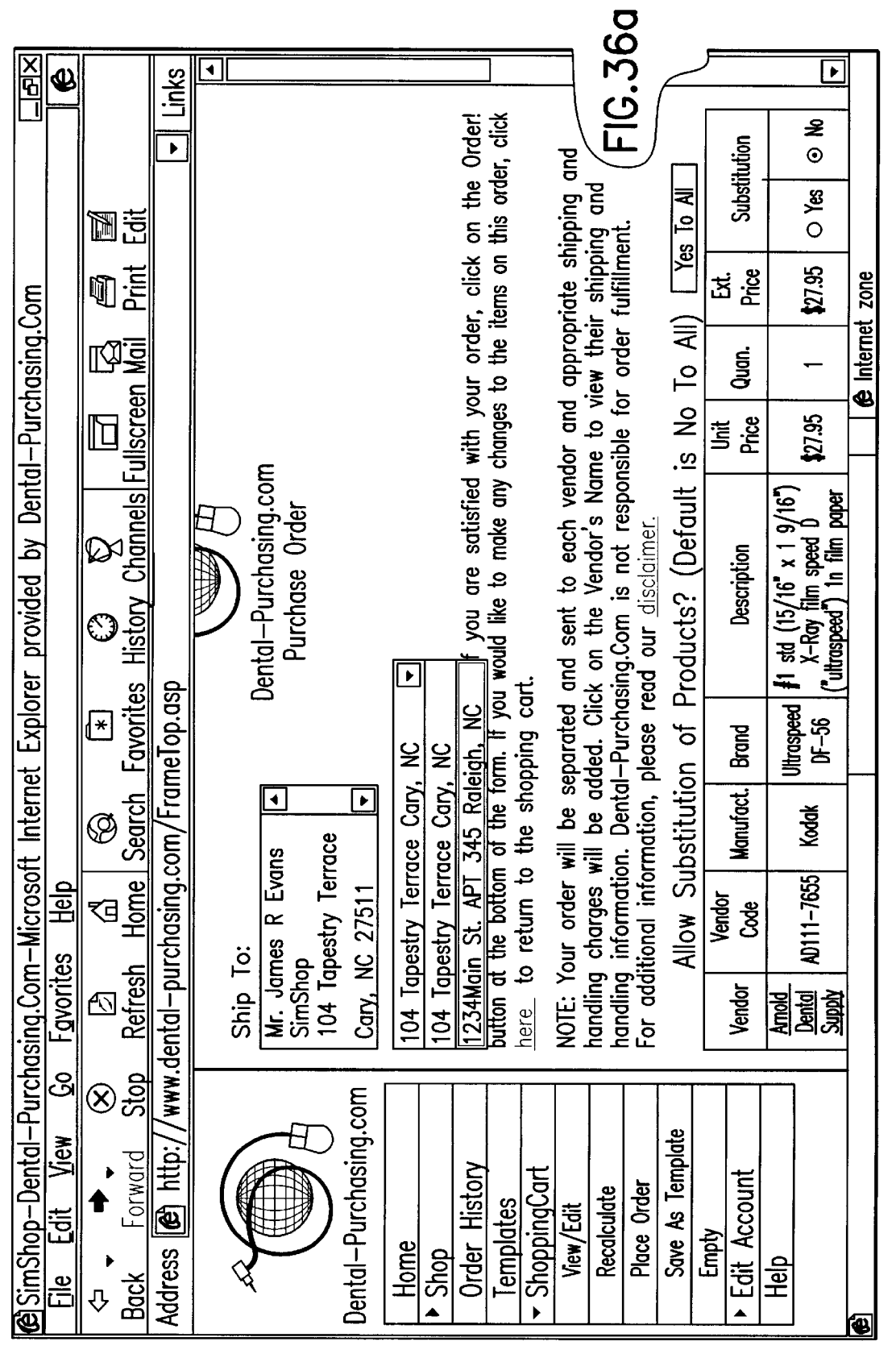

The system contains a means for using the shopping cart, as described more fully above, to place an order. The shopping cart page preferably has a means, such as a "place order" button, to access a purchase order screen. The purchase order screen preferably contains fields the user to change the shipping address, as shown in FIG. 36a. The user can preferably select one of the addresses, which are preferably maintained from a shipping maintenance page as discussed above.

FIG. 36b shows the second part of a purchase order page, showing a grid identifying the products from the shopping cart, as well as their prices. The grid also preferably includes a substitution option which permits the user to specify whether or not the user is willing to accept substituted products where the product as specifically ordered is not available. An exemplary substitution option is shown in FIG. 36b. The page preferably defaults to a "no to all" status and preferably has a "yes to all" function which permits the user to instantly select "yes" in all substitution fields.

The purchase order page also preferably has an "order" function which actually sends the order, as well as a "search again" function which permits the user to reenter the searching phase of the process and a "cancel order" function which cancels the order.

Figure 38:
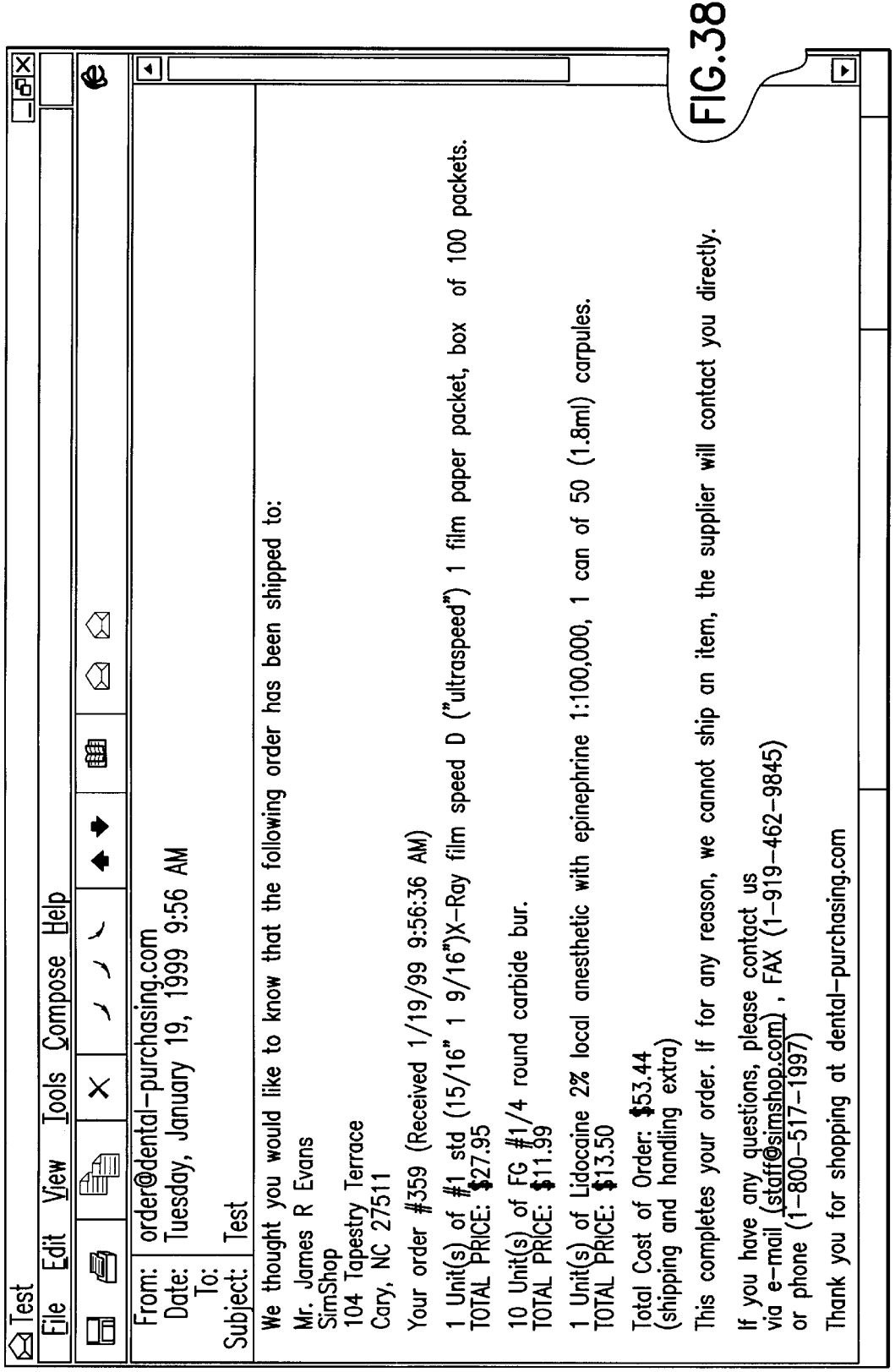

The order function preferably causes the system to display an order confirmation page which preferably displays the details of the order, as well as providing the user with an order confirmation number, as shown in FIG. 37. The order function is also preferably programmed to cause the system to send an e-mail to the user detailing the order and the order confirmation number. An exemplary e-mail is displayed in FIG. 38.

The user interface module also preferably contains a "shop as a guest" function which permits a non-registered user to explore the system but does not allow the actual placement of orders and omits pertinent information that would permit the non-registered user to use the system to find the cheapest prices and then order directly from the vendor. The "shop as a guest" function is designed to demonstrate the qualities of the site to potential users.

The user interface module also contains a "become a member" page which permits prospective users to enter information necessary for creating an account, for example, as shown in FIG. 39. The system is also preferably programmed to prompt a user for information which was omitted from the original member form. This prompting preferably occurs when the user attempts to make his or her first order, and preferably includes all information which is normally found in the "edit account" function.

The system also preferably contains a "how to become a supplier" option, which is preferably located on the main page and permits an unregistered vendor to access a vendor registration form. Once the vendor registers, the system permits the vendor to use the site to determine how it operates but preferably does not permit the vendor to place orders. The system also has a means for sending an e-mail containing the vendor registration information to the operator's sales and marketing department to permit further follow-up.

Data Entry Module

Figure 41:
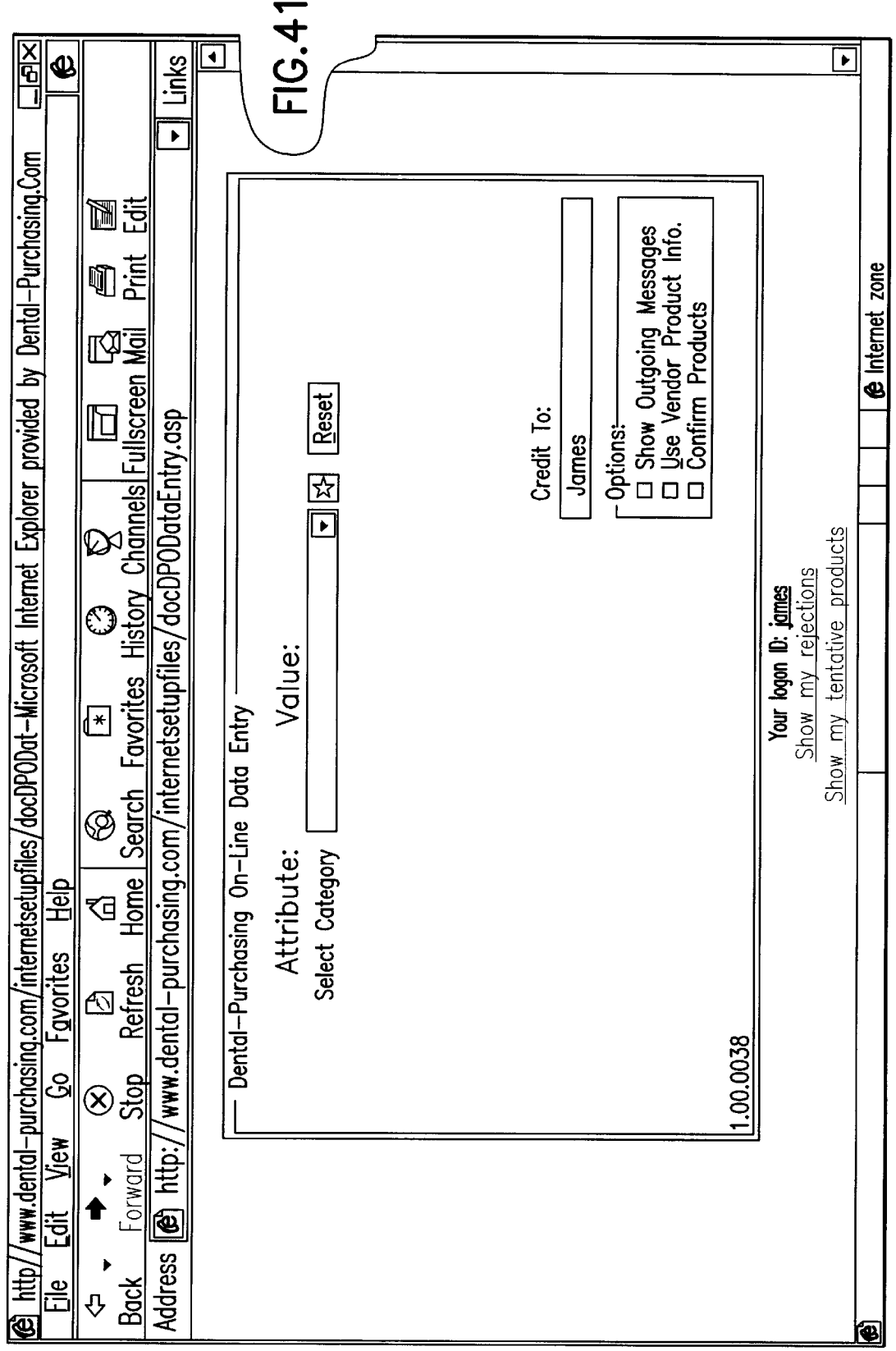
Figure 42:
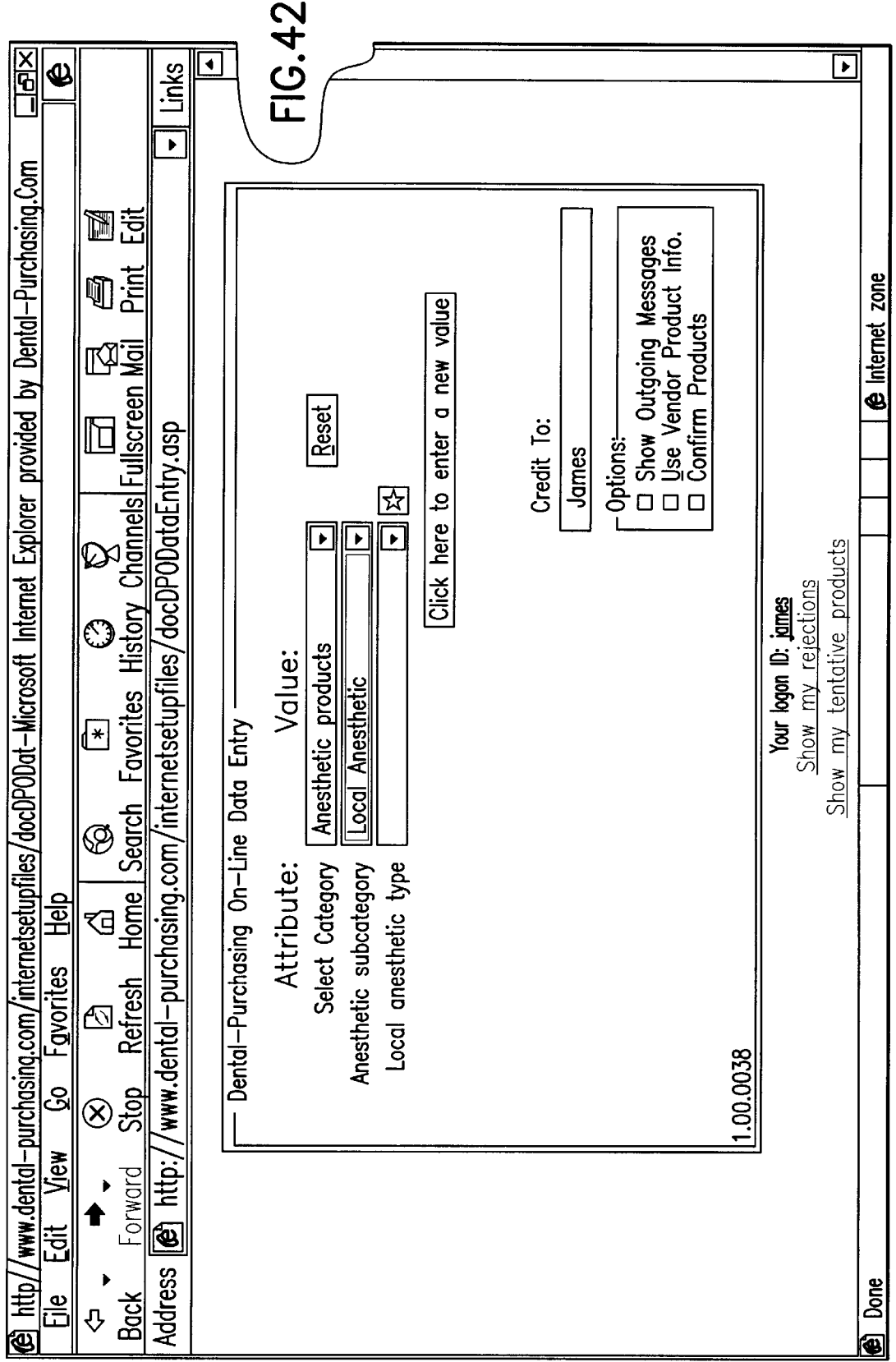

The Web site also contains a data entry module. The data entry module allows for categorization of products (or services) by a series of selected or created attributes and values. Attributes for products (or services) include properties such as color, size, packaging, dosage, material, etc. Values are specifications for attributes such as blue, large, package of 10, twenty-five milligrams, stainless steel, etc. FIG. 41 shows the main page of the data entry module. The data entry module preferably prompts the user to select from a series of pre-existing attributes and values in order to develop a structure of subcategorization that fully embodies the product, and which results in a generic (ex: no manufacturer or brand) description for the product. At any point, the user can select to enter a new value option for a given attribute in order to create a new generic product.

The user may initially select a product structure either by selecting existing structures (existing attributes and/or values) or creating a new structure (new attributes and/or values) or selecting all structure from a product that already exists.

To select a structure from a generic product that already exists the specifications for a product can be entered based on the set of attributes and values of an existing product in the database. The data entry module is preferably programmed to permit the user to link to a vendor information pop-up window where the user can enter information relating to the product's vendor, such as the vendor name as well as the vendor code, as shown in FIG. 43. Once the user has entered the vendor name and vendor code, the data entry module preferably displays a screen containing all attributes of the specified item, such as the screen shown in FIG. 44. Then manufacturer, brand, and vendor can be added to complete the process as described subsequently.

If all the attributes and values of a new product match a product which is in the database, the system preferably prompts the operator that the product is already in the database and asks the operator whether he or she would like to add another product having the same description to the database.

Next, the operator is preferably asked to either enter or verify the description for the product. If the product is an existing product, the user is preferably asked to verify the description for the product, as shown in FIG. 45.

Figure 46:
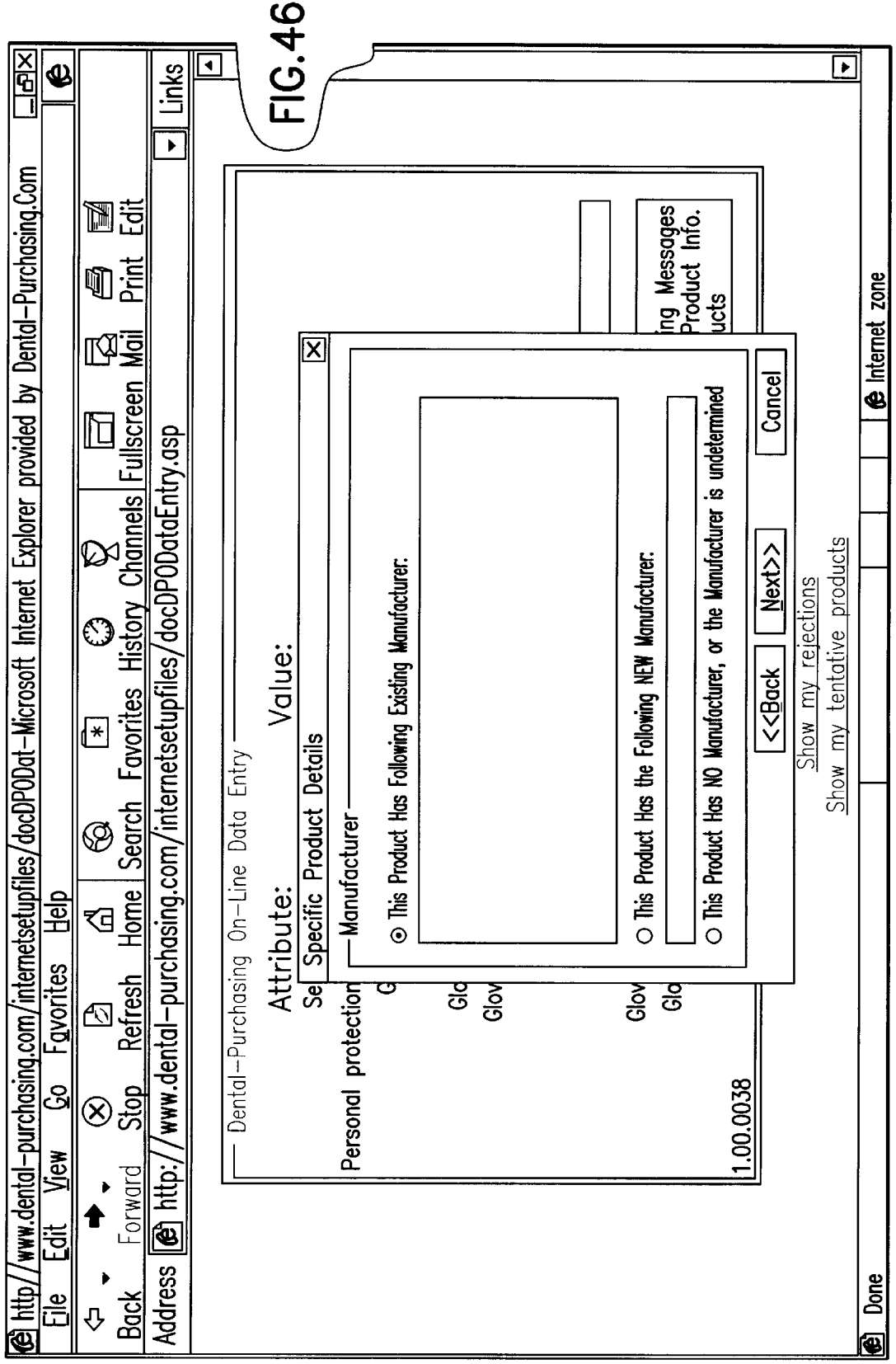

Next the user is preferably prompted by the data entry module to enter a manufacturer. The data entry module is preferably programmed to permit the user to specify an existing manufacturer, to add a new manufacturer or to indicate that the product has no manufacturer or that the manufacturer is undetermined, as shown in FIG. 46.

Figure 47:
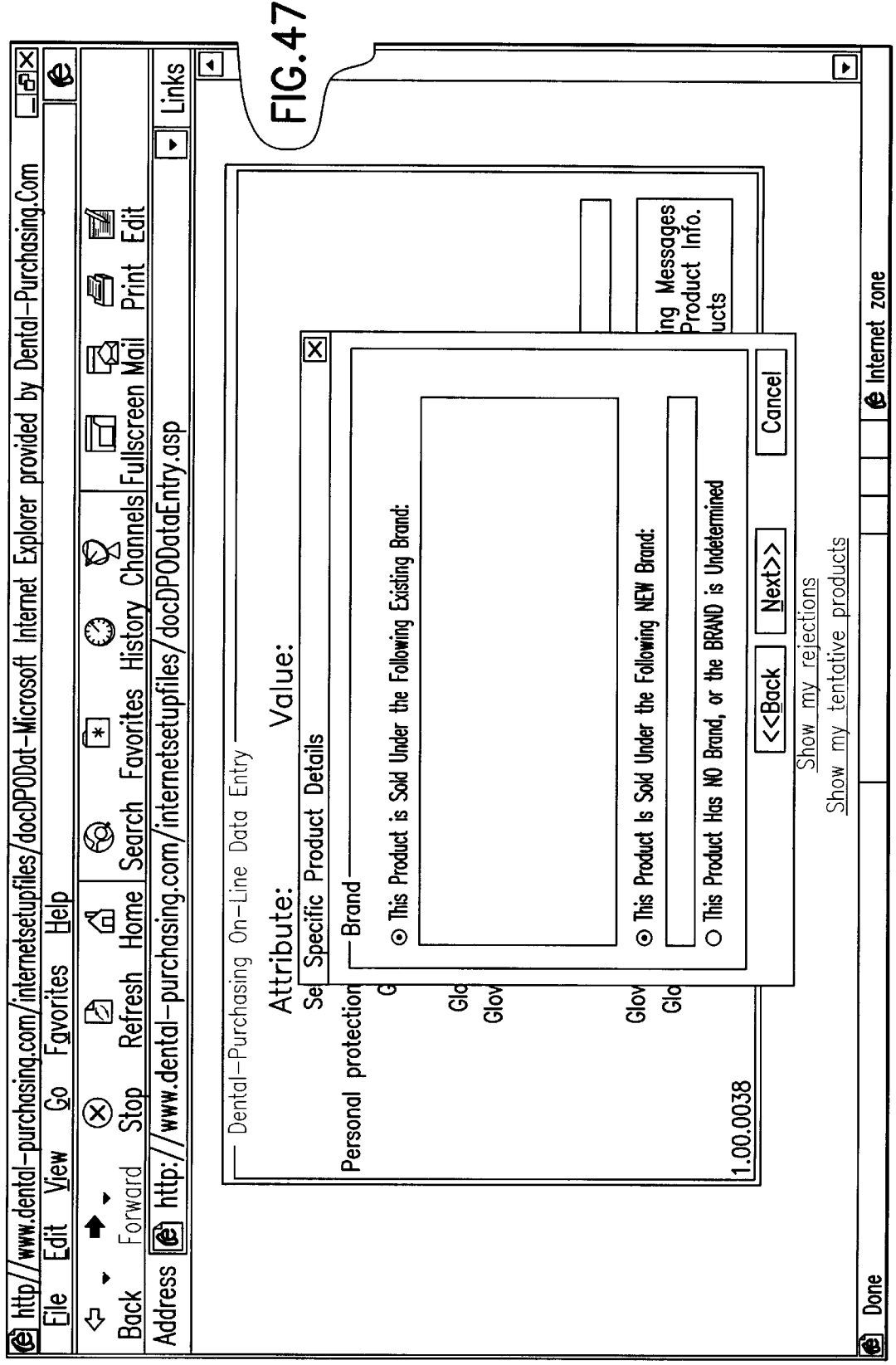
Figure 48:
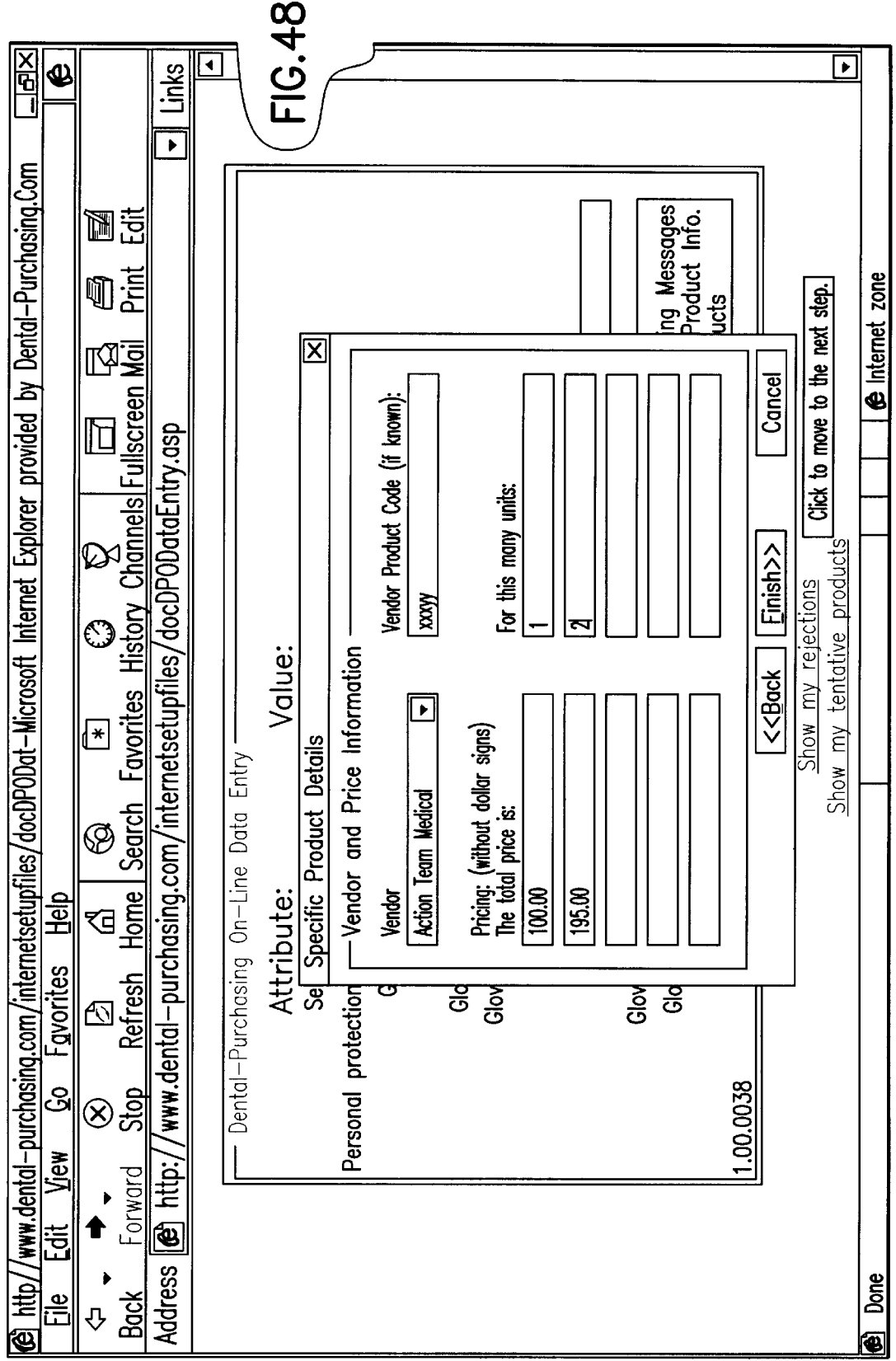

The data entry module then may prompt the operator to enter the brand of the product and has the option to select an existing brand, to enter a new brand, or to indicate that the product has no brand, or that the brand is undetermined, as shown in FIG. 47.

Finally, the user is asked to specify the vendor for the product, the vendor's product code, as well as the pricing and quantity information.

Next, the program may display a screen containing all the information which as been entered and prompt the user to verify the information, as shown in FIG. 49.

Figure 50:

Once all necessary information relating to the product has been added, the product is preferably added to the tentative product table to await verification. The product stays in the tentative product table until it has been approved. Once the product is approved, it is then admitted into the main database. The tentative product approval process preferably operates such that a single user cannot approve products which that user has entered. This mechanism improves the accuracy of the process by ensuring that more than one person has the opportunity to review each group of information prior to entry into the main database. FIG. 50 shows a picture of a product and the tentative product table.

Creating New Structure or New Attribute Value Chains

Figure 51:
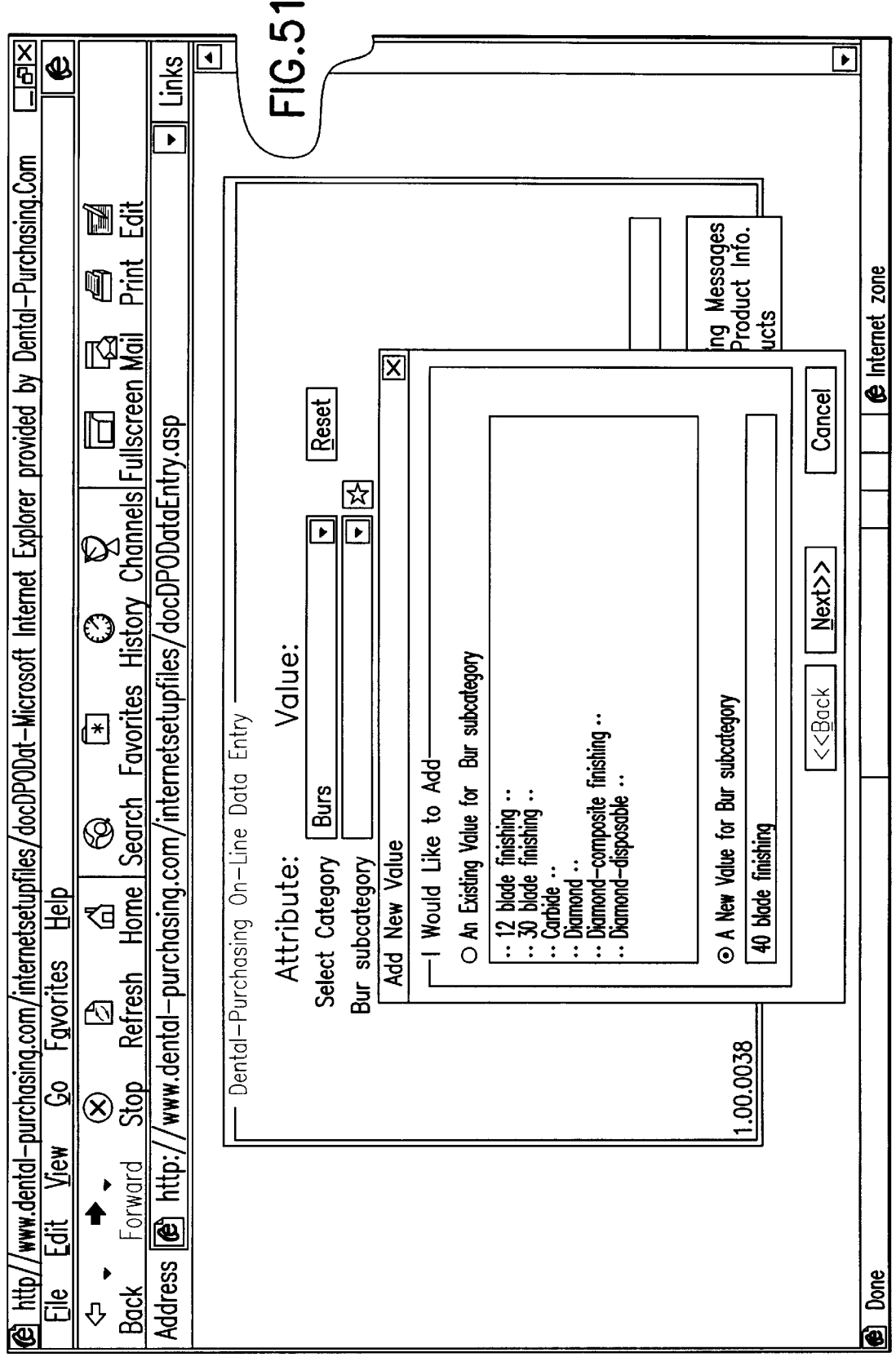
Figure 52:
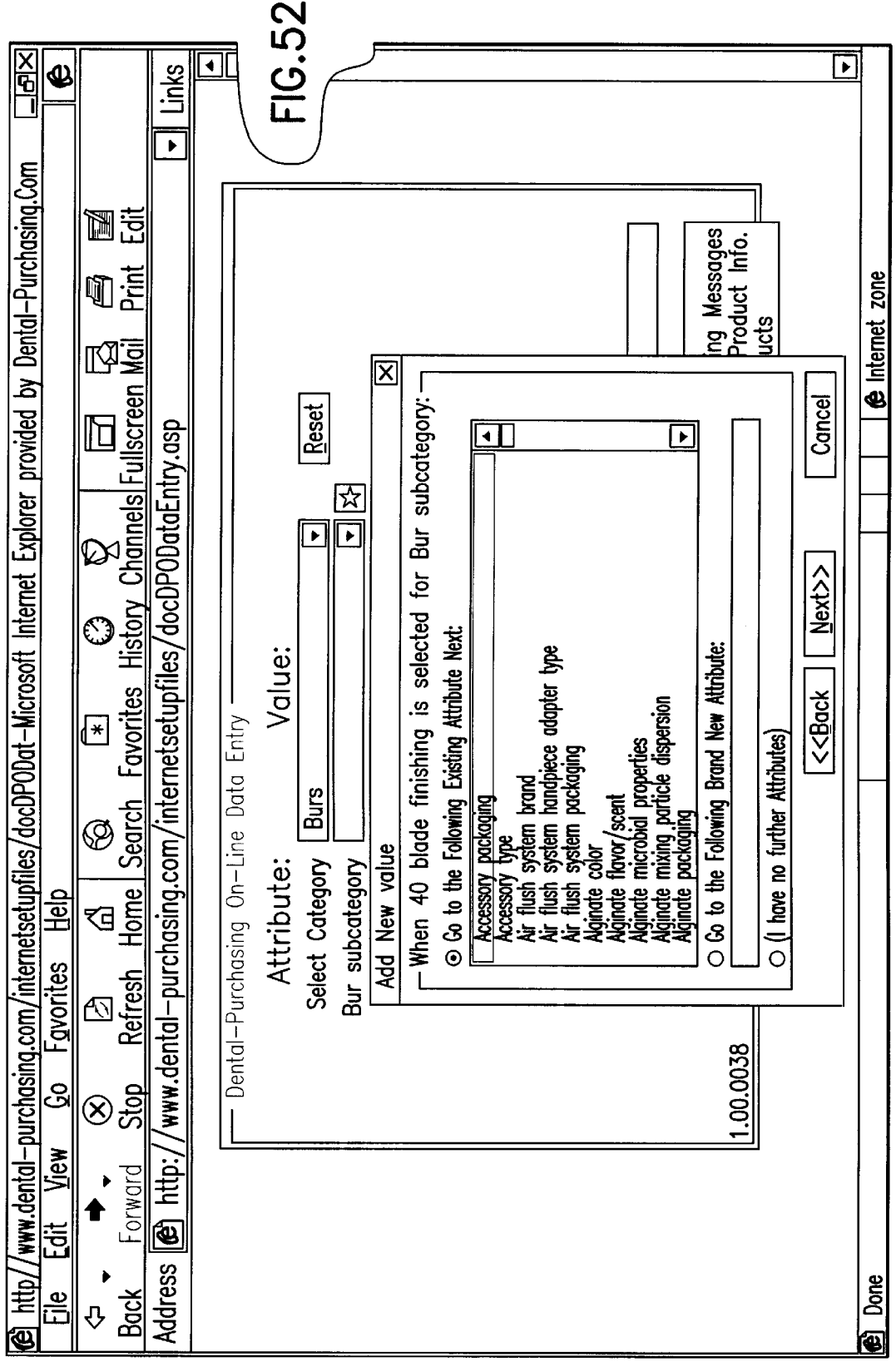

The pop-up menu for adding a new value to the database is shown in FIG. 51. After adding a new value, the user has the option of selecting an existing attribute from the next category. to determining which attribute will follow in the chain. The user can also enter a new attribute at any point to create a branch in the attribute value chain or can indicate that the attribute value chain has ended. A preferred pop-up for entering a new value is illustrated in FIG. 52. This data entry system can be utilized to categorize and correlate virtually any products or services the underlying structure and functionality being modular and replicable.

The Administration Utility

The system preferably contains an administration utility which interfaces with the database and with the other utilities. The administration utility preferably has the following basic features: an account maintenance feature, a reports maintenance feature, a vendor maintenance feature, a vendor product maintenance feature and a voice maintenance feature.

The account maintenance feature permits the system operator to edit user accounts and contact information.

The reports maintenance feature preferably contains a variety data entry reports which show which operator entered, or how many products an operator entered over a specified time period.

The vendor maintenance aspect permits the operator to add new vendors to the system, as well as the addition of information concerning the contacts and commission information for the particular vendor. Vendors can preferably be deleted or disabled and their product availability can be tagged as orderable, non-orderable, and visible or non-visible to the users. A disabled vendor preferably remains in the database but invisible to the user.

The vendor product maintenance section permits the updating of vendor pricing and quantity information.

The invoice maintenance form permits the creation of invoices that will be sent to the vendors. Preferred information includes vendor information, invoice number, from date and to date.

FIG. 53 shows a sample data entry report.

FIG. 54 shows a sample invoice.

Figure 55:
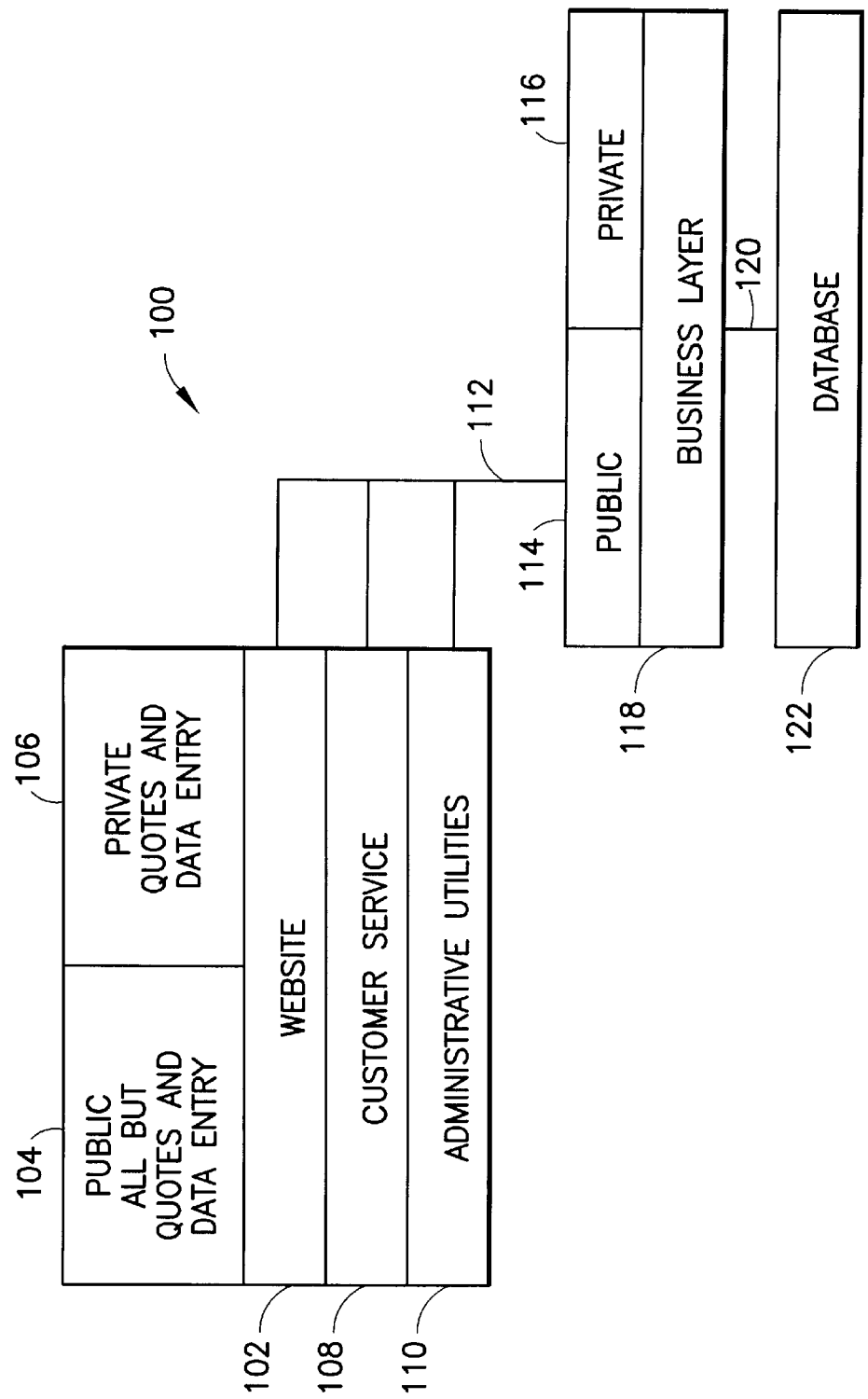
FIG. 55 is a schematic representation of an on-line purchase and sale system for conducting transactions in accordance with an illustrative embodiment of the invention.

FIG. 55 is a schematic representation of an on-line purchase and sale system 100 for conducting transactions in accordance with an illustrative embodiment of the invention.

The system 100 includes a Web site 102 having a public interface 104 that includes all operative functional characteristics except the quotes function and the data entry function. The quotes function and data entry function are contained in the private interface 106 associated with the Web site 102.

The Web site 102 is functionally linked by the software architecture to a customer service module 108 as well as to an administrative module 110.

The Web site 102, customer service module 108 and administrative module 110 together are linked by software code linkage (shown representationally by line 112 in FIG. 55) to the business module 118 by public interface 114. The public interface 114 interrelates with the private interface 116 (interface 116 being constituted by the underlying software code that interacts directly with the database 122) and the business module 118 is in turn functionally linked by software code linkage (shown representationally in FIG. 55 by line 120) to the database 122.

FIGS. 56–58 together constitute a schematic representation of the content of a dynamic database constructed to carry out an on-line purchase and sale transaction in accordance with the method of the invention, in one embodiment thereof.

In the database structure shown in FIGS. 56–58, the presence of an empty diamond (◇) denotes the source of the information in the field, while the presence of a filled circle (●) denotes the connection of the field value in the table with another table. The designation "(FK)" identifies a foreign key status of the information in the specific table, meaning that the specific field involved is referencing a primary index of another table.

It will therefore be seen that the database structure in FIGS. 56–58 is constructed of a number of tables. In the drawings of FIGS. 56–58, the tables are identified by a table name above the solid line box denoting the table and its contents. The contents of the respective tables are arranged in consecutive fields as shown.

As shown in FIG. 56, the database includes an Order Header table that includes an OrderHeader ID field providing an identifer for the order, and fields "Created On" to provide the date of the order, "Sales Tax" to identify the applicable state sales tax for the order transaction, "Shipping" to identify the shipping charges for the order transaction, "Total Amount" to identify the cost of the order, "LogonID (FK)" to specify the individual and/or group placing the order, "Quote Only" to designate the quotation character of the shopping basket contents in a non-purchase interaction, "All Commissions Paid" to denote the commission payment status of the transaction, "All Email Sent" to verify that electronic communications with the ordering party have been completed, and "Ship_ContactInfoID" to provide a number of the shipping documents accompanying the ordered of goods when shipped to the purchaser.

The database includes a Credit Card Type table containing fields for "CreditCard Type ID" to provide an identifier for the purchaser, and "Description" to specify the particulars of the credit account.

The database also includes a Consumer Type table containing fields for "Consumer TypeID" to identify the type of purchaser (e.g., individual practitioner, dental group, dental teaching hospital, etc.), and "Description" and "Dentist" fields providing the particulars for the purchaser.

The "CreditCard Type" table is operatively linked to the "CreditCardInfo" table which includes fields for "CreditCard InfoID" to provide an identifier for the purchaser, "CreditCardTypeID (FK)" to specify the brand of credit account (e.g., MasterCard, VISA, American Express card, etc.), "Number" to provide the account number for the purchaser's credit account, and "Expiration Date" to provide the final date of the active account.

The "Consumer Type" table and the "CreditCardInfo" table are each interlinked with a "Consumer" table containing a "LogonID (FK)" providing the purchaser's identification, "ContactInfoID (FK)" to specify the contact person at the purchaser's organization, "CreditCardInfoID (FK)" to provide an identifier for the credit account of the purchaser, "Bill_ContactInfoID (FK)" to provide the name of the contact person of the purchaser organization for billing purposes, "Ship_ContactInfoID" to correspondingly specify the name of the contact person in the purchaser organization for shipping purposes in respect of the ordered goods and/or services, and "DentistInfoID (FK)" providing the identifier information for the purchaser's dental professionals.

The "Consumer LogonID (FK)" register is in turn interconnected with the "DentistInfoID" register, containing "Practice_ContactInfoID (FK)" denoting the purchaser's organization's contact individual for information about the purchaser organization's practice, "StateLicense" providing the license/registration information for the practitioners in the purchaser's organization, "DEA" and "SSN" fields containing information about the specific practitioners affiliated with the purchaser's organization.

A "Vendor" table contains a "VendorID" field providing an identifier for the vendor. The fields in such table include "VendorName," providing the full business name of the vendor whose goods and/or services are offered at the Web site, "ContactInfoID (FK)" to provide the contact individual in the vendor's organization, "Bill_ContactInfoID (FK)" to specify the contact individual in the vendor organization who is responsible for billing issues, "Home Page" to specify the Universal Resource Locator (URL) or other identifier for the Web site of the vendor, that may be hyperlinked to the on-line shopping Web site, "Consumer Products" to identifier any goods and/or services in the consumer products category, "Commission Percentage" to specify the percentage commission applicable to purchase transactions consummated at the Web site that involve such vendor's products, "Active" and "Archived" to indicate the currently active or alternatively inactive status of the vendor, "OrderActive" to denote the status of any outstanding order transactions involving the vendor, and "BrowseActive" to denote the viewable character of the wares offered by the vendor at the on-line shopping Web site.

The database includes a "VendorProduct" table containing fields for "VendorProductID," "ManufacturerID (FK)," "VendorID (FK)," all relating to the identifiers for the parties to the transaction and the original equipment manufacturer (OEM) of the goods involved, "VendorProductCode" giving the identifier for the item or service involved, "DPOProductID (FK)" referring to the product identifier at the on-line shopping Web site, "CreatedOn," "CreatedBy_LogonID (FK)," "Approved," and "ApprovedBy_LogonID (FK)," to document the identity of the data entry party, and the approved character of the entry, "PhotoPath" to denote the graphic character of the entered information, "Active" and "Archived" to indicate current or historical character of the entered information, and "Detailed Description" to provide additional information about the product involved.

The "VendorProduct" table is connected to other tables including the "OrderLine" table, which includes various fields, comprising an "OrderLineID" identifier for the order transaction, "VendorProductID (FK)," and "OrderHeaderID (FK)" for identifiers for the product involved, and "Quantity," "PricePerUnit" and "Invoiced" to provide the quantity, unit price and billed character of the order transaction. The fields included in such table also include "EmailSent" to document the confirmed character of the transaction by electronic verification to the parties involved. Finally, the "Substitution" field indicates whether or not the purchaser allows substitutions to be made for the specific goods or services involved.

The "Price" table is at the lower left hand corner of the drawing in FIG. 56, and includes "VendorProductID (FK)" and "MinimumQuantity" fields to specify the vendor's product code and applicable minimum quantity that may be required for the sale of certain items offered at the on-line shopping Web site. The "Price" table also includes "Price," "Active" and "Archived" fields, to reflect the pricing, and- the current or alternatively historical character of the pricing present in such table.

The "Brand" table contains the "BrandID" field and "ManufacturerID (FK)" field to identify the product brand name and the identifier for the manufacturer of the offered product. The "Brand" table also includes "Description" and "Active" fields to further particularize the brand and the current status of the brand.

To the right of the "Brand" table is the "Manufacturer" table, containing the "ManufacturerID" field identifying the manufacturer of products offered at the Web site, together with the fields "Description" and "Active" providing additional information about the manufacturer as well as the current status of such manufacturer.

To the right of the "Manufacturer" table is the "Attribute" table, containing an "AttributeID" field listing the attributes for which values are set out in the operation of the Web site software, as well as the fields "Description" and "Active" providing additional information about the attributes as well as the current status of such attributes.

Immediately below the "Attribute" table is an "AttributeValue" table, which contains the field "AttributeValueID" as an attribute specifier of the values for each attribute, as well as the fields "Description" and "Active" providing additional information about the attribute values as well as the current status of such attribute values.

To the left of the "AttributeValue" table is the "DPODetail" table, containing the field "DPOProductID (FK)" denoting the identifier for the product code as used at the on-line shopping Web site, the field "OrdinalIndex" providing an indexed field of the product codes, the field "AttributeID (FK)" which provides an identifier for the attributes in the table, and the field "AttributeValueID (FK)" which provides a correlative identifier for the values associated with the attributes in the table.

Next adjacent (in the leftward direction) to the "DPODetail" table is the "DPOProduct" table, containing the field "DPOProductID" denoting the identifier for the product code as used at the on-line shopping Web site, the field "Description" providing a further specification of the product codes, the field "CreatedOn" which provides the date of entry of the data entries in the table, the field "CreatedBy_LogonID (FK)" to denote the data entry operator providing the input of data in the table, and the field "Active" to denote the current status or historical status of the information in the table.

At the bottom portion of FIG. 56 are order template tables, including "OrderTemplateLine" and "OrderTemplateHeader" tables. The "OrderTemplateLine" table includes a field for "OrderTemplateLineID" information as an identifier for the table information, the field "OrderTemplateHeaderID (FK)" as the identifier for information in the header of the template, a "VendorProductID (FK)" field for the vendor product codes of the products displayed for purchase at the Web site, and a "Qty" field relative to the specification of quantity information associated with the products purveyed at the Web site.

The "OrderTemplateHeader" table includes field "OrderTemplateHeaderID" for the identification of the template header for the order, the field "LogonID (FK)" for the identification of the user of the site, and the field "Description" for further information concerning the order template used at the Web site.

In FIG. 57, additional tables of the database structure are depicted, and include the LogonRecords" table, including a "CountID" field for tracking the specific frequency of interaction by the user with the Web site, a "LogonID (FK)" field containing the user identifiers comprising the logon identifiers, a "TIme and Date" field containing historical information on the user's prior interactions with the database, a "RemoteHost" field specifying the remote host computer involved in the interaction, a "RemoteIPAdd" field specifying the Internet protocol address for the remote user, and a "Status" field providing the category of the user reflecting prior or potential use of the Web site.

Immediately below the "LogonRecords" table is a "Shopping Cart" table, containing a "LogonID (FK)" field identifying the user of the Web site, a "VendorProductID (FK)" field containing the vendor codes for the purveyed products, and a "Qty" field reflecting the number of the product units in the Shopping Cart.

A "Logon" table is to the right of the "LogonRecords" table, and includes a field for "LogonID" containing the identifiers for the users of the Web site, a field for "Password" assigned for each user of the site, an "Active" field denoting the current or historical character of the user of the site, a "DataEntry" field relating to the information inputted for the shopping purchase and sale transactions, a "OrderProducts" field identifying the order information relating to the specific user, a "ConfirmProducts" field relating to confirmation information relative to the confirmation of orders placed by a user, an "Admin" field for the information relating to interaction with other administrative functions of the database, a "Note" field for information about the user, a "HeardFromCode" denoting the verification of contact by the Web site operator, and a "RegisterDate" field containing the information of the calendar date of registration at the Web site by a user.

The "ContactInfo" table is below the "Logon" table, and contains a "ContactInfoID" field for identifying the individual to be contacted at a user organization relative to transactions by the organization at the Web site. The fields included in such table for such organization include "FormOfAddress (FK)," "FirstName," "MiddleInitial," "LastName," "CompanyName," "BirthDate," "Email," "CountryID (FK)," "StateID (FK)," "City," "Address1," "Address2," "PostalCode," "PhoneAreaCode," "Phone," "PhoneExt," "FaxAreaCode," "Fax," "FaxExt," and "Note" fields, providing the contact information for the organization.

The database further includes a "TentativeProduct" table including fields relevant to potential products to be advertised at the Web site, including "TentativeProductID," "QueryString," "CreatedBy_LogonID (FK)," and "CreatedOn" fields therefor. Ancillary to such TentativeProduct table, there is provided a "TentativeProductReject" table, which includes various associated fields, of "TentativeProductID," "QueryString," "CreatedBy_LogonID (FK)," "CreatedOn," "RejectedOn," and "RejectedBy_LogonID" for processing new product listing queries and for rejecting same as unacceptable for inclusion in the database.

A "DataEntryRates" table is included in the database, with fields for "LogonID (FK)," "DPOProductRate," and "VendorProductRate." These fields address the rates for data entry that are applicable to inputted information.

A "ShipAddr" table is provided, which includes shipping information for products that are purchased at the Web site, including fields of "ShipAddrID," "LogonID (FK)," and "ContactInfoID (FK)."

A "FormnsofAddress" table provides a "FormofAddress" field containing the contact addressing format for the database.

A "Country" table is included in the database, including fields of "CountryID" for respective country codes, and "Description" and "Active" fields for such country listings. A corresponding "State" table includes fields for "StateID," "Description," "Abbreviation," and "CountryID (FK)."

Next, a series of tables address administration of user interactions with the Web site. A "LogonPermissions" table includes fields for "LogonID (FK)," "PermissionID (FK)," and "Customer Service." A "Permissions" table includes fields for "PermissionID," followed by the number fields "One," "Two," "Three," "Four," "Five," and "Six," providing up to six individuals with ordering ability in the user organization.

A "Category" table includes "CategoryID" and "Description" fields relative to categories of users of the Web site.

Customer service functions are provided by the "CallTracking" table, relative to monitoring and responding to user contacts. The "CallTracking" table includes a multiplicity of fields: "CallTrackingID," "Consumer_LogonID (FK)," "Date," "CategoryID (FK)," "FollowUpRequired," "FollowUpDate," "FollowUpPerson," "FollowUpCompleted," "Notes," "Company," "Phone," "Fax," "Email," "Name," "FollowUp_CallTrackingID," "timestamp," "Consumer_LogonID," "TookCall_LogonID (FK)," and "LogonID (FK)."

An "UpdatePrices" table in the database accommodates revisions of pricing and minimum quantity criteria of the offered products, and includes the fields of "VendorProductCode," "MinimumQuantity," and "Price."

Referring now to FIG. 58, various order processing functional tables are included in the database, including a "ReptTransactionList" table (containing fields of "OrderHeaderID," "CreatedOn," "VendorID," "VendorName," "VendorProductCode," "Quantity," "PricePerUnit," "Invoiced," and "QuoteOnly"); a "RptInvoiceHeader" table (containing fields of "InvoiceNum," "InvoiceDate," "VendorID," "Inv_ContactInfoID," "TotalCommDue," "AmtReceived," "BalanceDue," and "PercentComm"); a "RptInvoiceLine" table (containing the fields of "InvoiceLineID," "InvoiceNum," "OrderHeaderID," "VendorProductCode," "Quantity," "UnitPrice," "SubTotal," "CommDue," and "OrderDate"); an "InvoiceHeader" table (containing the fields of "InvoiceNum," "InvoiceDate," "VendorID," "Inv_ContactInfoID," "TotalCommDue," "AmtReceived," "Balance Due," and "PercentComm"); an "InvoiceLine" table (containing fields of "InvoiceLineID," "InvoiceNum," "OrderHeaderID," "VendorProductCode," "Quantity," "UnitPrice," "SubTotal," "CommDue," and "OrderDate"); and an "InvoiceContactInfo" table (containing fields of "InvoiceContactInfoID," "InvoiceNum," "FormofAddress," "First Name," "Middle Initial," "LastName," "CompanyName," "BirthDate," "Email," "CountryID," "StateID," "City," "Address1," "Address2," "PostalCode," "PhoneAreaCode," "Phone," "PhoneExt," "FaxAreaCode," "Fax," "FaxExt," and "Note").

In operation, the database operates to provide the funtionality previously described in connection with the graphical user interface screens and reports of FIGS. 1–54.

FIGS. 59–72 show various screens constituting graphical user interface output of a Web site software computer program according to another aspect of the invention, deriving from a Customer Service Utility module of such software program.

Customer Service Module

The look, feel, function, content and operation of the Customer Service Utility module will be readily apparent from the screens depicted in FIGS. 59–72.

Figure 59:
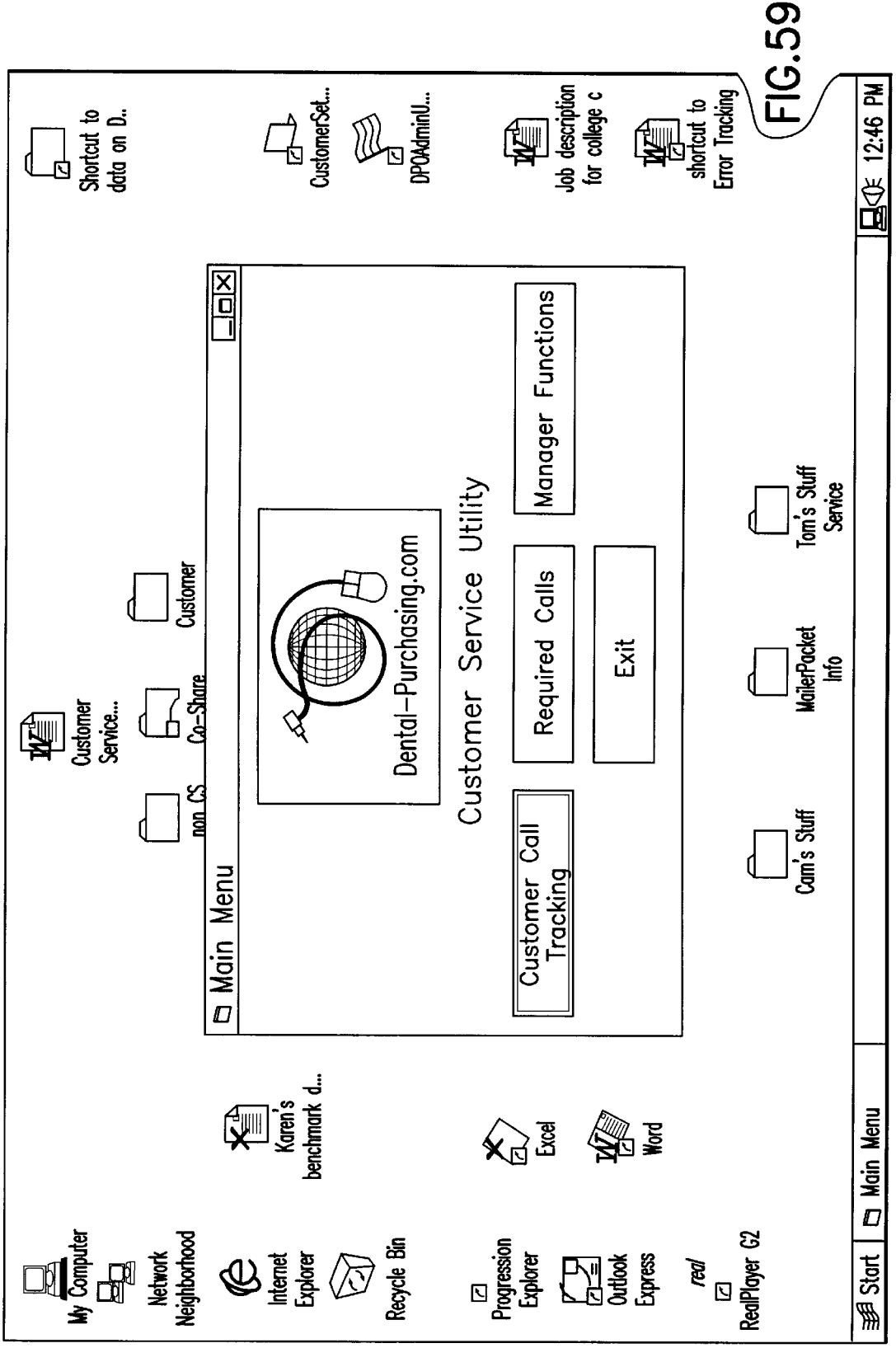
Figure 60:
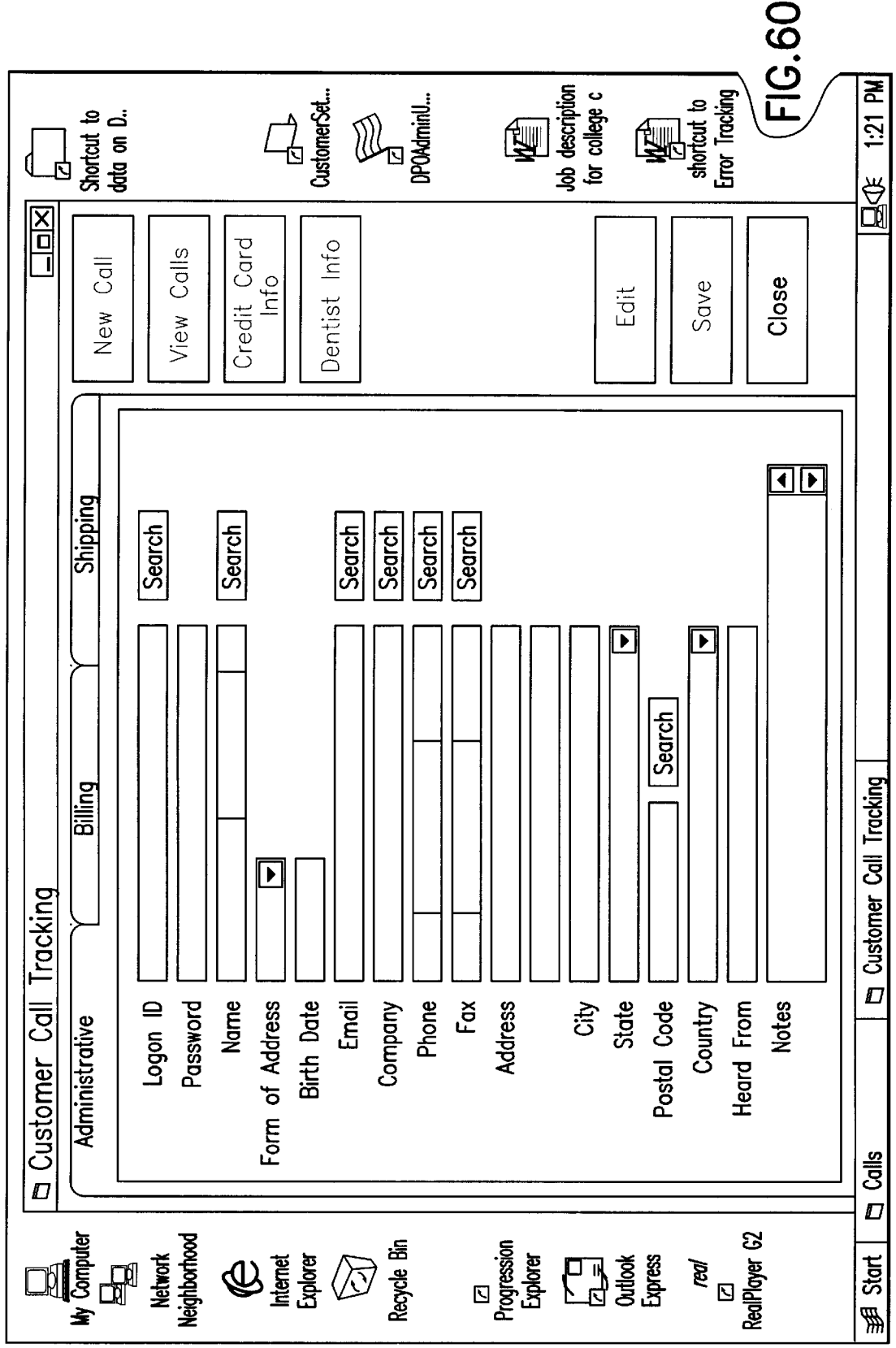

The customer service utility preferably has a main menu page. FIG. 59 shows an exemplary main menu page which permits the operator to open the "customer call tracking" function, the "required calls" function, and the "manager" functions, as well as permitting the operator to exit the program.

The customer service utility preferably has a customer call tracking function. The customer call tracking function can be divided into areas such as administration, billing function and shipping function.

The administrative function preferably includes administrative information such as the user's log-on identification and password, name, form of address, birthday, e-mail address, company, telephone, facsimile, address, city, state, postal code, country, as well as fields for entering information such as when the last time the user was contacted and for entering any miscellaneous notes. The administrative function preferably references a database and the database is preferably searchable on various fields within the administrative function, such as log-on identification, name, e-mail address, company, telephone, facsimile, or postal code, in order to facilitate various customer service searches. A preferred customer call-tracking screen is displayed in FIG. 60.

Figure 61:
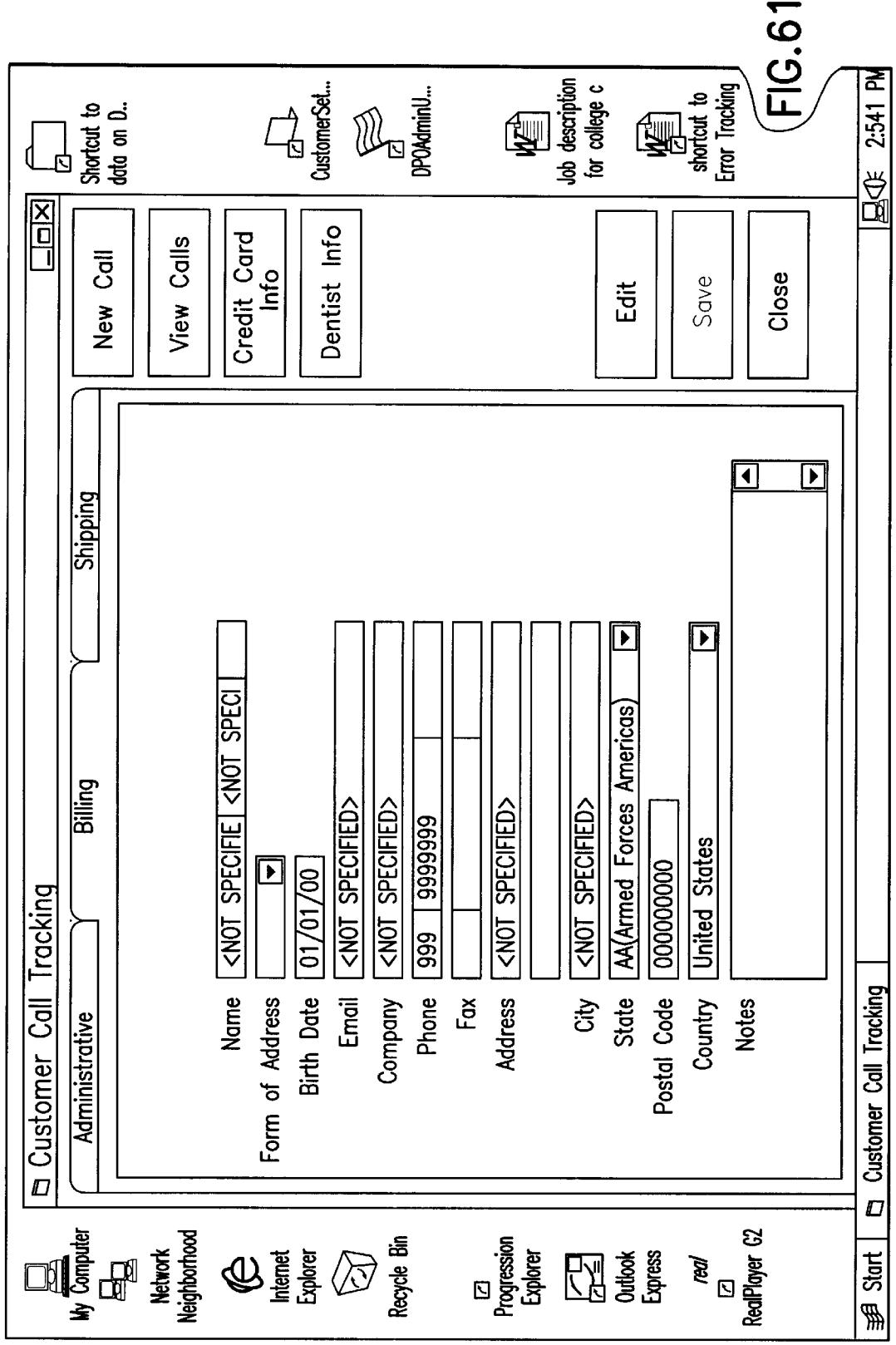

The customer call tracking function also preferably has a billing function. The billing function preferably contains fields such as the customer name, form of address, birth date, e-mail address, company, telephone, facsimile, address, city, state, postal code, country, and a field for various notes. A preferred customer call-tracking screen, which interfaces with the customer service database, is illustrated in FIG. 61.

The customer service utility also preferably includes a shipping function, which permits the customer service operator to view information from the customer service database, including fields such as name, form of address, birth date, e-mail address, company, telephone, facsimile, city, state, postal code, country, as well as a field for entering various notes. Furthermore, the customer call tracking shipping function preferably contains a means for switching between various shipping addresses used by single customers. For example, any particular customer may have multiple shipping addresses, and the customer call tracking shipping function preferably permits the customer service operator to toggle between such addresses as necessary.

Each of the customer call tracking functions, such as administrative billing and shipping functions are preferably accessible from a single customer call tracking generalized screen, as shown in FIG. 62. The access to the various administrative billing and shipping areas can be via a virtual tab system, whereby the user can select various tabs located across the top of the customer call tracking window in order to access the various customer call tracking functions. Furthermore, the customer call tracking function preferably contains a means for permitting the user to access screens for entering new calls, for viewing old calls, for entering or editing credit card information, and for entering or editing dentist information.

Figure 63:
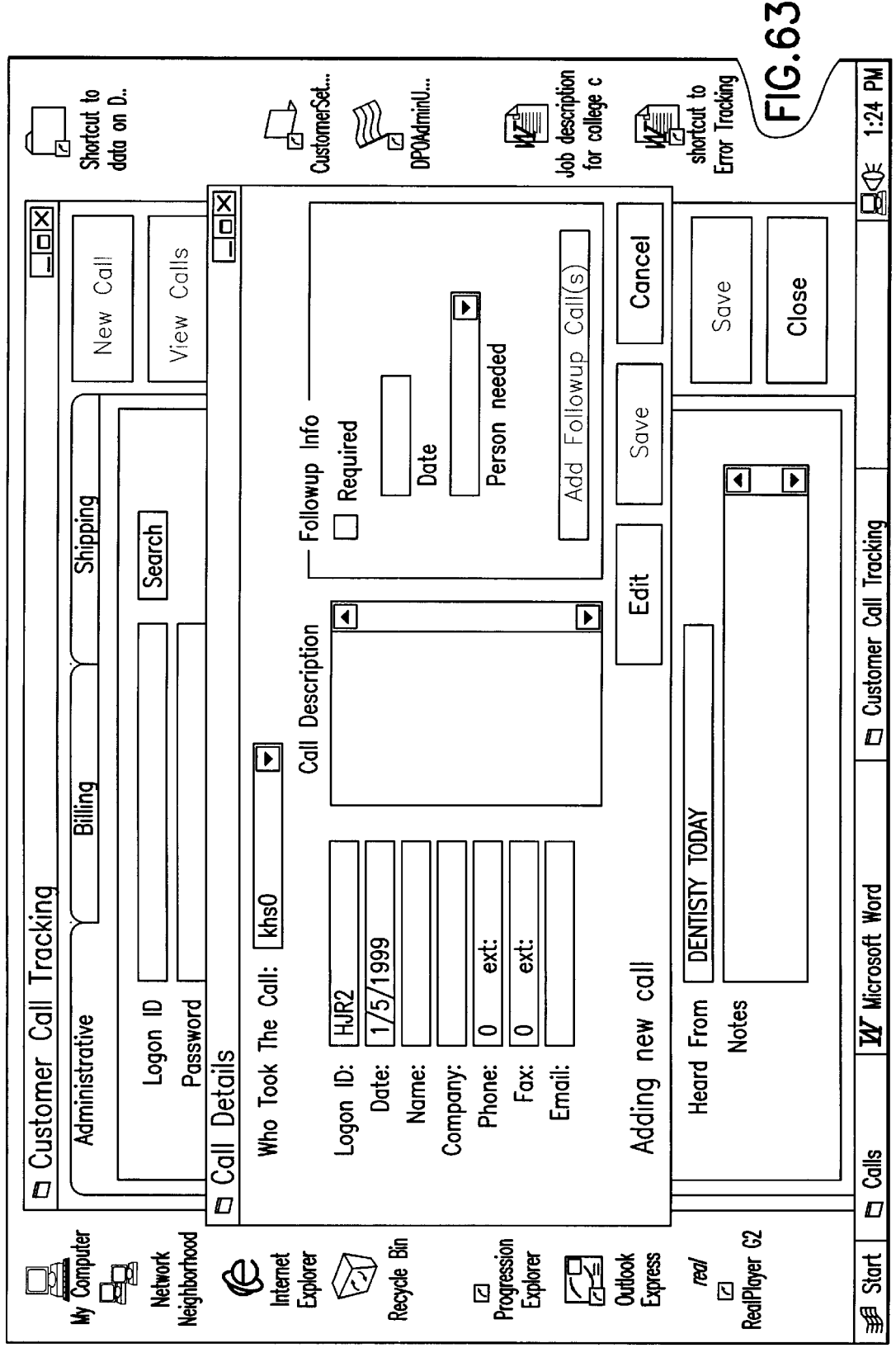

FIG. 63 shows a call detail screen which is accessible from any of the customer call tracking function screens, and which permits the customer service operator to enter a call description, as well as permitting the customer service operator to enter reminder information for following up on the customer contact. The follow-up information is stored in the database where it can be accessed from various screens in the system, such as the call list screen in order to track the record of customer contacts. Once the customer service operator enters the call description, the record can then be saved by accessing a save function, such as by pressing the virtual save button as shown in FIG. 63. The call details screen also preferably has fields for information such as the operator who took the call, the log-in identification of such operator, the date of the call, the name of the customer being called, the company of the customer being called, the telephone number of the customer being called, the facsimile number of the customer being called, and the e-mail address of the customer being called. The call details customer tracking function may also be provided with a means for instructing the computer to dial the customer's telephone number.

Figure 64:
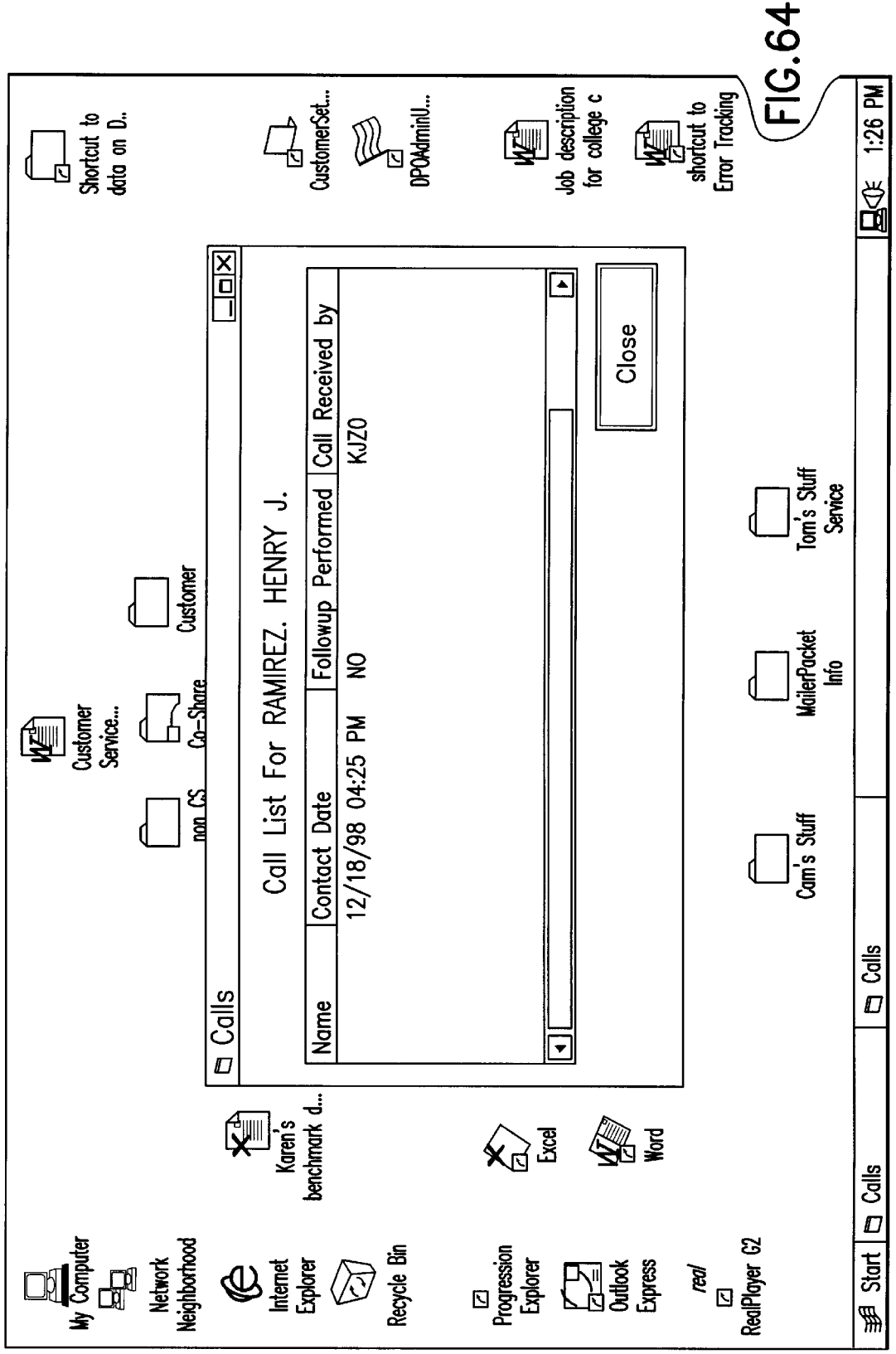
Figure 65:
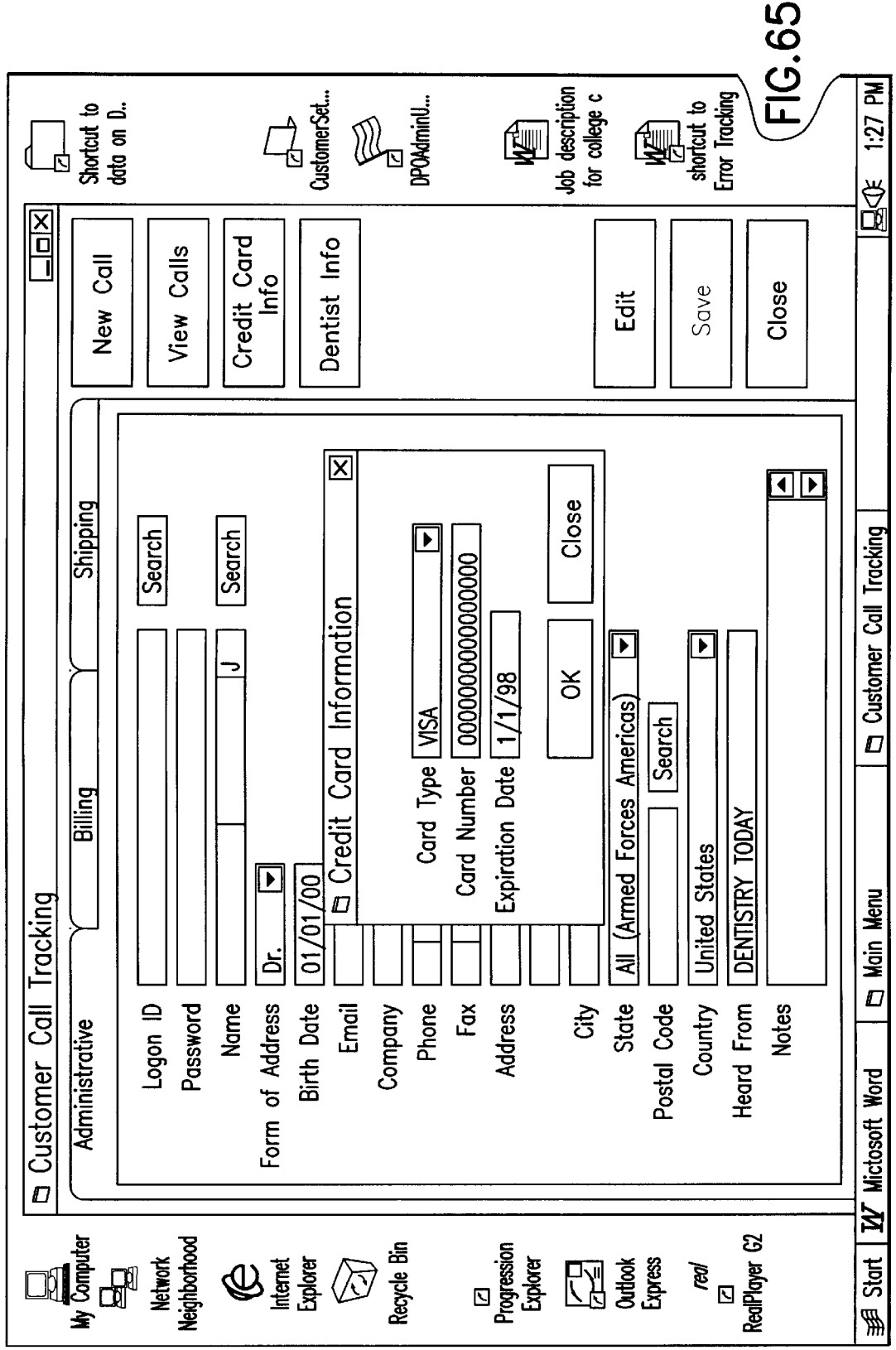

FIG. 64 shows an exemplary call list for a specific user which is accessible from any of the customer call tracking windows, preferably by pressing a virtual button, such as the view calls button of FIG. 62. The call list preferably contains information such as the name, the contact date, whether follow-up has been performed, and which customer service operator received the call. The customer call tracking screen also preferably enables the customer service operator to access the customer's credit card information, such as by pressing a virtual button, such as the "credit card info" virtual button as shown in FIG. 65. FIG. 65 also shows an exemplary credit card information pop-up window according to the present invention which contains information such as card type, card number and expiration date.

Figure 66:
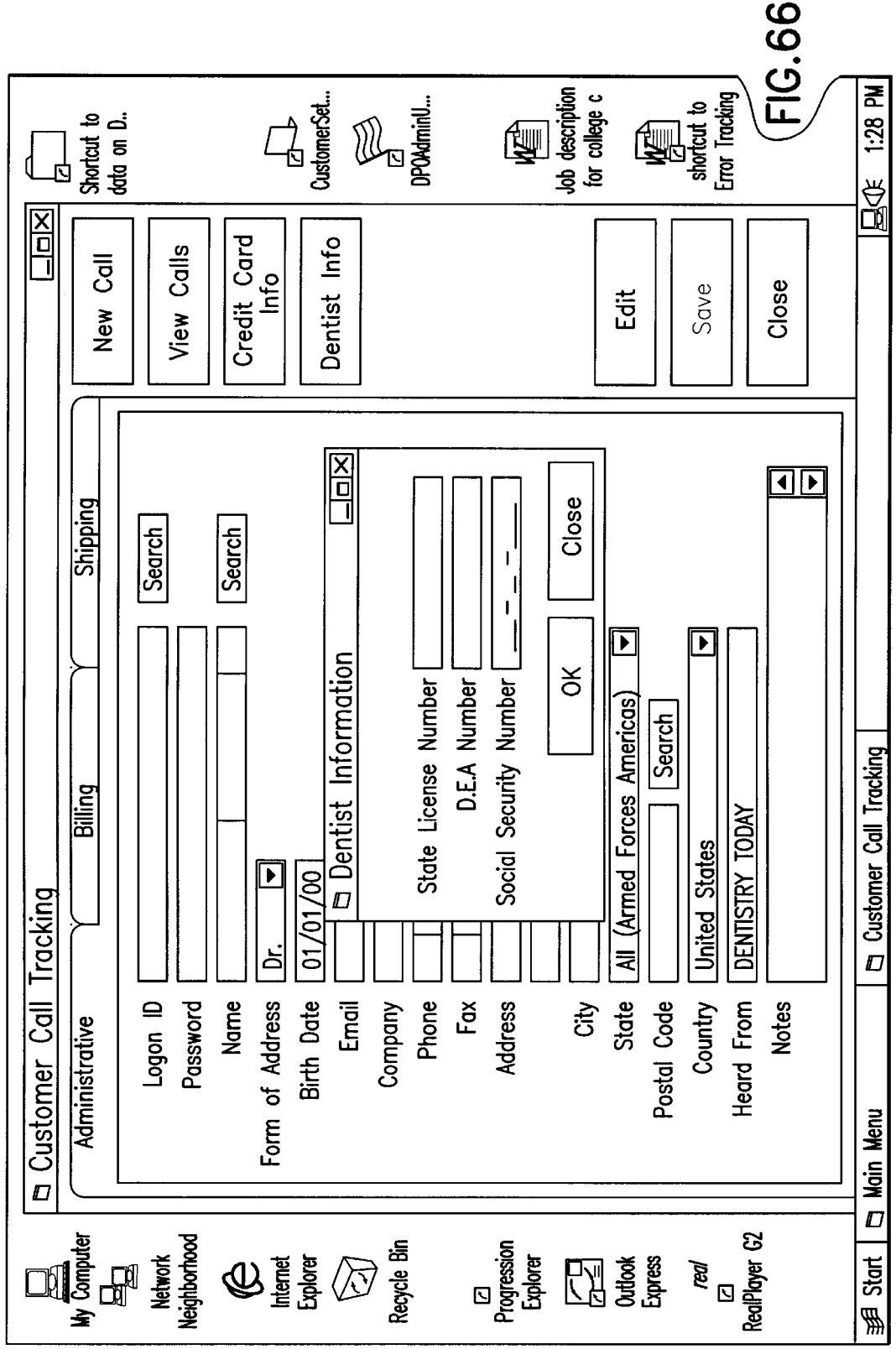

The customer call tracking screen also preferably permits the user to access any special information concerning the customer which is specific to the customer's field, for example, the users have implemented a system according to the present invention for the sale of dental equipment, and accordingly, the customer call tracking screen in such circumstances preferably includes a screen for displaying dentist information from the database, including fields such as State License number, D.E.A. number, and Social Security number, as shown in FIG. 66.

Figure 67:
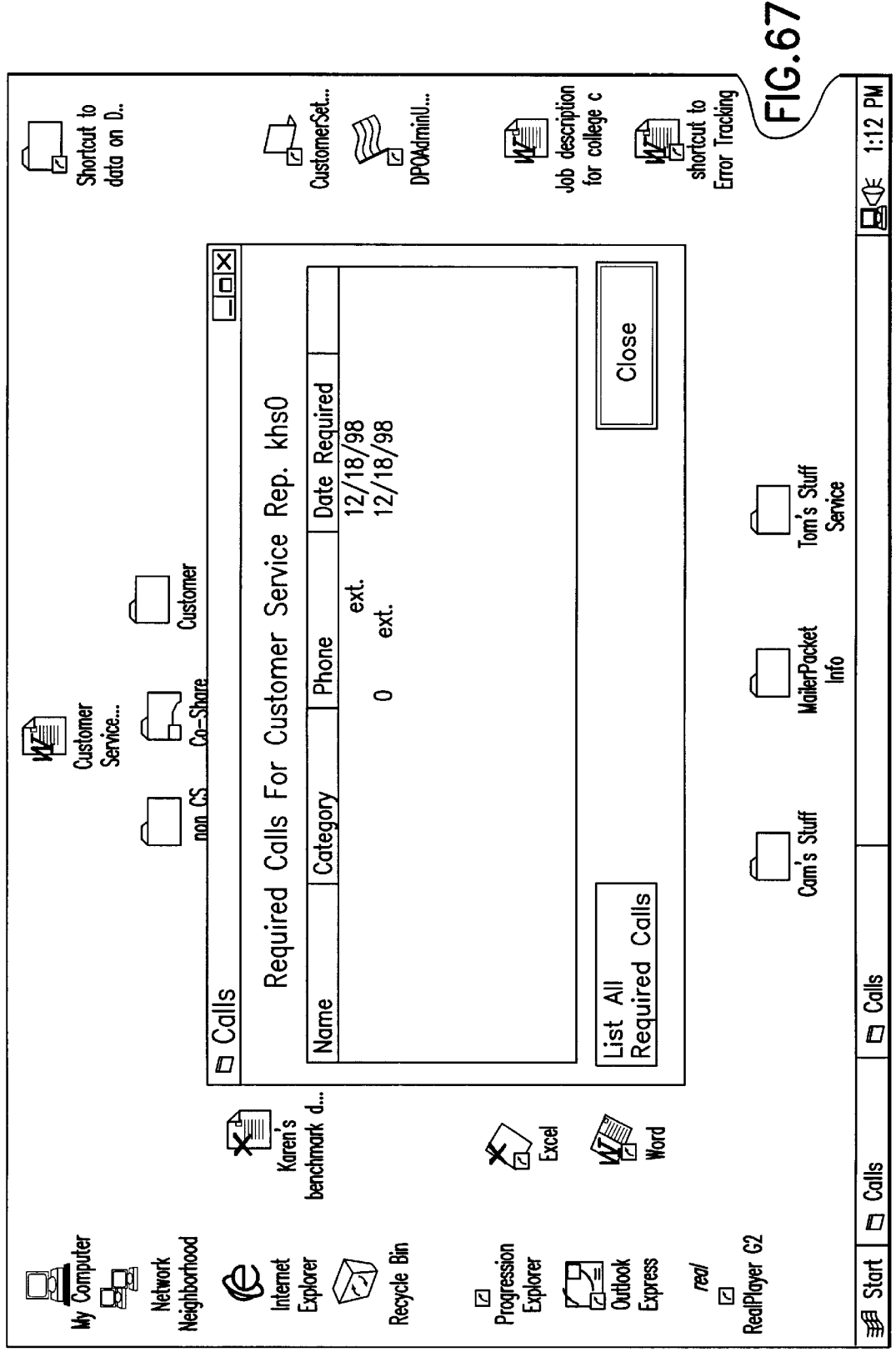
Figure 68:
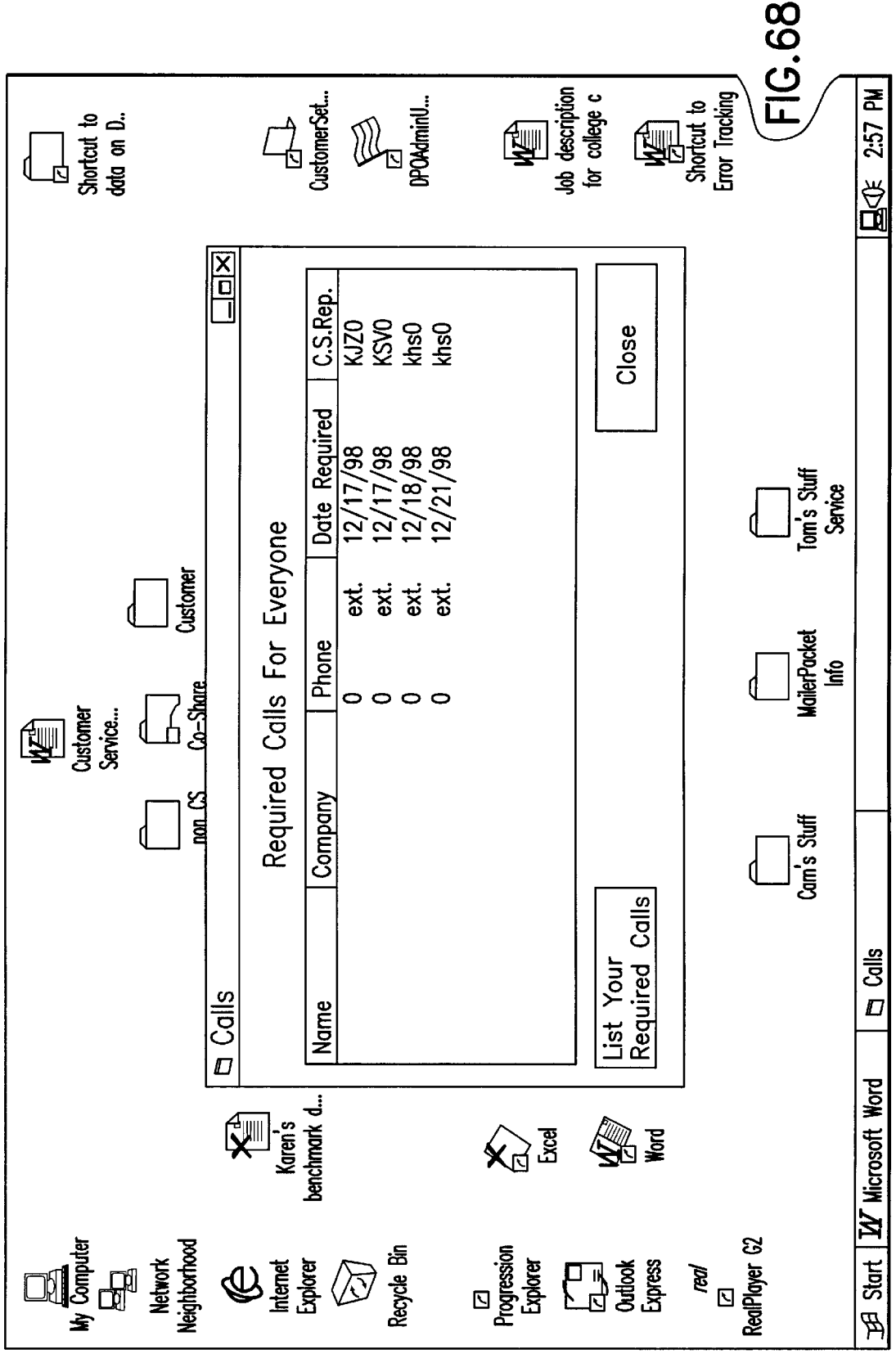

The system also preferably includes a means for permitting the customer service operator and/or the customer service manager to access the information contained in the database in order to provide a list of required calls for the customer service department or for any particular customer service representative. Such a call list can serve as a task list for a particular customer service representative or a quality control list for a customer service manager, in order to determine what calls are being made and what calls need to be made. An exemplary required calls listing a series of all required calls or a number of customer service representatives is illustrated in FIG. 67.

The customer service utility also preferably includes a customer service management function. The customer service management function is preferably accessible from the customer service utility main menu. The customer service administrative management function preferably permits the customer service manger to manage log-in permissions for various customer service personnel, including a means for determining which information the customer service personnel can read and which information the customer service personnel can edit.

Figure 69:
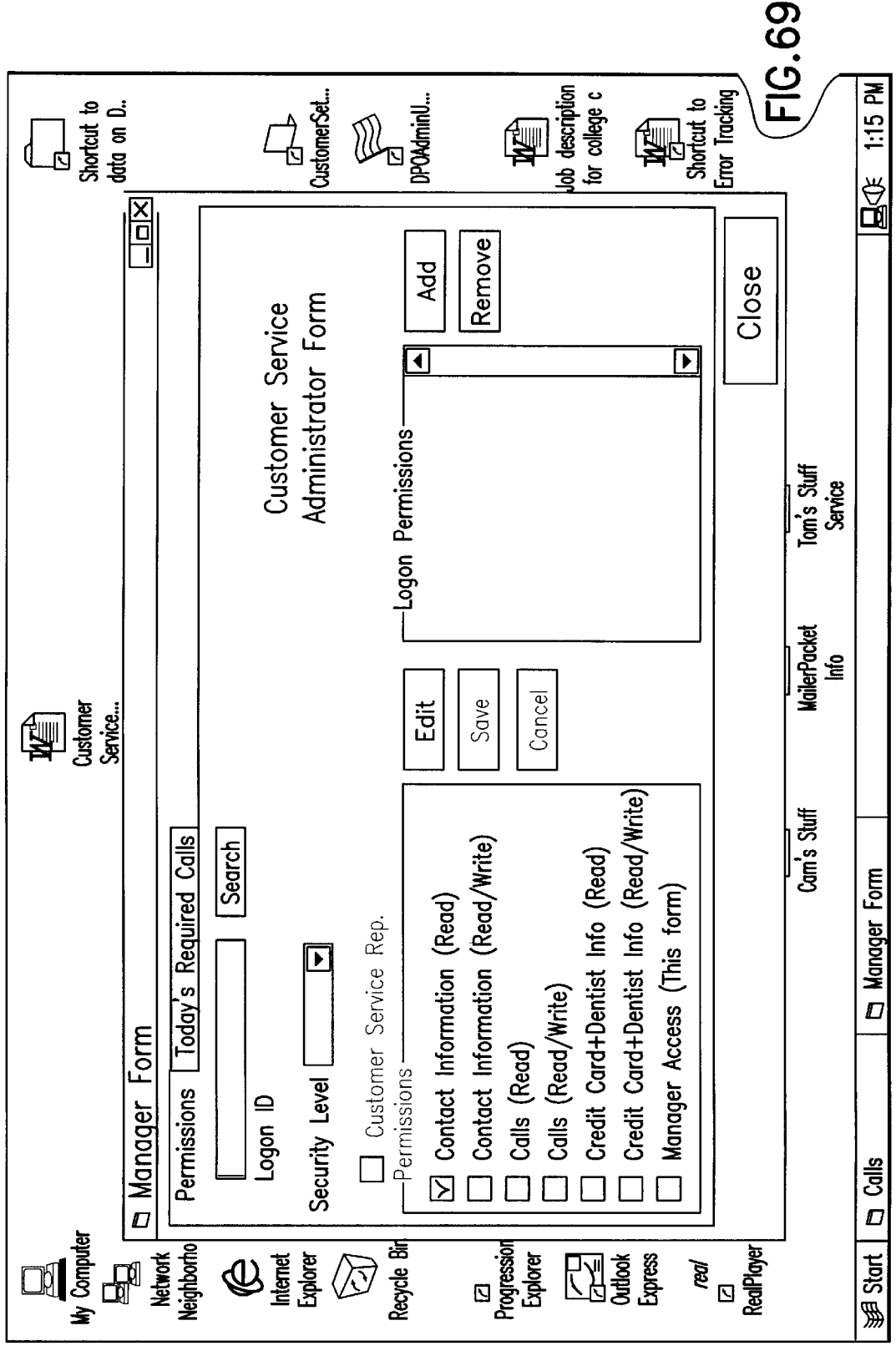

Various fields, which are preferably controllable by the customer service manager using the customer service manager function, include contact information, calls, credit card information and manager access. For example, any particular customer service representative may be permitted to read contact information but not to edit contact information. For another example, any particular user may be permitted to read credit card information, but not to edit credit card information. An exemplary customer service administrator window is illustrated in FIG. 69.

Figure 70:
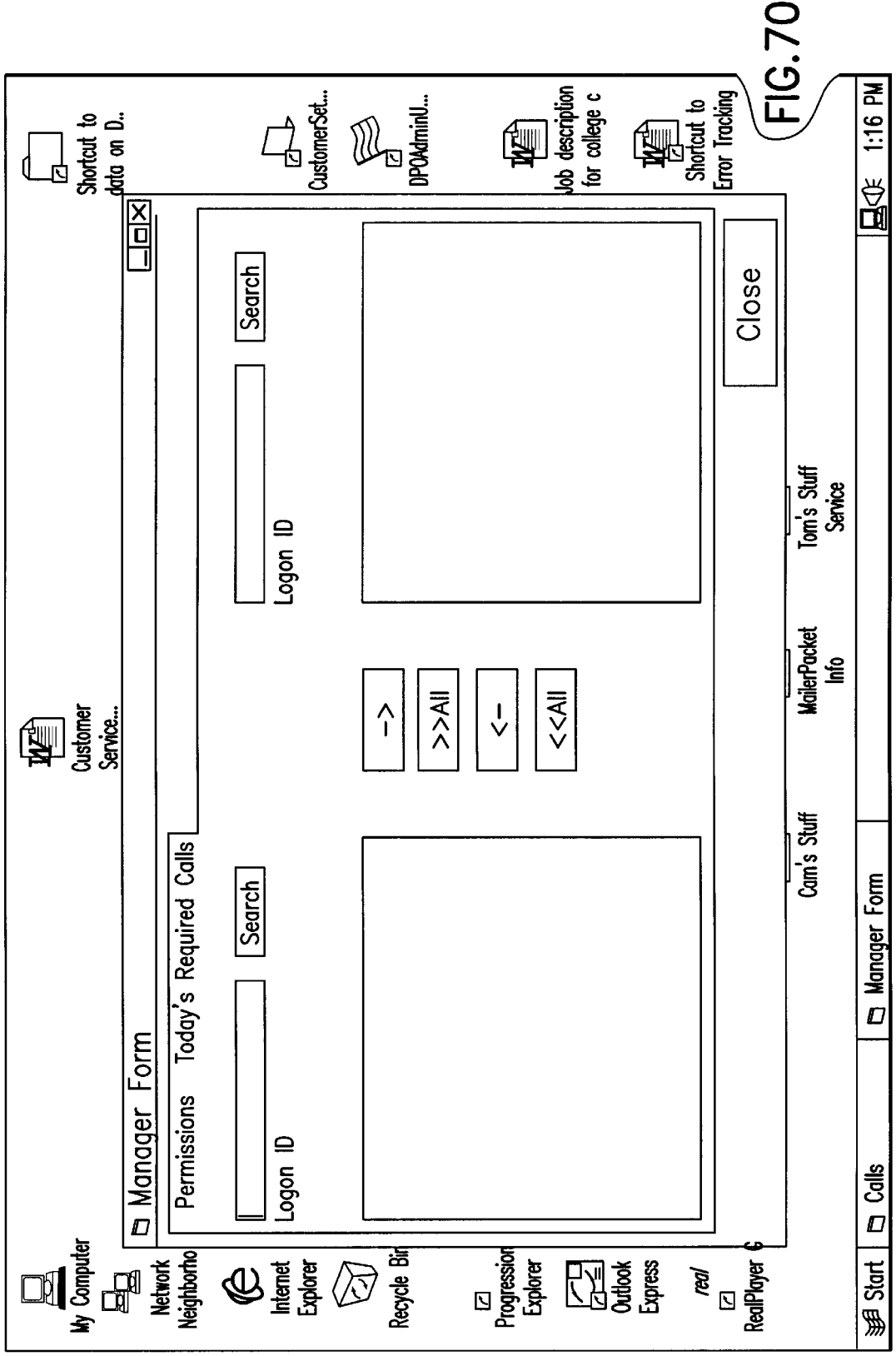
Figure 72:
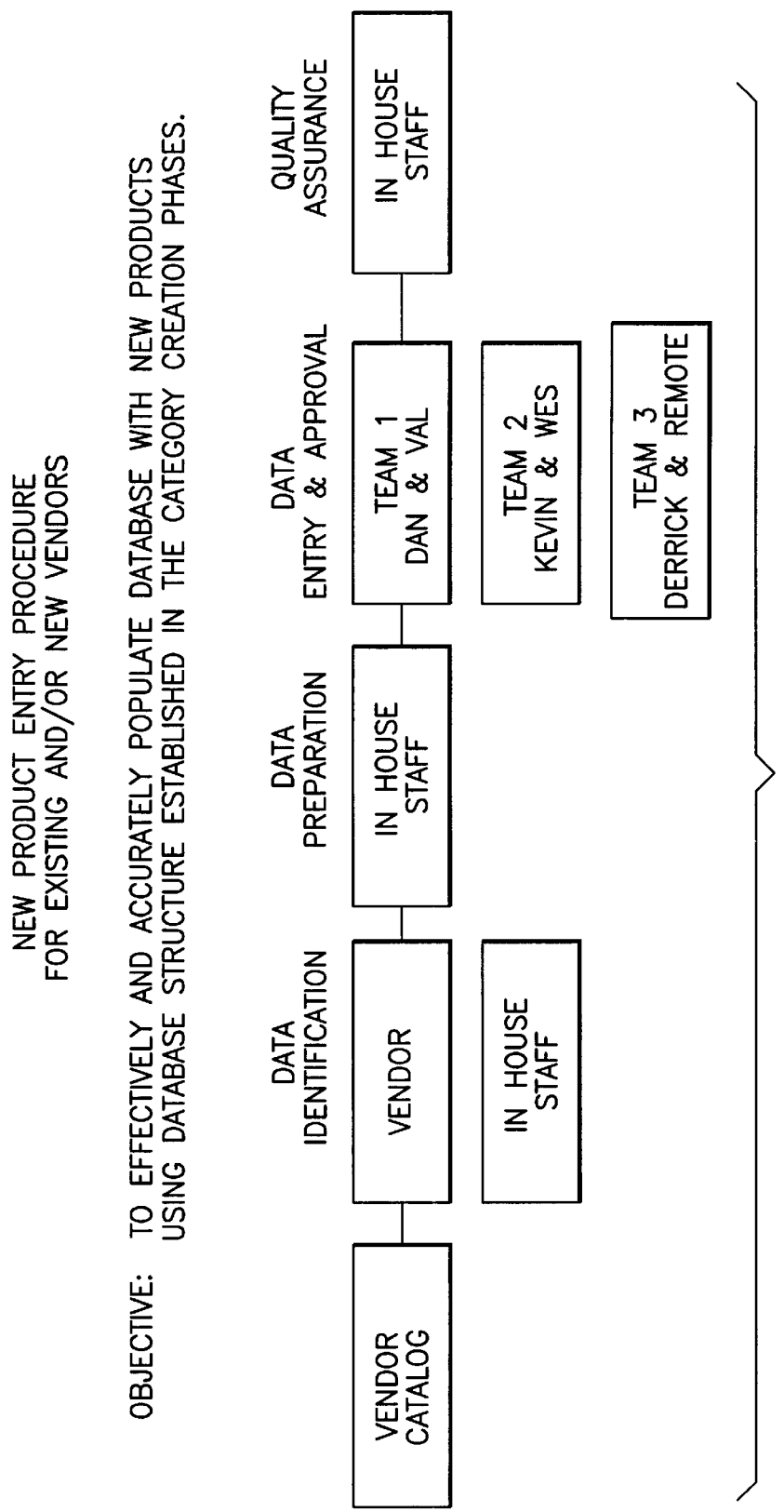
FIG. 72 is a relational depiction of a category creation procedure for products, as carried out to establish a database structure and populate it in such a way that products can be easily, logically and positively (no empty search or dead-end results) identified system users.

The customer service manager function of the customer service utility also preferably includes a means by which the customer service manager can view various planned follow-up calls and edit such calls and/or reassign such calls to various other customer service representatives. An exemplary program window, which permits the customer service manager to manage calls according to the present invention, is illustrated in FIG. 70.

Throughout the present specification the applicants have made various references to accessing programs, linking to various programs, linking to various functions, performing various functions, etc. It will be readily understood by one of skill in the art that these various operations are generally performed by a wide variety of software mechanisms including, for example, virtual buttons, virtual tabs, function buttons, and other various means known in the art. Furthermore, it will be appreciated that throughout the drawings, various virtual buttons and/or virtual tabs, and/or fields are displayed. The functions of such virtual buttons, virtual tabs, and/or fields are generally ascertainable by one of skill in the art simply by observing the Figures. Further, the virtual buttons, in particular, contain a variety of standard buttons including close buttons, save buttons, exit buttons, cancel buttons, and others which are generally used and are known in the art.

In another aspect of the present invention, the applicants provide a method for establishing a database structure and populating such a database structure with a series of standardized product descriptors which can be used by a user/customer to identify and compare various products within a particular product category. According to the method, information is collected concerning a product population, and products are compared by individuals knowledgeable in the field, to establish a list of the minimum necessary attributes needed to identify any particular product. Such attributes may vary according to the complexity of the product, and this is one of the major advantages of the present system and database. A category-attribute chain by which the user can by making attribute selections at each level of the category-attribute chain arrive at a final product group. The final product group can then be displayed in a grid or other format which permits the user to compare the prices of like products. Once the category-attribute chain is established, a minimum number of products can be entered within a particular category in order to encompass all product types within that category. These products can then be checked for accuracy, and upon approval, the database can be populated with all products in each category-attribute chain group.

FIG. 73 is a schematic representation of a relational product entry procedure for existing and/or new vendors, to input product information and to ensure its quality. As shown, a "Vendor Catalog" is a source of product information that is subjected to data identification scrutiny by the vendor as well as the in-house staff of the Web site operator. The identified data then is passed to an in-house staff of the Web site operator for data preparation, by which is meant the formulation of the data in a form that is amenable to input in the database of the Web site software system.

Data entry and approval is then carried out by collateral teams of individuals (denoted "Team 1," "Team 2," and "Team 3," respectively) to ensure the accuracy of the data entry process. Finally, the entered data is subjected to quality assurance scrutiny by the quality assurance team of the Web site operator.

FIG. 74 is a relational depiction of a category creation procedure for remaining sub-categories, as carried out to establish a database structure and populate it in such a way that products can be easily and logically identified by the majority of Web site users.

In this procedure, various Levels are established for the category definition effort. Level 3 activity is the creation of the structure, viz., the establishment of a category structure and documentation of industry nuances that are specific to the particular goods and/or services being categorized. Level 2 activity is data entry activity, and relates to building a database structure established by Level 3. Level 1 activity is data entry, involving populating the database established by Level 2. Level 0 activity is quality assurance, relating to verification of the sub-categories and the vendor information completeness.

These various Level 0–3 activities are shown in FIG. 74, for an illustrative example involving about 200 categories. Successive teams are involved in the respective steps, as illustrated.

It will be appreciated that the database may be constructed, arranged, operated and constituted in a wide variety of different forms. In addition, it will be appreciated that the appearance and visual aspect of the screens shown to the user in operation of the Web site software may be correspondingly varied to provide a look and feel character that is widely variable. Further, the content of the database may be correspondingly varied dependent on the nature and types of products and/or services that are purveyed at the Web site.

Although the invention has been described with respect to various illustrative embodiments, features and aspects, it will be appreciated that the utility of the invention is not thus limited, but rather extends to and includes various other modifications, alterations and other embodiments, as will readily suggest themselves to those of ordinary skill in the art based on the disclosure herein. The invention is therefore intended to be broadly construed, as encompassing all such modifications, alterations and other embodiments within the spirit and scope of the ensuing claims.

What is claimed is:

1. A searchable database system for generating a product comparison grid for a selected target search item, comprising:
    a database embodied in a computer readable medium, the database including a multiplicity of target search items, the target search items having assigned attributes and at least one related value for each attribute;
    a computer with a display device operatively connected to the database for displaying selections by user wherein the database provides to the display device only one attribute level at a time with its related values and the selection of a value for the displayed attribute determines the next displayed attribute level and wherein the comparison grid is generated only after a series of steps including:
    the user selects a target search item and the database provides for display of a single first level attribute and at least one value related to the attribute;
    the user selects a value for the first level attribute, and the value chosen determines the next level attribute displayed to the user, the next level attribute having at least one related value;
    the attribute display and value selection process is repeated until a value is selected for each sequentially displayed attribute to generate an attribute-chain which includes the selected value for each attribute assigned to the selected target search item in the database; and
    the completion of the attribute-value chain prompts the construction and display of the comparison grid for products having the selected values, wherein the database system provides at least one product in the comparison grid of products specifying the target search item and precluding an indeterminate search result, and wherein the comparison grid of products is formed only after a value has been specified for each of the attributes displayed.

2. The searchable database of claim 1, wherein said computer readable medium is selected from the group consisting of: CD-ROMs, magnetic disks, magnetic tape, magnetic drums, electronic memory, ferroelectric memory, and combinations thereof.

3. The searchable database of claim 1 wherein the target search items comprise products.

4. The searchable database of claim 1 wherein the target search items comprise services.

5. The searchable database of claim 1 wherein the target search items comprise dentistry products.

6. The searchable database of claim 1 wherein the target search items comprise medical products.

7. The searchable database of claim 1, operatively resident in a programmable computer.

8. The searchable database of claim 7 wherein said computer network comprises the World Wide Web.

9. The searchable database of claim 1 operatively connected to a computerized user interface system.

10. The searchable database of claim 9 wherein the computerized user interface system comprises a persistent shopping cart.

11. The searchable database of claim 9 wherein the computerized interface system comprises an attribute-value chain search capability.

12. The searchable database of claim 9 wherein the computerized interface system comprises a selectable display of user history involving said target search items.

13. The searchable database of claim 9 wherein the computerized interface system comprises a custom order template.

14. A computer network-based online comparison shopping system containing product selection information for products from different sources, comprising:
    (i) a searchable database embodied in a computer readable medium operatively connected to a computer with a display device wherein the database comprises target search items, the target search items having assigned attributes and at least one related value for each attribute and wherein a comparison grid setting forth product information for products from different sources is generated only after a series of steps including:
    the user select a target search item and the database provides to the display device only the first attribute level with its related values;
    the user selects a value for the first level attribute, and the value chosen determines the next level attribute displayed to the user, the next level attribute having at least one related value;
    the attribute display and value selection process is repeated until a value is selected for each sequentially displayed attribute to generate a attribute-value chain which includes the selected value for each attribute assigned to the selected target search item and which prompts the construction of a comparison grid of said products and precluding an indeterminate search result, wherein the comparison grid of products is formed only after a value has been specified for each of the displayed attributes; and
    (ii) a computerized user interface operatively coupled to said database for user manipulation thereof to select product(s) based on product selection information and constructed and arranged to communicate ordering information to source(s) of selected product(s).

15. The online comparison shopping system of claim 14, wherein said computer readable medium is selected from the group consisting of: CD-ROMs, magnetic disks, magnetic tape, magnetic drums, electronic memory, ferroelectric memory, and combinations thereof.

16. The online comparison shopping system of claim 14 wherein the target search items comprise products.

17. The online comparison shopping system of claim 14 wherein the target search items comprise services.

18. The online comparison shopping system of claim 14 wherein the target search items comprise dentistry products.

19. The online comparison shopping system of claim 14 wherein the target search items comprise medical products.

20. The online comparison shopping system of claim 14 wherein said computer network comprises the World Wide Web.

21. The online comparison shopping system of claim 14 wherein the searchable database is operatively coupled to software providing order capability for purchase and sale transaction of said products.

22. The online comparison shopping system of claim 14 wherein the computerized user interface system comprises a persistent shopping cart.

23. The online comparison shopping system of claim 14 wherein the computerized interface system comprises an attribute-value chain search capability.

24. The online comparison shopping system of claim 14 wherein the computerized interface system comprises a selectable display of user history involving said target search items.

25. The online comparison shopping system of claim 14 wherein the computerized interface system comprises a custom order template.

26. The online comparison shopping system of claim 14, further comprising at least one of the tables selected from the group consisting of OrderHeader table, CreditCardType table, ConsumerType table, CreditCardInfo table, Consumer table, DentistInfo table, Vendor table, OrderLine table, VendorProduct Table, Price Table, Brand table, Manufacturer table, DPODetail table, DPOProduct table, OrderTemplateLine table, OrderTemplateHeader table, LogonRecords table, ShoppingCart table, Logon table, ContactInfo table, TentativeProduct table, TentativeProductReject table, DataEntryRates table, ShipAddr table, FormOfAddress table, Country table, State table, LogonPermissions table, Permissions table, Category table, CallTracking table, UpdatePrices table, ReptTransactionList table, InvoiceHeader table, InvoiceLine table, ReptInvoiceHeader table, ReptInvoiceLine table, and InvoiceContactInfo table.

27. The online comparison shopping system of claim 14, further comprising an OrderHeader table, a CreditCardType table, a ConsumerType table, a CreditCardInfo table, a Consumer table, a DentistInfo table, a Vendor table, an OrderLine table, a VendorProduct Table, a Price Table, a Brand table, a Manufacturer table, a DPODetail table, a DPOProduct table, an OrderTemplateLine table, an OrderTemplateHeader table, a LogonRecords table, a ShoppingCart table, a Logon table, a ContactInfo table, a TentativeProduct table, a TentativeProductReject table, a DataEntryRates table, a ShipAddr table, a FormOfAddress table, a Country table, a State table, a LogonPermissions table, a Permissions table, a Category table, a CallTracking table, and an UpdatePrices table.

28. The online comparison shopping system of claim 27 wherein the searchable database further comprises a ReptTransactionList table, an InvoiceHeader table, an InvoiceLine table, a ReptInvoiceHeader table, a ReptInvoiceLine table, and an InvoiceContactInfo table.

29. The online comparison shopping system of claim 14 further comprising means for quote generation for a potential transaction identified by a user.

30. The online comparison shopping system of claim 29 wherein the quote is saved in a user history archive.

31. The online comparison shopping system of claim 29 wherein the quote is automatically e-mailed to a user.

32. The online comparison shopping system of claim 14 wherein the user interface comprises search means having search capabilities selected from the group consisting of category searching, vendor searching, brand searching, manufacturer searching, code searching, index searching, and order history searching.

33. A computerized online comparison shopping system comprising:
(i) a searchable database embodied in a computer readable medium containing product information of multiple vendors, manufacturers and/or products, the searchable database operatively connected to a computer with a display device and comprising a multiplicity of target search items, the target search items having assigned attributes and at least one related value for each attribute wherein a user of the online comparison shopping system selects a target search item and the database provides to the display device only the first attribute level with its related values;

the user selects a value for the first level attribute, and the value chosen determines the next level attribute displayed to the user, the next level attribute having at least one related value;

the attribute display and value selection process is repeated until a value is selected for each sequentially displayed attribute to generate a attribute-value chain which includes the selected value for each attribute assigned to the selected target search item and which prompts the construction of a comparison grid specifying said products and precluding an indeterminate search result, wherein the comparison grid of products is formed only after a value has been specified for each of the attributes displayed; and (ii) a computerized user interface generating a virtual shopping cart, and constructed and arranged to enable a user to selectively aggregate an order in said virtual shopping cart, comprising products represented in said database, and means for electronically disaggregating said order to generate vendor-specific orders to respective vendors.

34. The online comparison shopping system of claim 33 further comprising means for electronically transmitting said vendor-specific orders to said respective vendors.

35. The computer network-based on-line comparison shopping system according to claim 14 further comprising:
a Web site having a public interface and a private interface, wherein the public interface includes all operative functional characteristics except quotes function and data entry function, and wherein the private interface includes quotes function and data entry function;

a customer service module functionally connected to said Web site via software architecture;

an administrative module functionally connected to said customer service module via software architecture;

a business module having a public interface and a private interface, wherein the public interface of said business module is functionally connected to the Web site, the customer service module, the administrative module via a software code linkage, and wherein the private interface interrelates with the private interface; and a database functionally connected to said business module via a software code linkage and directly interacting with the private interface of said business module.

36. A method of conducting electronic commerce involving online comparison shopping comprising:

providing a searchable database embodied in a computer readable medium and operatively connected to a computer with a display device, the searchable database containing product information of multiple vendors, manufacturers and/or products and comprising a multiplicity of target search items, the target search items having assigned attributes and at least one related value for each attribute;

providing access to the database by a user wherein the user selects a target search item and the database provides to the display device only a first level attribute with its related values, the user selects a value for the first level attribute, and the value chosen determines the next level attribute displayed to the user, the next level attribute having at least one related value;

the attribute display and value selection process is repeated until a value is selected for each attribute sequentially presented to the user to generate a attribute-value chain which includes the selected value for each attribute assigned to the selected target search item and which prompts the construction of a comparison grid specifying said products and precluding an indeterminate search result, wherein the comparison grid of products is formed only after a value has been specified for each of the attributes displayed; and manipulating a computerized user interface to generate a virtual shopping cart to selectively aggregate an order in said virtual shopping cart, comprising products represented in said database, and electronically disaggregating said order to generate vendor-specific orders to respective vendors.

37. The method of claim 36 further comprising electronically transmitting said vendor-specific orders to said respective vendors.

38. A dynamically generated database embodied in a computer readable medium and operatively connected to a computer with a display device for storing and searching product information of multiple products, the database comprising searchable products, wherein each searchable product has attributes assigned thereto; an Attributes table, wherein each attribute is located on a different level in the table and access to the next level can only be gained by selection of a related value for the current displayed level attribute; a Values table comprising the values related to each level of attributes, a DPO Detail table, and a DPO Product table, wherein selection of values for each attribute level that is sequentially presented generates a attribute-value chain which prompts the construction of a comparison grid specifying a particular product and precluding an indeterminate search result, and wherein all the possible attribute-value chains are stored in the DPO Detail table and respectively supplemented by description information stored in the DPO Product table.

39. The dynamically generated database of claim 38, wherein potentially unlimited number of attributes can be assigned to each product.

40. The dynamically generated database of claim 38, wherein the number of levels of each attribute-value decision tree depends on the number of attributes necessary to be assigned to the specified particular product to fully distinguish such product from other products.

41. The dynamically searchable database of claim 38, operatively resident in a programmable computer.

42. The dynamically searchable database of claim 41, wherein said programmable computer is operatively coupled to a computer network.

43. The dynamically searchable database of claim 42, wherein said computer network comprises the World Wide Web.

44. The dynamically searchable database of claim 38, operatively connected to a computerized user interface system.

45. The dynamically searchable database of claim 44, wherein the computerized user interface system comprises means for the users to sort multiple selected attribute-value decision tree by any one attribute.

46. The dynamically searchable database of claim 38, further comprising means for generating vendor-specific orders for selected products and electronically communicating such orders to respective vendors.

47. The computer network-based on-line comparison shopping system of claim 46, further comprising at least one module selected from the group consisting of a data entry module, a customer service module, and an administrative utility module.

48. The computer network-based on-line comparison shopping system of claim 46, comprising a data entry module.

49. The computer network-based on-line comparison shopping system of claim 48, wherein said data entry module comprises means for entering product information by individual vendors and/or manufacturers, means for approving the product information by others, and means for admitting the product information into the dynamically generated database subsequent to such approval.

50. The computer network-based on-line comparison shopping system of claim 48, wherein said data entry module enables individual vendors and/or manufacturers to categorize new products by attribute-value constructs comprising a series of correlated attributes and values.

51. The computer net work-based on-line comparison shopping system of claim 50, wherein said data entry module enables individual vendors and/or manufacturers to select existing attributes and values in the database or add new attributes and values.

52. The computer network-based on-line comparison shopping system of claim 46, wherein the database further comprises at least one selected from the group consisting of a Vendor Product table, a Vendor table, a Brand table, a Manufacturer table, and a Price table.

53. The computer network-based on-line comparison shopping system of claim 38, wherein the comparative selection grid can be sorted by any columns selected by user.

54. The computer network-based on-line comparison shopping system of claim 46, further comprising a persistent shopping cart.

* * * * *

UNITED STATES PATENT AND TRADEMARK OFFICE
CERTIFICATE OF CORRECTION

| | | |
|---|---|---|
| PATENT NO. | : 7,107,226 B1 | Page 1 of 1 |
| APPLICATION NO. | : 09/234348 | |
| DATED | : September 12, 2006 | |
| INVENTOR(S) | : Patrick Cassidy et al. | |

It is certified that error appears in the above-identified patent and that said Letters Patent is hereby corrected as shown below:

Title page Item [75], in the identification of Inventors, "James Evans, Cary, NC (US)" should be -- James Evans, Apex, NC (US) --

In column 12, line 27, "with in" should be -- within --

Signed and Sealed this

Thirtieth Day of January, 2007

JON W. DUDAS
*Director of the United States Patent and Trademark Office*